FIG. 1
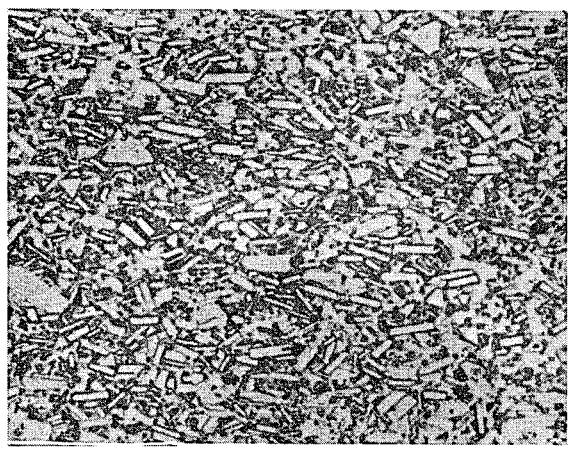
FIG. 2

June 24, 1969  G. W. MEADOWS  3,451,791

COBALT-BONDED TUNGSTEN CARBIDE

Filed Aug. 16, 1967  Sheet 3 of 9

INVENTOR
GEOFFREY W. MEADOWS

BY John R. Powell

ATTORNEY

INVENTOR
GEOFFREY W. MEADOWS

BY John R. Powell

ATTORNEY

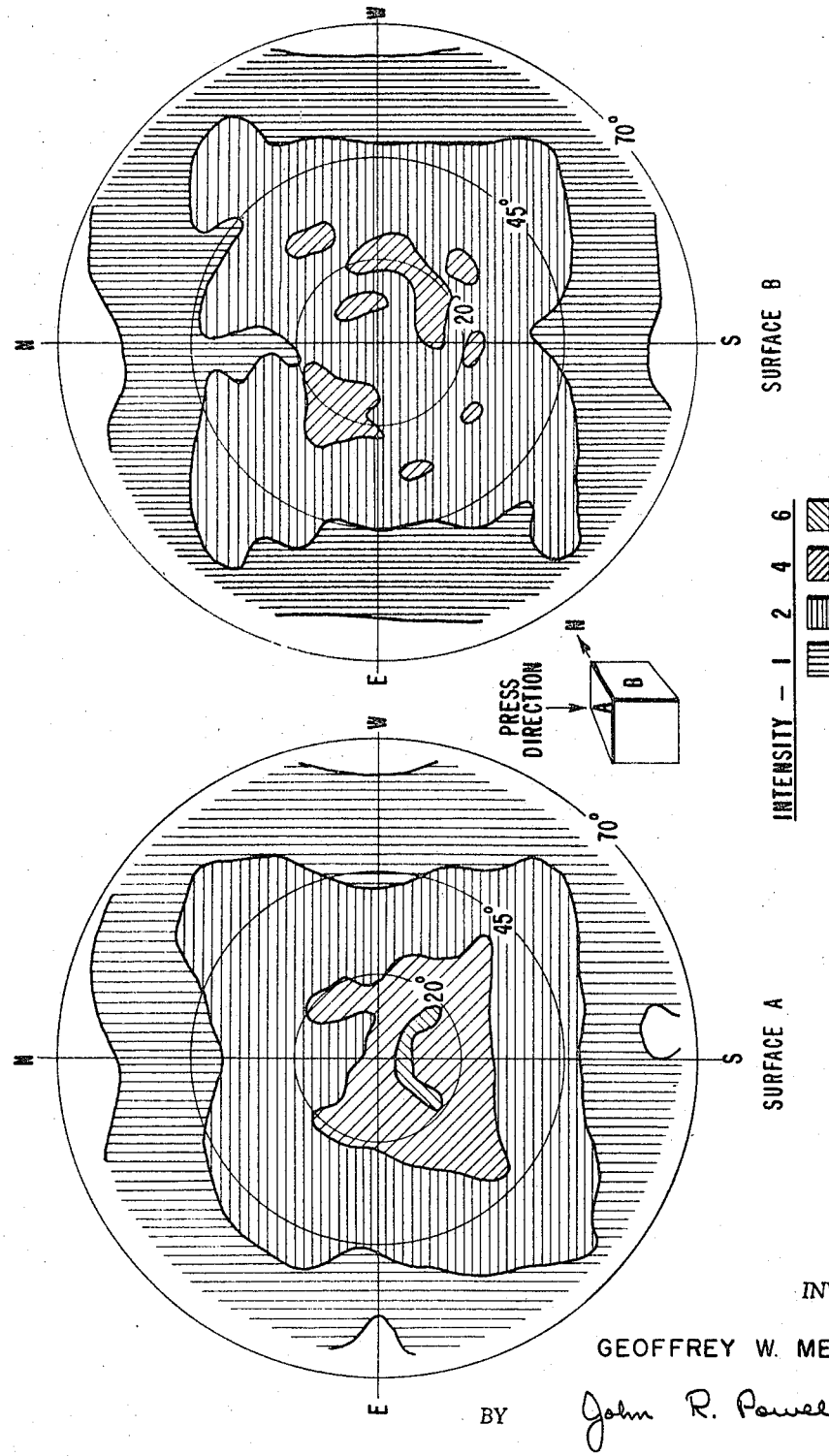

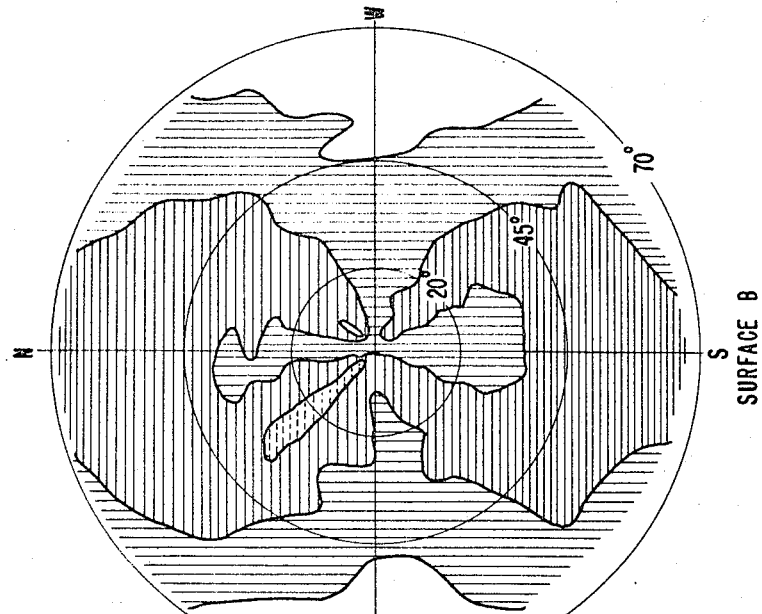
FIG. IIA
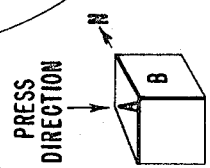
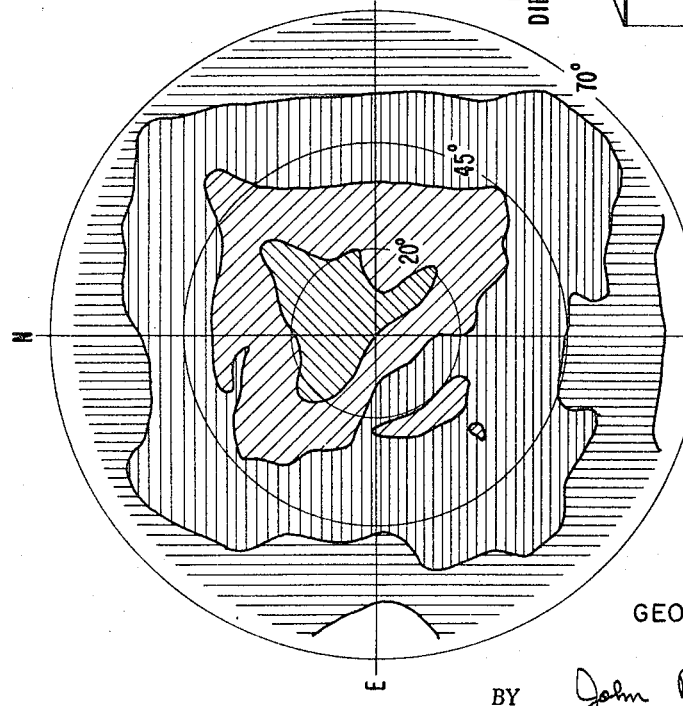
FIG. II

United States Patent Office 3,451,791
Patented June 24, 1969

3,451,791
COBALT-BONDED TUNGSTEN CARBIDE
Geoffrey W. Meadows, Kennett Square, Pa., assignor to E. I. du Pont de Nemours and Company, Wilmington, Del., a corporation of Delaware
Continuation-in-part of applications Ser. No. 516,825, Nov. 24, 1965, and Ser. No. 582,924, Sept. 29, 1966. This application Aug. 16, 1967, Ser. No. 660,986
Int. Cl. B22f 3/00; C22m 1/04, 33/02
U.S. Cl. 29—182.8                      21 Claims

ABSTRACT OF THE DISCLOSURE

Hard metal compositions of tungsten carbide bonded with from 1 to 30 percent by weight of cobalt useful as cutting tools or bits for cutting or shaping very hard materials and a process for preparing the bonded compositions by heating an intimately mixed cobalt/tungsten carbide powder to a temperature above 1000° C. and consolidating the powder to a density in excess of 95 percent of its theoretical density.

CROSS-REFERENCE TO RELATED APPLICATIONS

This application is a continuation-in-part of my copending application Ser. No. 582,924 filed Sept. 29, 1966, now abandoned, and my copending application Ser. No. 516,825 filed Nov. 24, 1965, now abandoned. My copending application Ser. No. 582.924 is a continuation-in-part of my copending application Ser. No. 516,825 and both of these are continuations-in-part of my application Ser. No. 418,808 filed Dec. 16, 1964 now abandoned. The entire disclosure of each of these applications is hereby expressly incorporated by reference into this application.

BACKGROUND OF THE INVENTION

This invention relates to hard metal compositions of tungsten carbide and cobalt and to methods of preparing them, intermediate products in the process of preparing the compositions, and to the use of the final products in cutting or shaping very hard materials.

The products of this invention will ordinarily be referred to herein as cobalt-bonded tungsten carbide, a term commonly employed to describe a well-known class of compositions, but it will be understood that the cobalt binder phase contains appreciable amounts of tungsten and is thus in reality a cobalt-tungsten alloy.

It has been generally accepted, by those skilled in the cobalt-bonded tungsten carbide art, that it is not possible to achieve maximum hardness and maximum strength and toughness simultaneously in a single composition. It was commonly recognized that for greatest hardness the composition should contain a minimum of cobalt binder and have the finest tungsten carbide grain size. Conversely for greatest strength and toughness the composition should contain large amounts of cobalt. See Cemented Carbides by Schwartzkopf and Kiefer, Macmillan Co., 1960, p. 137. Tungsten carbide grain size and cobalt content were the only two variables known to effect marked property changes in the compositions. See American Machinist, vol. 105 (12), p. 95.

More recently a further variable, the composition of the metal phase has come under study. H. Kubota, R. Ishida and A. Hara in Indian Institute of Metals, Transactions, vol. 9, pp. 132–138 (1964) pointed out that when tungsten carbide grain size is not very fine and when the carbon to tungsten atomic ratio is below theoretical, as much as 10% tungsten can be present in solid solution in the cobalt phase. Increased tungsten in the cobalt was correlated with increased transverse rupture strength, hardness, and fatigue strength of high cobalt compositions.

However, it was further substantiated by H. Kubota along with H. Suzuki that if the tungsten carbide grain size was smaller than 2 microns the presence of tungsten in the cobalt corresponds to a decrease in the strength of the compositions. See Planseeherichte für Pulver metallurgie, vol. 14, No. 2, pp. 96–109, August 1966. That a tungsten carbide grain size of 2 microns is optimum is reported by others such as J. Gurland and P. Bardzil, Journal of Metals, February 1955, pp. 311–315.

I have discovered however that cobalt-bonded tungsten carbide compositions can be prepared which have an outstanding combination of hardness, strength and toughness. Surprisingly my bonded compositions must have a very fine tungsten carbide grain size with the mean grain size smaller than one micron and at least 60% of the grains smaller than one micron in diameter. It is also essential that the bonded compositions of this invention contain at least 8 percent by weight of tungsten in the cobalt phase and demonstrate a high resistance to removal of the metal binder with concentrated hydrochloric acid. The bonded products of this invention are generally characteriazed by having an un-annealed or quench-strengthened structure as shown by at least a 10% loss of transverse rupture strength at 30° C. when they are heated in a vacuum to 1400° C. at 100° C. per minute and immediately cooled to 700° C at 5° per minute.

SUMMARY

In summary this invention relates to cobalt-bonded tungsten carbide and is more particularly directed to cobalt-bonded tungsten carbide compositions in which the mean grain size of tungsten carbide is less than one micron and at least 60% of the grains are smaller than one micron in diameter; the cobalt binder is acid resistant and contains from 8 to 33% by weight of tungsten; the composition containing 1 to 30 percent by weight of cobalt and usually being further characterized by a loss of at least 10% in transverse rupture strength at 30° C. when heated in a vacuum to 1400° C. at 100° C. per minute followed by immediate cooling at 5° C. per minute to 700° C. This invention is further directed to anisodimensional tungsten carbide particles, methods of preparing the anisodimensional particles and both isodimensional and anisodimensional tungsten carbide particles bonded with cobalt, to intermediate powder alloys of the process of preparing the bonded compositions and to the use of the bonded compositions as cutting tools.

The bonded compositions of my invention combine surprisingly high transverse rupture strength and toughness with extreme hardness and acid resistance to provide refractory materials of exceptional utility for cutting, drilling, shaping, punching or otherwise working very tough hard materials.

BRIEF DESCRIPTION OF DRAWINGS

Many of the advantages of this invention will become apparent from the description to follow and from the accompanying drawings in which:

FIGURE 1 is a photomicrograph at about 1500 diameters magnification of a polished, etched surface of a cobalt-bonded tungsten carbide body of this invention. The view of the photograph is perpendicular to the direction in which the body was pressed;

FIGURE 2 is a photomicrograph at about 1500 diameters magnification of a polished, etched surface of the same cobalt-bonded tungsten carbide body as in FIGURE 1. The view of the photograph is parallel to the direction in which the body was pressed;

FIGURES 10 and 10A are representations of actual pole-figure patterns made on a commercially available cobalt-bonded tungsten carbide body;

FIGURES 11 and 11A are representations of actual pole-figure patterns made on a cobalt-bonded oriented tungsten carbide body of this invention;

DESCRIPTION OF THE INVENTION

Figure 3:
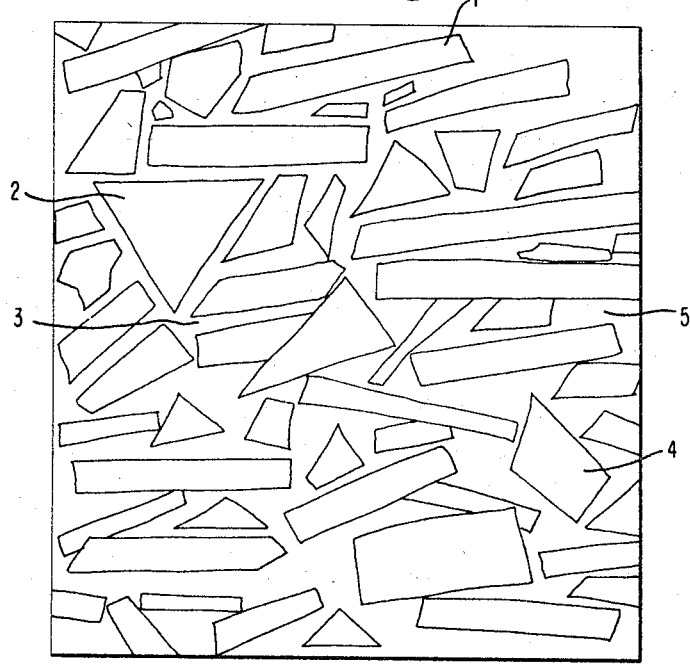
FIGURE 3 is a pen and ink drawing of an enlarged area of FIGURE 1.

The principal aspect of this invention is a cobalt-bonded tungsten carbide composition in which the tungsten carbide grains are quite uniform and quite small; the cobalt contains from 8 to 33% by weight of tungsten and the composition is characterized by a 10% loss of transverse rupture strength upon being annealed.

A further aspect of this invention is anisodimensional tungsten carbide particles having a longest dimension of from 0.1 to 50 microns and a shortest dimension which is less than ⅓ that of the longest dimension.

A further aspect of this invention is a cobalt-bonded tungsten carbide composition as described above wherein the tungsten carbide grains are anisodimensional and are oriented such that a substantial portion of the grains are aligned with their largest face parallel to a common line.

A further aspect of this invention is a heat-treated cobalt/tungsten carbide powder mixture of 1 to 30 percent by weight cobalt alloyed with 8 to 33 percent by weight tungsten, the specific surface area of tungsten carbide being greater than 0.5 square meters per gram.

A further aspect of this invention is a process for preparing each of the above compositions. The process comprises intimately mixing finely divided cobalt with a uniformly fine tungsten carbide powder. The tungsten carbide powder should have a particle size of less than 1000 millimicrons and a specific surface area of 3 to 15 square meters per gram and should contain between 0.81 and 1.0 atomic weights of carbon per atomic weight of tungsten. After the cobalt and tungsten carbide powder is homogeneously intermixed it is heated to a temperature above 1000° C. and is then consolidated to a density in excess of 95% of the theoretical density. When preferred starting powders are used, this process results in the preparation of anisodimensional tungsten carbide and under selected conditions the anisodimensional crystals are oriented in the dense product.

The cobalt/tungsten carbide compositions of this invention are referred to from time to time as interdispersions. This term is meant to describe a relationship of cobalt and tungsten carbide which includes traditional dispersions, in which there is a dispersed particulate phase and a dispersant continuous phase; traditional mixtures in which both phases are particulate or interrupted and homogeneously intermixed; and mixtures in which both phases are continuous and are interpenetrating into each other.

STARTING MATERIALS

The starting materials suitable for use in this invention are tungsten carbide and cobalt which have a requisite degree of purity and a sufficiently fine particle size to produce the products of this invention as pointed out below.

(1) Tungsten carbide.—The tungsten carbide suitable for use in this invention is a finely divided composition containing tungsten and carbon in a ratio corresponding to from 0.81 to about 1.0 atomic weights of carbon per atomic weight of tungsten and which can contain tungsten monocarbide and ditungsten carbide along with sequent source of metallic tungsten, such as a cobalt-metallic tungsten or suitable materials serving as a subtungsten alloy powder. Such powders can be reduced in particle size by grinding to disaggregated, discrete particles substantially all of which have a particle size smaller than one micron.

Commercially available tungsten carbide is generally prepared at high temperature and then ground to obtain a powder. In some instances the particles are as small as a micron in diameter. The finest tungsten carbide powders of commerce have a specific surface area of from 0.1 to 1.0 square meters per gram. Microscopic examination of such powders shows most of the material in the form of particles ranging from one to 50 microns in diameter, with a minor weight fraction of finer material which contributes disproportionately to the specific surface area.

By prolonged ballmilling of tungsten carbide powders, in which most of the particles are initially smaller than a few microns, in a fluid medium such as acetone or alcohol, it is possible to convert a portion of the tungsten carbide to particles less than 100 millimicrons in size. Such prolonged milling results in a wide distribution of sizes of particles which range from less than 10 to 1000 or more millimicrons in diameter. From this material, a fraction of colloidal size consisting of particles ranging in size from more than 10 to less than 100 millimicrons in size can be separated by controlled sedimentation. Such finely divided tungsten carbide is characterized by its freedom from coherent aggregates and by a range of particle sizes.

A preferred commercial tungsten carbide with a stoichiometric ratio of carbon to tungsten has a relatively uniform ultimate particle size of about 1 micron. When ballmilled in acetone for from three days to a week by methods described hereinafter, this material provides a finely divided tungsten carbide having an average grain size of 0.1 to 0.2 microns with a specific surface area of 2 to 5 square meters per gram. This product can then be further milled in acetone with cobalt powder for several days and dried out of contact with air to give an interspersed cobalt/tungsten carbide powder which has a carbon to tungsten atomic ratio of between 0.99 and 1.0, some carbon having been lost in the milling and drying process.

Another suitable starting material is finely divided tungsten carbide consisting of colloidal particles admixed with a minor proportion of supercolloidal particles up to five microns in diameter. Such material produces tungsten carbide grains in the dense bodies of this invention which are isodimensional.

Such heterogeneous mixtures of colloidal and supercolloidal particles of tungsten carbide are prepared, for example, by prolonged ballmilling of a commercial tungsten carbide powder of initial particle size ranging from 0.5 to 5 microns and a specific surface area of about 0.5 square meters per gram, in an organic liquid medium such as acetone. Preferred grinding materials are hard balls or cylinders from 0.1 to 0.3 inch in diameter, made of dense cobalt-bonded tungsten carbide containing, for example, from 90 to 95% tungsten carbide and 10 to 5% by weight of cobalt. Milling of the heterogeneous mixture is continued until, without separating the colloidal fraction, the milled material has a specific surface area of at least 3 square meters per gram, although the mixture can still contain a proportion of tungsten carbide particles up to five microns in diameter. It is essential that the proportion of crystals larger than one micron remaining after milling is not too large, since during sintering and hot pressing these serve as nuclei which grow at the expense of the colloidal fraction to produce an undesirably coarse-structured, weak body. Generally speaking, to prepare colloidal tungsten carbide from commercial tungsten carbide powder for use in the present invention, it is necessary to mill the powder in a liquid medium until the specific surface area of the mixture is at least 3 square meters per gram and preferably until no more than 5 percent by weight of the milled material is larger than five microns. Most preferably, milling is continued until most of the particles are smaller than one micron.

A preferred tungsten carbide starting material for this invention is that disclosed in copending application Ser. No. 250,442, filed Jan. 9, 1963. This tungsten carbide is in the form of crystallites of colloidal size, well under half a micron in diameter and typically 30 or 40 millimicrons in diameter, the crystallites being linked together in porous aggregates. It is prepared by forming and precipitating tungsten carbide from a reaction medium of molten salt. Such powder, after purification, consists of crystallites of uniform size, greater than 90% of them being between 10 and 60 millimicrons in diameter. The packing density of this powder is about 6 grams per cc. The crystallites are linked together into aggregates consisting of three dimensional porous networks which are friable and permit the tungsten carbide crystallites to be readily broken apart by milling or grinding. Such grinding will produce fine fragments of the aggregates as well as discrete crystallites, of colloidal dimensions, with a packing density of about 9 g./cc. This disaggregated tungsten carbide is characterized by a specific surface area of from 3 to 15 square meters per gram and consists predominantly of ultimate crystals ranging from 10 to 60 millimicrons. Some of the crystallites are still linked as aggregates at this point but all such aggregates are less than half a micron in average diameter, and usually contain only a few crystallites of tungsten carbide. Such starting material produces anisodimensional tungsten carbide grains in the dense bodies of this invention under conditions set out hereinafter.

Anisodimensional tungsten carbide platelets are formed when very finely divided, very uniformly divided tungsten monocarbide powder, free from larger particles which may serve as nuclei for crystal growth, is heated to bring about recrystallization. The temperature required depends on the initial size of the tungsten carbide crystals and the amount of cobalt or other metal that is present. When essentially all the crystals of tungsten carbide in the starting powder are less than about 0.5 micron in diameter, and preferably when 90% of the crystals are between 10 and 60 millimicrons, recrystallization at high temperature results in the formation of platelets or other anisodimensional shapes of crystals. But if an appreciable amount of the starting tungsten carbide powder, such as 1 to 5% consists of crystals or fragments of crystals appreciably larger than the average size, such as those ordinarily obtained by grinding commercial tungsten carbide powder, then at high temperature, recrystallization occurs in such a way that the larger crystals grow as the smaller ones disappear, and since such larger crystals are not initially anisodimensional they grow more or less uniformly in all directions without becoming anisodimensional.

To obtain anisodimensional tungsten carbide platelets, it is thus preferred that the starting powder of tungsten carbide have a unimodal size distribution and contain less than 5 percent by number of crystals larger than 1 micron and most preferably less than 1 percent by number of crystals 0.5 micron or larger in size.

The composition of tungsten carbide powder can be established by the ordinary analytical procedures for tungsten, carbon and oxygen. It is desirable for the purposes of this invention that the oxygen content of the dried powder be as low as possible, preferably lower than 0.5%, and that the combined carbon content should correspond to from about 80 to just slightly less than 100 percent of the thereoretical value for tungsten carbide WC, of 6.12% carbon by weight. Powders having a carbon content of as low as 81% of theoretical for WC, can be used with an amount of 30% by weight of cobalt binder, but if less cobalt is employed, powders less deficient in carbon are much preferred. It is also important that essentially all the carbon be combined in the tungsten carbide lattice; no more than 0.3 percent and preferably less than 0.1% uncombined carbon should be present in the powder. Under some circumstances it is possible to include larger amounts of free carbon in the starting powder, but this increases the probability of leaving unreacted free carbon in the product, which is undesirable. The total carbon content ordinarily should not be so high as to cause the carbon content in the final composition with cobalt to exceed that theoretically required for the WC content.

The uncombined carbon content or free carbon content of tungsten carbide can be determined by dissolving the tungsten carbide in a 1:3 mixture of nitric and hydrofluoric acids which oxidizes and dissolves the tungsten carbide but does not attack the free carbon. The solution can then be diluted and filtered through a Gooch crucible which is then washed, dried, and weighed. After weighing the crucible it is fired to remove the carbon and is then weighed again. The loss in weight on firing, after correction for and standard blank loss, is the weight of free carbon in the tungsten carbide sample. Alternatively the carbon is burned and the carbon dioxide is determined.

The particle size can be determined by any of the methods familiar to the art. Thus in characterizing the tungsten carbide powders of this invention, the number average particle size can be determined by direct observation of electron micrographs. It can also be calculated from the specific surface area as determined by nitrogen adsorption data as described in "A New Method for Measuring the Surface Area of Finely Divided Materials and for Determining the Size of the Particles," by P. H. Emmett in "Symposium on New Methods for Particle Size Determination and the Subsieve Range," Philadelphia; American Society for Testing Materials, 1941, p. 95.

The various tungsten carbide particles involved in this invention are microcrystalline and are readily characterized by X-ray diffraction analysis of the powders.

Methods of characterizing such particles are fully explained in copending application Ser. No. 250,442, referred to above.

An estimation of particle shape can also be made by the X-ray diffraction method as decribed by J. Jirgensons and M. E. Straumanis in "A Short Textbook of Colloid Chemistry," second revised edition, published by the MacMillan Company, New York, 1962, p. 256.

An estimate of crystallite size can be calculated from the line broadening of the X-ray diffraction lines as described by B. D. Cullity in "Elements of X-ray Diffraction," Addison-Wesley Publishing Co., Inc., Reading, Mass., 1959, pp. 261–263.

The average crystallite size as determined by X-ray line broadening of the diffraction lines is less than the average diameter calculated from nitrogen surface area measurements and the magnitude of the difference is directly related to the degree of aggregation of the ultimate crystals. The more extensive the aggregation, that is the larger the number of intercrystalline bonds, the less surface available for nitrogen adsorption.

The nature and size of the colloidal tungsten carbide aggregates and anisodimensional grains is also ascertained directly by observation of electron micrographs for purposes of characterization, and can also be determined by sedimentation techniques.

(2) Cobalt.—Cobalt suitable for use in this invention includes any source of cobalt metal which can be used to prepare an interdispersion of cobalt with tungsten carbide powder. Thus a form of cobalt readily suited for use in this invention is cobalt metal in the form of a finely divided powder which can, if desired, be further reduced in size by ballmilling with the tungsten carbide. Commercially available metal powders such as "Cobalt F" sold by the Welded Carbide Tool Co. are suitable. The metal to be used should be of high purity, preferably more than 99.5% pure cobalt, and should be free from any of the impurities known to be harmful to the properties of cemented tungsten carbide.

The amount of cobalt metal present as a binder in the bonded compositions, as previously stated, ranges from about 1% to about 30% by weight. A preferred amount of cobalt being from 3 to 30% by weight. Such cobalt levels provide very desirable compositions for cutting or forming cobalt metals such as steel.

A particularly preferred amount of cobalt binder in the hard bodies of this invention is from about 3 to about 15% by weight based on the total weight of the composition. Bodies containing an amount of cobalt falling within this range have a very desirable combination of strength, hardness and toughness and display great strength for a given hardness as compared to commercial cemented carbides.

Bodies of this invention containing an amount of cobalt of from 1% to 3% are also preferred compositions, possessing exceptional chemical and wear resistance as well as unusual hardness and strength for compositions with such a low cobalt level.

Cobalt-bonded tungsten carbide containing from about 15 to about 30% by weight of cobalt are also preferred as they have high hardness and toughness making them very desirable for special uses where they are subject to impact as in dies.

Another preferred embodiment of this invention is a body containing from about 8 to 15% cobalt metal binder. Such bodies possess an outstanding combination of high temperature strength and hardness which makes them very useful for cutting tool bits and other refractory uses at temperatures where hardened steel alloys lose strength and hardness.

The most preferred amounts of cobalt in compositions of this invention is from 9 to 12% by weight. Such compositions demonstrate the greatest combination of strength and hardness and are most useful as cutting tool bits.

Powder interdispersions of cobalt and tungsten carbide (1) Methods of mixing the raw materials. The cobalt and tungsten carbide suitable for use in this invention must be intimately and homogeneously intermixed to form what I term the cobalt/tungsten carbide powder interdispersion, before they can be fabricated into the dense cobalt-bonded tungsten carbide bodies of this invention.

In order to distribute cobalt homogeneously throughout tungsten carbide, extensive ballmilling with metal is ordinarily employed.

For interdispersions containing only one or two percent cobalt, colloidal, milled tungsten carbide can also be interdispersed with cobalt by dispersing the tungsten carbide in a suitable fluid such as normal propyl alcohol, and mixing the dispersion with a dilute solution of a salt of the cobalt to be incorporated such as an alcoholic solution of cobalt acetate. Adsorption of the cobalt ions causes aggregation of the dispersed tungsten carbide, which can then be readily recovered and dried. Throughout the milling, purification, incorporation of the cobalt, recovery and drying, air should be excluded from the compositions of this invention by maintaining an inert atmosphere of nitrogen or argon in the equipment. Following the above steps the mixture is reduced in hydrogen.

Another suitable method of interdispersion is that disclosed in my copending application Ser. No. 629,428 filed Apr. 10, 1967.

Preparation of compositions containing more than 1% cobalt is best accomplished by milling fine tungsten carbide powder, preferably consisting of ultimate particles having an average diameter of less than 100 millimicrons, with a suitable cobalt powder in a liquid medium. It is preferred to use a mill and grinding material from which a negligible amount of metal is removed. It is generally preferred to use ballmills or similar rotating or vibrating mills. Suitable materials of construction for such mills are steel, stainless steel, nickel, or nickel-steel alloys. Mills plated on the inside with nickel or lined with cobalt-bonded tungsten carbide, are also satisfactory. The grinding medium which is more susceptible to wear than the mill itself, should be of a hard, wear-resistant material such as a metal-bonded tungsten carbide. Cobalt-bonded tungsten carbide containing about 6% cobalt is preferred. This can be in such forms as balls or short cylindrical rods about one-eighth to one-quarter inch in diameter, which have been previously conditioned by running in a mill in a liquid medium for several weeks until the rate of wear is less than .01% loss in weight per day. Mill loadings and rotational speeds should be optimized as will be apparent to those skilled in the art. However, the proportion of charge to milling medium is preferably low, as illustrated in the examples which follow.

In order to avoid caking of the solids on the side of the mill, a sufficient amount of an inert liquid medium is ordinarily used to give a thin slurry with the tungsten carbide powder charged to the mill. It is preferred to use non-aqueous liquids which are inert toward the highly reactive surface of the colloidal particles. A liquid medium which is suitable for this purpose is acetone.

Ballmilling tungsten carbide in the presence of cobalt reduces the particle size of the tungsten carbide and distributes the cobalt uniformly among the fine particles of carbide. However, when more than two or three percent cobalt is present in the mixture it tends to minimize the attrition of the tungsten carbide. Thus, when higher cobalt levels are desired and it is necessary to reduce the particle size of the tungsten carbide, it is preferred to mill the tungsten carbide separately prior to interspersing the carbide with cobalt. Accordingly, to produce a milled mixture of tungsten carbide and cobalt in which essentially all of the tungsten carbide particles are smaller than about one micron and the tungsten carbide has a specific surface area of greater than three square meters per gram, it is preferred to start with tungsten carbide particles no larger than about ½ to 5 microns and whose specific surface area is at least 0.1 square meters per gram, and preferably at least 0.5 square meters per gram. It is most advantageous to start with the preferred colloidal tungsten carbide disclosed in copending application Ser. No. 250,442, since it is not necessary to mill that tungsten carbide before it is milled with cobalt.

The carbon content can be adjusted to within the desired range by the addition of suitable amounts of finely divided tungsten, ditungsten carbide or carbon to the mill, as will be evident to one skilled in the art. For example, in certain instances where the tungsten carbide is not sufficiently deficient in carbon or contains a small amount of free carbon, it is necessary to produce a carbon deficiency in the composition by adding a small amount of suitable material that will combine with carbon yet not leave an undesirable carbide in the product. Thus finely divided tungsten powder, preferably a micron or finer in particle size, can be added to the composition before milling. If only a small carbon deficiency such as an atomic ratio of carbon to tungsten of 0.99 or 0.97 is to be created, small amounts of other metals such as tantalum, niobium, zirconium or titanium can be used instead, but in determining the carbon to tungsten ratio in the final composition, the presence of small amounts of such added metals or their carbides must be taken into account in the analysis. The addition of such other metals to create an overall carbon deficiency is an alternative to the addition of tungsten in producing the products of this invention. Of such other metals, tantalum is preferred because its carbide acts as a grain growth inhibitor and enhances hardness at high temperatures. For compositions in which the carbon content is outside the desired range, batches may be blended, preferably in the mill, to achieve the desired composition.

Milling of cobalt/tungsten carbide mixtures is continued until the cobalt is homogeneously interdispersed with the finely divided tungsten carbide; most of the tungsten carbide is present as particles smaller than one micron; and the tungsten carbide has a specific surface area of at least 3 square meters per gram. The tungsten carbide can be analyzed and characterized by dissolving the metal with hydrochloric acid, and washing and drying the tungsten carbide powder. Homogeneous interdispersion is evidenced by the fact that it is essentially impossible to separate the cobalt from the tungsten carbide by physical means such as sedimentation or a magnetic field.

The mill is ordinarily fitted with suitable attachments to enable it to be discharged by pressurizing it with an inert gas. The grinding material can be retained in the mill by means of a suitable screen over the exit port. The liquid medium is separated from the milled powder such as by distillation and the powder is then dried under vacuum. Alternatively the solvent can be distilled off directly from the mill. The dry powder is then crushed and screened, while maintaining an oxygen-free atmosphere such as a vacuum, nitrogen or argon. It should be understood that the term inert atmosphere includes a vacuum or space filled with inert gas at low absolute pressure.

As the powder is being dried it goes through a sticky condition at which point it can be extruded or pelleted if desired. Formation of fine spherical pellets occurs if the slightly moist powder is passed through a 60 mesh screen and is gently shaken or rolled. A preferred form of powder made in this way consists of fairly uniform, spherical aggregates from 20 to 200 microns in diameter, depending on the forming conditions. These remain coherent even without addition of a binder or lubricant.

It should be noted that the very fine powder used in this invention contains components in a substantially colloidal state of subdivision and is much more reactive toward oxygen than coarser tungsten carbide powders which are milled with cobalt under the same conditions. Thus milled compositions of the prior art are generally handled in the air without becoming hot or burning and are not seriously contaminated by exposure to the atmosphere. While the powders dried from the milled mixtures of the present invention do not always ignite spontaneously when exposed to air, they nevertheless rapidly absorb oxygen and form oxides.

When such powders are heated, the oxides react with tungsten carbide to form carbon monoxide which is evolved, leaving the composition with a lower atomic ratio of carbon to tungsten. Excessive oxidation can thus lead to excessive loss of carbon and produce bodies in which most of the cobalt is no longer present as metallic binder, but as the brittle eta phase, $Co_3W_3C$.

In one of the perferred processes of this invention, the dry powder recovered from the milling process is kept out of contact with the atmosphere and is subjected to the further process steps without a reduction or carburization treatment. This can be done only when the milled powder is sufficiently low in oxygen, ordinarily less than one percent by weight, has the desired content of combined carbon, and contains no appreciable amount of free carbon, so that the resulting densified composition contains less than 1.0 atomic weight of carbon per atomic weight of tungsten. To obtain products with most homogeneous structures, there should be no more than 0.3 percent by weight of free carbon in the powder, and less than 0.1 percent is preferred for powders to be used in making the most preferred bodies of the invention.

If the dried milled powder is to be precompacted before being heated to above 1000° C., it is preferred to degas the powder, removing volatile materials by heating the loose powder in an inert atmosphere, preferably a vacuum, at from 400 to 700° C. At these temperatures there is essentially no sintering and the subsequently cooled powder remains soft and easily compacted under pressure. This is a desirable step when the powder is to be isostatically compacted under a pressure of 5000 to 60,000 pounds or more per square inch, so as to avoid disruption of the compact by gases when it is subsequently heated.

For making the preferred compositions of this invention which have an atomic ratio of carbon to tungsten in the range from about 0.97 to slightly less than 1.0, it is especially important that the interdispersed powder contain minimum oxygen and free carbon. For such products, when the dried milled mixture of tungsten carbide and cobalt contains over about 0.1 percent by weight of free carbon or more than about 0.5 percent by weight of oxygen, it is preferred to remove these impurities by treatment at a minimum elevated temperature in a very slightly carburizing atmosphere. The powder can be in a molded or precompacted state prior to this purification step.

Traces of oxygen as well as free carbon can be removed during this purification, and at the same time the combined carbon content can be adjusted, all by heating the powder in a stream of hydrogen containing a carefully regulated concentration of methane. The powder can be charged to shallow trays made from a high temperature alloy, such as Inconel, and the trays loaded directly from the inert atmosphere environment to a tube furnace also made from Inconel or some similar high temperature alloy.

The powder in a stream of the reducing gas is brought to a temperature ranging from 750° to 1000° C., depending on the metal content of the powder, in from three to five hours, taking half an hour to raise the temperature the last hundred degrees. For a cobalt content of about 1%, 1000° C. is used, and for powders containing 12% cobalt, the temperature is 800°–900° C.

The reducing gas should consist of a stream of hydrogen containing methane and about 10 percent of inert carrier gas such as argon. The proportions of methane to hydrogen are adjusted to provide a very slightly carburizing atmosphere at the temperature used, such that tungsten would be converted to tungsten carbide yet free carbon will be removed as methane. Thus, at 1000° C. the stream should contain 1 mole percent methane in hydrogen; at 900° C., 2 mole percent methane; and at 800° C., 4 mole percent methane in the hydrogen. The reduction/carburization at the maximum temperature is carried on for a period of 0.5 to 3 hours, and after cooling to room temperature under argon the powder is discharged to to an inert atmosphere environment where it is screened through a seventy mesh screen. If desired this powder can be stored for extended periods in sealed containers or it can be used directly in the next step of this process.

Samples for analysis should be taken without contact with oxygen or air and sealed in suitable vials. In view of their reactive surfaces, and the necessity to avoid contamination with oxygen, the powders are subsequently handled without contacting the atmosphere. The capacity of the powder to absorb oxygen is considerably reduced by the reduction-carburization step, especially when conducted at 900° C. or higher, and such powders which do not absorb more than 0.5% by weight of oxygen when exposed to air may, in most cases thereafter be handled in the atmosphere.

Care must be employed to assure that in the reduction-carburization step an excess of methane is avoided so that no free carbon is introduced into the powder. It is to be noted that although the reaction conditions are such that tungsten metal would ordinarily be converted to tungsten carbide, nevertheless very finely divided tungsten carbide used in this invention remains slightly deficient in carbon and is not carburized completely to a stiochiometric ratio for WC. It can be calculated from the density of tungsten carbide and the molecular weight, that a tungsten carbide powder having a specific surface area of 5 square meters per gram will have about 2 percent of the tungsten atoms on the surface. It is thus possible that a relationship exists between the small particle size of the tungsten carbide of this invention and its deficiency in carbon. It may be that each tungsten atom on the surface of these fine tungsten carbide particles combines on the average with less than one atom of carbon under the prescribed reaction conditions of this invention. Hence the powder would contain slightly less than one atomic weight of carbon per atomic weight of tungsten.

For compositions in which the desired atomic ratio of carbon to tungsten is less than about 0.97, and where oxygen is to be removed by the foregoing reduction step, methane or other carburizing environment should be avoided and only hydrogen used.

Generally speaking, wth compositions of higher cobalt content, lower atomic ratios of carbon to tungsten may be employed.

Since the effect of the carbon deficiency is to allow tungsten to dissolve in cobalt which strengthens the metal binder phase and renders it acid resistant, the more cobalt binder in the composition, the more tungsten needed and the lower the atomic ratio of carbon to tungsten desired in the compostion. Generally, the carbon deficiency is preferred to be such as to provide at least about 12% by weight of tungsten in solution in the cobalt phase, when the products of this invention are hot pressed by the recommended procedures.

However, the minimum atomic ratio of carbon to tungsten, $R_{min}$, is found to be $$R_{min} = 1.0 - 0.0062(P-1)$$

where P is percent by weight of cobalt.

An optimum ratio will be between this minimum and 1.0. Thus, for a composition containing 10% by weight of cobalt, for example, the minimum ratio is about 0.94 and excellent products are obtained with ratios ranging from 0.95 to more than 0.99. For a body containing 30% cobalt, ratios of around 0.85 to 0.95 are preferred.

A preferred maximum ratio of $R_{max}$ for most purposes is $$R_{max} = 1.0 - .00166(P-15)$$

where P is percent by weight of cobalt.

Interdispersion of finely divided cobalt and very finely divided carbon deficient powders of tungsten carbide can also be prepared by suitable mechanical blending, followed by heat treatment, as described below.

(2) Heat deactivation.—One of the preferred embodiments of this invention is a cobalt/tungsten carbide powder in which the cobalt is alloyed with 8 to 25 percent by weight of tungsten, the tungsten carbide has a specific surface area of greater than 0.5 square meter per gram, and which is not highly reactive with the oxygen in the atmosphere.

Although powders which have been reduced at temperatures up to 1000° C. are considerably less reactive chemically, even they must be further heated to a somewhat higher temperature to deactivate them before sufficient pressure is applied to cause the composition to conform to a carbon mold. Some pressure can be applied as long as the composition is not pressed tightly against the walls of the graphite mold as it is being heated.

In the case of unreduced compositions which have not previously been heated, it is possible to apply pressure while the composition is being heated in a non-carburizing mold, such as one made from or lined with alumina, without the product becoming carburized. However, in such instances the evolution of gas within the body as it is being heated under pressure and the fragility of mold materials other than graphite, make it difficult to produce a pore-free strong body of this invention.

I have discovered that the homogeneously interdispersed, carbon deficient, cobalt/tungsten carbide mixtures can be heat treated in an inert atmosphere or in hydrogen to inactivate them. The tungsten carbide in the powder interdispersion to be treated has a specific surface area of at least three square meters per gram; consists of crystallites or dense particles in the range from 10 to 1000 millimicrons in size; and contains from 0.8 to less than 1.0 atomic weights of combined carbon per atomic weight of tungsten. There should be present less free carbon than that required to raise the atomic ratio of carbon to tungsten to reach unity. Ordinarily free carbon content is maintained at less than 0.3%.

When this interdispersed powder composition is heated as prescribed, irreversible changes occur which result in the formation of a material which can be consolidated to dense bodies of exceptional strength and unusual resistance to removal of the metal by acid. The greater strength and acid resistance is due to a change in the cobalt binder which occurs when the compositions of this invention are heated to a critical temperature, namely the formation of a solid solution of tungsten in the cobalt phase. Such properties are not developed, however, unless the starting powder has the required characteristics recited above.

During the heating process, the composition can be in the form of a loose mass of powder or a molded compact formed by a preconsolidation step. The term "preconsolidation" is used herein to mean that the powder is consolidated before this heating step, to distinguish such compacting operation from the later consolidation step which is carried out at higher temperature to form dense compositions of the invention. During the heating step, the composition undergoes some sintering and the mass of powder, or molded compact of powder, undergoes some shrinkage. Also in the range from 400° to 900° C. gases are evolved from the powder.

It is especially important that when the composition is being heated for the first time it should not be subjected to excessive pressure or mechanical constraint, especially when in a graphite or carbon container. Pressure can be applied providing it is not sufficient to keep the sintering billet in intimate contact with the graphite walls of the mold. With some powders, a pressure of up to 1000 p.s.i.

can be applied during the heating step, since even under such pressure the billet shrinks away from the mold and is not seriously carburized. At this stage of the process excessive compression appears to cause irreparable harm. This may be caused either by shearing forces which disturb the internal structure of the composition at the beginning of recrystallization and sintering or it may be due to chemical effects from contact with material such as graphite which is ordinarily used to apply the pressure. Thus it has been observed that application of pressure to the composition while in an alumina mold is less harmful to the resultant bodies, even using pressures higher than 1000 p.s.i. The harm also may be due to trapping of gases in pores that are collapsed by the pressure. In the absence of pressure such pores would not normally become closed at this stage of sintering.

It is most surprising that if the composition is previously heated to the prescribed temperature it can thereafter be consolidated to density and molded by hot pressing in a carbon mold without absorbing undesirable amounts of carbon. I have found that after the tungsten has dissolved in the solid cobalt phase during the heat treatment it is much less readily carburized.

Heat treatment is carried out in an inert atmosphere. An inert atmosphere is one that does not react with the powder, such as argon, hydrogen or vacuum. Heat treatment is carried out at a temperature $T_s$ which is above 1000° C., but generally below the final consolidating temperature, $T_m$, and the treatment lasts for from $t_s$ to 20 $t_s$ minutes, where:

$$\log_{10} t_s = \frac{13250}{T_s + 273} - 8.2 \text{ minutes}$$

and $$T_m = \frac{6.5 - \log_{10}(P - 0.3)}{0.0039} \pm 100° \text{ C.}$$

where P=percent by weight of metal in the composition.

Thus the composition is heated to temperature $T_s$ and held for a minimum of $t_s$ minutes. The maximum time of heating is not critical at temperatures below which no appreciable grain growth of tungsten carbide occurs, namely below about 1200° C. However, above 1200° C., the time should not exceed about 20 $t_s$. For example, at 1000° C., it is necessary to heat for at least 2½ hours and preferably several times this long; at 1100° C. the composition is heated for at least 13 minutes; at 1200° C. the hold time is a minimum of about 5 minutes and not over two hours; at 1400° C. the hold time is less than 10 minutes, and at 1500° C. it is less than 4 minutes.

It is of course preferred to heat to a temperature $T_s$ intermediate between 1000° C. and $T_m$ and for a time that is convenient. Thus heating at around 1200° C. is preferred. However, the temperature $T_s$ that is selected and the rate of heating depends on the physical nature of the composition being heated. When the composition is a powder of finely pelleted material which is to be heated with minimum cohesion so that it can be used for subsequent molding, a slow heating rate such as 100° C. per hour to 900° C. and then 50° per hour to 1150° C. and a minimum heating temperature is preferred. In such instances an extended heating period is acceptable as the transfer of tungsten into the cobalt phase must be effected at as low a temperature as possible to avoid sintering the powder and to avoid formation of eta phase. On the other hand, if a preconsolidated composition is employed, it can be heated more rapidly and to higher temperature, requiring a shorter hold time.

When a powder which has not been heat-treated is pressed in a graphite mold by applying pressure above 1000 p.s.i. at 1000° C. and continuing the application of pressure while the temperature is raised to 1400° C., and then cooled rapidly, the dense body produced is no stronger or more resistant to acid than conventional tungsten carbide bodies of similar metal content. It has become carburized. However, if the powder is first heat-treated as described above, and then molded in the above way, a very strong acid-resistant product is obtained. Such a product has not become carburized during the pressing operation.

Heat-treatment of conventional powders of tungsten carbide and cobalt which fall outside of the limits prescribed by this invention such as particle size or carbon content, does not impart to such powders any advantage over the same materials lacking heat treatment and when heat-treated conventional powders are densified, only conventional properties are obtained.

It should be noted that the temperatures and times required to bring about the irreversible change in the compositions of this invention vary to some extent with the size of samples, dimensions of equipment, heating rates attainable and the like. For example, it is possible to carry out the heating step either on loose powder or preconsolidated billet while the sample is being heated to the temperature at which it is to be finally consolidated. Such heating should be carried out rapidly in the range above 1200° C., providing the sample is heated relatively uniformly throughout its volume. An integrated combination of temperatures and times equivalent to the fixed times and temperatures described, is in keeping with the spirit of the invention, and will be apparent to those skilled in the art.

As mentioned above, one of the preferred products of the invention is a heat-treated powder which can be used to prepare the strong acid-resistant bodies of the invention. The interdispersed tungsten carbide and metal compositions previously defined as being suitable for the heat-treating step, are prepared preferably as a fine powder of uniform size, especially as spherical aggregates of from 20 to 200 microns in diameter. Such a powder, preferably containing from 1 to 15% by weight of cobalt, is subjected to the prescribed heat-treating step under the specified conditions to bring about the above-described irreversible change, involving dissolution of tungsten into the solid cobalt phase. Using a powder which has already been reduced at 900° C. as previously described, further heating at a temperature such as 1100 to 1200° C. and a heating time of about an hour is sufficient to produce a composition which, although partially sintered, can still be broken apart to the original particles and which can be hot pressed to produce very strong bodies with a suitable low ratio of carbon to tungsten. A slow heating rate from 900 to 1150° C. and further heating for several hours at 1150° C. gives a free-flowing powder in which the spherical aggregates are individually sintered but not stuck together.

Such powders are one of the preferred embodiments of this invention as they can be employed to produce large billets of cobalt-bonded tungsten carbide of very high strength. One of the most preferred embodiments of this invention is such a powder which contains from 3 to 15 percent by weight of cobalt alloyed with from 15 to 25 percent by weight of tungsten based on the weight of cobalt, and which has a specific surface area for the tungsten carbide of greater than 1 square meter per gram. The tungsten carbide crystals in a heat treated powder are triangular platelets when the starting powder is the most preferred starting powder described above.

Once the powder has been heat-treated it is partially sintered and is particularly insensitive to condition variables such as the rate of heating, or the temperature at which pressure is applied. Thus the pressure can generally be applied to the powder in the mold at 1000° C. or 1100° C. and maintained throughout the heating period. However, it is important that the time at the maximum temperature $T_m$ be limited as will be later described, in order to avoid grain growth.

The heat treated powder can of course be mixed with conventional cobalt/tungsten carbide powders commonly used in the art. Such a mixture, when consolidated to a dense body, will demonstrate improved properties to the extent that the composition is made up of a powder of this invention.

The heat-treated powders of the invention are very stable and can be exposed to the atmosphere or stored for extended periods of time. They can be applied to surfaces to form wear resisting coatings by such methods as flame spraying or with the plasma torch.

Since the unusual characteristics of the composition of the invention appear to be permanent as long as the material is not overheated above $T_m$ as described, the scrap and trimmings from fabricating operations can be cleaned, crushed fine enough to fit into suitable molds and can be reconverted to useful dense bodies, which exhibit the unusual strength and high acid resistance of the original pressed bodies from which the scrap was produced. Such scrap in lump or powder form is therefore a suitable starting material for compositions of this invention. Such scrap as well as all other heat-treated powders of this invention are characterized by the presence of from 8 to 33 percent of tungsten disolved in the coblat.

Anisodimensional tungsten carbide

One of the preferred products of this invention is anisodimensional tungsten carbide platelets. These platelets are prepared by recrystallization of tungsten carbide powders under previously described conditions.

The term isodimensional means having the same dimensions, while anisodimensional means not having the same dimensions. A particle that is isodimensional is therefore one having approximately equal length, breadth and width. The term isodimetric is employed in the same sense, an isodimetric particle being one having equal diameters when measured in different directions. A sphere is perfectly isodiametric; a grain of sand or of sugar is approximately isodiametric and can also be described as being isodimensional. The size and shape of ultimate particles and their arrangement in aggretates is more fully described by Dr. A. Von Buzagh, in "Colloid Systems," published by the Technical Press, Ltd. (London, 1937).

Finely divided tungsten carbide of the prior art has been obtained by pulverising coarser crystals. The finely divided particles so obtained are, broadly speaking, isodimensional. When milled tungsten carbide is bonded with metal by the processes of the prior art to form hard, cemented carbide bodies, there occurs a recrystallization and grain growth of the tungsten carbide. By metallographic methods, the size and shape of the resulting carbide grains can be observed. A review of published micrographs of the grain structure of commercial cemented carbides, as well as examination of a range of cobalt bonded tungsten carbide products of commerce, indicates that the tungsten carbide grains are isodimensional. While in some instances the polished cross sections of individual grains indicate a length or maximum dimension two or even three times that of the minimum dimension, this is the exception rather than the rule. In micrographs, grains give the impression of being anisodimensional when a substantial proportion of the grains show a maximum dimension at least three times that of the minimum dimension.

For purposes of this invention, anisodimensional particles are therefore those having a maximum dimension at least three times that of their minimum dimension. Tungsten carbide particles which do not show at least this degree of anisodimensionality are difficult to orient by subjecting a hot plastic carbide mass to mechanical shear such as by hot working. Some of the products of the present invention are characterized as consisting largely of anisodimensional tungsten monocarbide crystals, of which the maximum dimension is at least three and preferably at least four times that of the minimum dimension. In such products the tungsten monocarbide grains, which appear to be crystals, are typically present as tringular platelets, the thickness of which is no more than ¼ and usually no more than ⅙ the length of the side of the platelet.

The anisodimensional particles of tungsten carbide of this invention range from 0.01 micron in thickness and 0.1 micron or so in length or breadth, up to ten microns in thickness and fifty microns in length or breadth. Preferred anisodimensional particles of tungsten carbide are from 0.05 to three microns in thickness and from 0.2 to twenty microns in length or breadth. One of the most preferred embodiments of this invention is anisodimensional tungsten carbide particles of from 0.05 to one micron in thickness and from 0.2 to four microns in length or breadth. The commonest particles are triangular platelets, although polygonal platelets are also observed. Under some circumstances, anisodimensional tungsten carbide can be formed as rods of triangular or hexagonal cross-section, but platelets are much more common in the products of this invention.

The temperature required for recrystallization of the tungsten carbide depends on the initial particle size of the tungsten carbide employed and on the metal content. An initial particle size of less than 500 millimicrons and preferably less than 50 millimicrons, with a specific surface area of at least three and preferably greater than six square meters per gram, appears to be essential. The presence of uniformly distributed metal such as cobalt promotes the recrystallization. With a tenth of a percent by weight of iron, nickel or cobalt present, recrystallization of colloidal tungsten carbide to platelets occurs in a few minutes at 1800° C. With six percent cobalt present platelets are formed in a few minutes at 1400° C.

The physical state of the starting powder is important. As previously mentioned it can affect the type of structure obtained in the pressed body. It is generally preferred to heat the very finely divided tungsten carbide powder in a light and uncompressed state, in order to obtain structures having particularly desirable combinations of strength, toughness and hardness when finally consolidated.

When more than a percent or so of metal is present, the platelets are sintered together at high temperatures, and can be recovered by extracting the metal and breaking apart the residual porous aggregated platelets. The platelets are patrially broken up in this process. In isolating the tungsten carbide platelets as a powder, it is thus preferred to make them either with less than a percent or so metal present during the recrystallization process, or with much metal present, such as forty percent by weight or more, so that the platelets are less densely packed and can be more easily separated after the metal has been extracted with acid.

Another important aspect of the process of forming anisodimensional tungsten carbide crystals by heating very finely divided tungsten carbide is that the starting powder should be as free as possible of coarse isodimensional crystals. Such crystals serve as nuclei which will grow to still larger undesirable isodimensional crystals in the final product. For this reason it is preferred to use colloidal tungsten carbide synthesized under uniform conditions of temperature and nucleation to give colloidal crystallites and particles of uniform size. Generally speaking it is impractical to isolate uniform sized particles of colloidal size from finely divided tungsten carbide obtained by ballmilling crystals larger than one micron in size. By isolating from such milled material a fraction containing a range of particle sizes from 10 to 100 millimicrons, and by heating this with less than a percent of uniformly distributed metal to a temperature of 1850° C. platelike particles can be obtained. Presumably this is true because even hundred millimicron size particles will recrystallize at this very high temperature. However, uniform-sized colloidal tungsten carbide made by chemical synthesis rather than by milling, recrystallizes to platelets at temperatures as low as about 1300° C.

As previously stated it is most preferred that the uniformity of the starting tungsten carbide powder be such that it have a unimodal size distribution and no more than 1 percent by number of particles be larger than .5 micron in size.

Consolidated bodies

Another of the preferred products of this invention are the dense cobalt-bonded tungsten carbide bodies. These bodies are characterized as containing 1 to 30 percent by weight of cobalt which in turn contains from 8 to 33 percent by weight of tungsten. They are further characterized by the tungsten carbide grains having a mean grain size of less than one micron with at least 60 percent of the grains smaller than one micron in diameter. They are further characterized by a loss in transverse rupture strength at 30° C. when heated in a vacuum to 1400° C. at 100° C per. minute followed by immediate cooling at 5° C. per minute to 700° C.

For a better understanding of the structure of the bodies of this invention it is helpful to visualize the relationship between the two components, the tungsten carbide and the cobalt metal binder. The bodies of this invention are made up of two interpenetrating continuous phases, the major one of tungsten carbide and the minor one which is predominantly cobalt. The latter is also referred to as a binder phase because it was thought that it surrounded and bound together the grains of tungsten carbide. Since it greatly contributes to the strength of the composition, it must, in fact, bind the structure together. I have found additional proof of this by accurately measuring the length of a thin bar of a tungsten carbide body of this invention, containing 10 percent by weight of cobalt, and then removing the tungsten carbide phase without disturbing the metal phase, which is porous but coherent, and measuring the length, of this metallic skeleton. I found that it is about two percent shorter than the original length, showing that in the original cobalt/tungsten carbide the metal phase was subjected to a two percent elongation. This shows that the cobalt in bodies of this invention is under considerable tension and strain, and that it thus keeps the tungsten carbide phase under compression and truly acts as a "binder."

The bodies of this invention characteristically contain an atomic ratio of carbon to tungsten of from 0.81 to less than 1.0, and more specifically from $$[1.0-0.0062(P-1)]$$

to less than 1.0 where P is the weight percent of cobalt in the body. While traces of free carbon can be present in amounts up to 0.3 percent as an impurity or inclusion it is desirable that the free carbon content be as low as possible, preferably less than 0.1 percent.

With a deficiency of carbon, a part of the tungsten carbide-cobalt bond may consist of eta phase, $Co_3W_3C$. However at low concentrations it is difficult to determine whether all or only part of the metal is present as eta phase and it is possible that none is in fact present. For example, the components of eta phase, namely tungsten carbide and tungsten, may be dissolved in the metal binder phase. The presence of tungsten in the metal phase is at least partly responsible for the unusual combination of properties of the products of this invention.

(1) Cobalt phase.—As shown by Kubota, Isheda and Hara in the reference mentioned above, a small decrease in the atomic ratio of carbon to tungsten to a ratio less than 1.0 in cobalt-bonded tungsten carbide remarkably increases resistance of the metal phase to dissolution in hydrochloric acid and this is due to the increased amount of tungsten in the cobalt phase. In fact, measuring the acid resistance, which reflects the tungsten concentration in the cobalt, is a simple and sensitive way to determine whether compositions of this invention, particularly those containing less than 15% cobalt, are carbon-deficient.

In order to confirm the amount of tungsten in the cobalt phase as indicated by its acid resistance, I have found it is possible to separate the cobalt phase from the tungsten carbide phase so it can be examined without interferenec from the tungsten carbide. The characteristics of the metal phase of the bodies of this invention include the following:

(a) Dissolved tungsten.—The cobalt phase contains an amount of tungsten that is related to the atomic ratio of carbon to tungsten in the body. The tungsten which is not combined with carbon as tungsten monocarbide, WC, could be present in one of the possible states which have been described in the prior art in carbon-tungsten-cobalt ternary systems, namely: metallic tungsten; various cobalt tungsten carbide phases such a kappa or eta ($Co_3W_3$), this latter also being known in some countries as "delta"; the intermetallic compound $Co_3W$; ditungsten carbide $W_2C$; or in solid solution in the face-centered cubic form of cobalt which is the main constituent of the binder phase.

In bodies of this invention it is preferred to have most of the tungsten which is not present as tungsten monocarbide, in solid solution in cobalt. By suitably relating the atomic ratio of carbon to tungsten to the cobalt content, maintaining the tungsten carbide in an unusually fine grain size, permitting at least some of the tungsten to dissolve in the cobalt phase before hot pressing and pressing and cooling rapidly I have found that it is possible to maintain a large proportion of the tungsten in solution in the cobalt and to minimize formation of eta and other solid phases.

I have found that if the tungsten content of the cobalt binder phase exceeds about a third of the metal binder phase by weight, it becomes very difficult to prevent the conversion of substantial amounts of the cobalt binder to the more brittle, although hard, eta phase. For this reason the atomic ratio of carbon to tungsten should be greater than about $[1.0-0.062(P-1)]$ where P is percent by weight of cobalt in the composition. A preferred lower limit is about $[1.0-0.004(P-1)]$.

On the other hand, the carbon deficiency must be sufficient to provide a measurable amount of tungsten to the cobalt phase, and the deficiency must be greater as the amount of cobalt in the composition is increased. Thus, for example, when the cobalt concentration is less than 15% by weight, only a minute carbon deficiency, scarcely measurable by analytical means, such as a carbon to tungsten atomic ratio of 0.99 will provide sufficient tungsten to render the cobalt acid resistant and contribute other advantages, including minimizing grain growth of tungsten carbide during hot pressing, and hardening and strengthening the cobalt phase. On the other hand, with 20 percent cobalt in the body a carbon to tungsten ratio of 0.98 is barely low enough and about 0.92 to 0.96 is preferred. A preferred upper ratio limit is $[1.0-0.00166(P-15)]$ when the cobalt content P is greater than 15.

In bodies containing up to 15% by weight of cobalt, a minimum of about 12 percent tungsten in the cobalt phase is preferably maintained, although as little as about 8% may be present. In bodies containing from one to 15% by weight of cobalt, as little as 8% by weight of tungsten in the binder phase provides significant acid resistance, although more is preferred.

In compositions containing from 15 to 30% cobalt, the metal phase forms a substantial proportion of the body and plays a more important role in contributing to the physical properties than in bodies containing less cobalt. Thus even a small increase in the hardness and strength of the metal phase means useful improvements in the corresponding properties of the overall composition. In bodies containing 30% cobalt, for example, as little as 8 percent by weight of tungsten in the metal phase usefully improves properties of the body, although at least 12% is preferred.

(b) Acid resistance.—The metal phase in the bodies of this invention is more acid resistant than the cobalt phase in bodies of the prior art and of commerce which are not carbon deficient. As shown by Kubota et al. in the reference cited above, the acid resistance is related to the amount of tungsten in the cobalt binder. The amount of tungsten in solid solution in the cobalt can be determined as described by Kubota et al. A preferred method is described hereinafter in the section on methods of characterization. The dense bodies of this invention are characterized as having a resistance to etching, R, of greater than 50 hours, where resistance is expressed in terms of number of hours required for concentrated hydrochloric acid to remove 0.25 milligram of metal per square centimeter of surface area per percent of metal present in the original sample.

The acid etch rseistance, R, is affected by factors such as the grain size of the tungsten carbide in the body. Generally speaking, the acid etch resistance, R, of commercially available cobalt-bonded tungsten carbide bodies is considerably less than 50 hours. The resistance of commercial bodies high in cobalt such as those containing more than about 10 percent cobalt is less than those containing lower amounts of cobalt, and is often as low as 5 or 10 hours.

While the bodies of this invention are characterized as having an acid etch resistance, R, of more than 50 hours, preferred bodies such as those containing 8 to 15 percent of cobalt and having an atomic ratio of carbon to tungsten of about 0.98 often exceed two hundred hours for R. Similarly bodies containing less cobalt, such as 3 percent, and having an atomic ratio of carbon to tungsten approaching unity display even higher acid etch resistance. Those dense bodies of this invention which contain large amounts of cobalt, such as 30 percent, are most acid resistant at carbon to tungsten ratios in the lower ranges such as 0.82.

While the acid resistance, as defined, is directly related to the amount of tungsten in solid solution in the cobalt, it will vary to some extent, especially in commercially available bodies with wide variations in cobalt content, such as three percent and thirty percent. However, for the dense bodies of this invention, the resistance as defined is relatively independent of the cobalt content and is related directly to the concentration of tungsten in solid solution in the binder phase. For an acid resistance of at least 50 hours, the cobalt phase should contain at least about 8 percent by weight of tungsten in solid solution. When 12 percent tungsten is present in the cobalt, the acid resistance is generally greater than 100 hours.

(c) Magnetic characteristics.—The magnetic susceptibility at low field strength, of the dense bodies of this invention is less than that of corresponding commercially available bodies containing equivalent amounts of metal. The magnetic properties are measured by an instrument known as the "Magne-Gage" by a method described in detail in the later section on methods of characterization. The magnetic susceptibility, as indicated by the "Magne-Gage" reading M, for commercially available cobalt-bonded tungsten carbide is greater than 21P, where P is the percent by weight of cobalt, while bodies of this invention generally have values of M lower than 21P. The preferred compositions of this invention which contain anisodimensional particles of tungsten carbide have M values of about 17P, while those containing predominately isodimensional particles have M values from 17P to about 21P.

Thus while the magnetic behavior is obviously related to the amount of cobalt present, the magnitude of the susceptibility is influenced by the particle size of the cobalt and by the degree to which it is alloyed with other components in the system. When anisodimensional particles of tungsten carbide are present, for example as platelets, the cobalt regions between the platelets tend to be flattened and thinner than when the particles are isodimensional, and this generally reduces magnetic susceptibility while increasing strength.

(d) Strength.—The unusual strength of the dense bodies of this invention is fully detailed in the subsequent sections. While the strength of the dense bodies of this invention is of course largely attributable to the skeletal strength of the tungsten carbide, the cobalt phase quite evidently contributes substantially to the overall strength.

Thus removal of the tungsten carbide from the dense bodies of this invention by anodic etching will result in a coherent metal structure where the metal content of the body was substantial such as 8 percent or more. Moreover removal of the metal from the dense bodies of this invention markedly reduce the transverse rupture strength of the remainder. Other evidence of the strength of the metal phase is the shrinkage of the remaining metal skeleton after removing the tungsten carbide as mentioned above.

(e) Hardness.—The hardness of the dense bodies of this invention, measured at ordinary and high temperatures is higher than that of commercially available tungsten carbide bodies of equivalent cobalt content. This is one of the most unique characteristics of the bodies of this invention. High hardness at high temperatures is of special importance in cutting tools.

A representative dense body of this invention containing 10 to 12 percent cobalt will measure 87 on the Rockwell A scale at 800° C., while commercially available tungsten carbide bodies prepared by methods of the prior art containing 12% cobalt have a hardness of only 75 Rockwell A, and even those commercially available carbides containing as little as 6% cobalt have a hardness of only 83 Rockwell A.

As with the strength, the unusual hardness of bodies of this invention is largely dependent upon the structure of the tungsten carbide skeleton which bears most of the load in the hardness test, which involves indentation by a diamond point. The hardness increases with finer grain size of tungsten carbide in the carbide skeleton. However, the metal phase also plays a role in determining hardness, in compositions containing more than 8 percent by weight of cobalt and especially those containing from 15 to 30 percent by weight. In such bodies the hardness of the metal phase also plays an important role in the overall hardness and increasing amounts of tungsten in solution in the cobalt-metal phase up to 25% or more by weight provides significantly higher hardness than found in comparable cobalt-bonded tungsten carbide bodies of the prior art which are not carbon deficient and which contain less than 8 percent by weight of tungsten in solid solution in the metal binder phase.

The extraordinary hardness of bodies of this invention also depends, in part, on the fact that the bodies are unannealed, but instead are cooled rapidly at more than 10 degrees and preferably at 100 degrees per minute immediately from the temperature at which they are hot pressed. Such rapid cooling, or quenching to below 700° C. minimizes grain growth of the tungsten carbide after the body has been consolidated to an essentially non-porous condition. Furthermore, it permits more tungsten to remain in solid solution in the cobalt, thus hardening the metal phase. Rapid cooling to obtain an unannealed structure is thus an important aspect of this invention in producing bodies which are unusually hard as well as strong.

(2) Tungsten carbide phase.—The tungsten carbide phase, also referred to as the tungsten carbide skeleton, contributes markedly to the outstanding properties of the dense bodies of this invention. In addition to some of the characteristics mentioned above, the tungsten carbide phase of dense compositions of this invention is characterized by the following properties:

(a) Carbon deficiency.—The compositions are characterized as containing an amount of carbon that is slightly less than that required to combine with the amount of tungsten that is present in the composition to form tungsten monocarbide. Such a composition is said to be carbon-deficient or "undercarburized." It is generally believed by those skilled in the art that undercarburized materials, owing to the appearance of the embrittling eta phase, exhibit a poor transverse rupture strength (see p. 145, "Cemented Carbides" referred to above). It is therefore surprising that the bodies of this invention are exceedingly strong.

For the preferred bodies of this invention which contain from 8 to 15 percent cobalt the carbon deficiency need be only slight. Thus the atomic ratio of bound carbon to tungsten in those bodies is from 0.95 to less than 1.0 and preferably about 0.97 or 0.98. Since during fabrication the bodies are commonly in contact with graphite at high temperature, the carbon content of the dense body, and the atomic ratio of carbon to tungsten are sometimes higher than in the intermediate powder from which the body was made. In determining the carbon content used for calculating the atomic ratio of carbon to tungsten, it is important to exclude small amounts of free carbon which may be present in microscopic inclusions as an impurity. This is done by subtracting the amount of carbon determined analytically as free carbon from the amount determined as total carbon.

(b) Strength.—The dense bodies of the invention are characterized by having a very high strength as measured by a transverse rupture test. The strength of commerically available metal-bonded tungsten carbide bodies with a carbide grain size of around three microns, for example, increases with metal content but the hardness becomes progressively lower, so that compositions useful for cutting tools generally do not contain more than about six or at the most, nine percent cobalt, for example. Such materials have the transverse rupture strengths around 250,000 or 325,000 pounds per square inch and hardnesses of 92 or 90 Rockwell A, respectively. With a cobalt content of 12% by weight conventional cemented tungsten carbide has a hardness of less than 90 and thus wears very rapidly when used in cutting tools.

The dense bodies of the present invention containing cobalt ranging from 8% to 15% by weight all have transverse rupture strengths in excess of 460,000 p.s.i. and Rockwell A hardness of over 90.0. Preferred bodies containing 8% to 15% cobalt have strengths of over 500,000 p.s.i. and in some instances as high as 550,000 p.s.i. without sacrificing hardness. Regardless of the cobalt content in the range from 1 percent to 30 percent by weight, bodies of this invention are characterized by having transverse rupture strengths in thousands of pounds per square inch where P is metal content in percent by weight, of at least $125+75P$, where P is 1 to 3; $284+22P$, where P is 3 to 8; 460 where P is 8 to 15; and $490-2P$, where P is 15 to 40.

Characteristically a body of this invention with a transverse rupture strength of 500,000 p.s.i. possesses a carbide skeleton with a strength of about 94,000 p.s.i.; a commercial carbide of the same original cobalt content characteristically will have a transverse rupture strength of 380,000 p.s.i. and a skeleton with a strength of about 46,000 p.s.i.

(c) Crystal arrangement.—Bodies of this invention include those containing oriented anisodimensional tungsten carbide particles, non-oriented anisodimensional particles as well as isodimensional particles which, of course, are nonorientable and mixtures of all of these.

The tungsten carbide skeleton is polycrystalline, consisting of many small crystals separated by grain boundaries scarcely visible when a polished section is etched with acid, which removes cobalt. They can be revealed by etching with a suitable reagent for dissolving tungsten carbide by methods known to those skilled in the art. Thus the individual grains making up the carbide skeleton can be distinguished by optical microscope and by surface replica examined by electron microscope.

The fine grain structure is a significant characteristic of the tungsten carbide in the bodies of this invention. The carbide grains, as measured in metallographic polysections described hereinafter, are less than one micron in mean or average grain diameter. In bodies containing isodimensional carbide grains, substantially all grains are less than four microns in diameter, at least 60 percent are smaller than one micron, preferably 80 percent are smaller than one micron, the mean grain size is less than one micron, preferably is less than 0.75 micron, and ordinarily the size distribution is unimodal. In bodies containing anisodimensional grains, a few grains may be as large as about fifteen microns in greatest dimension, but their smallest dimension or thickness is much less than the greatest, and the mean grain size of all the grains is less than a micron, and preferably is less than 0.75 micron. In bodies containing oriented platelets, the grain size is measured on a polished cross-section which is at right angles to the preferred plane of alignment of the platelets, which will be further described. If the pressing direction is known, the cross-section is thus parallel to the axis of the pistons of the press.

Figure 12:
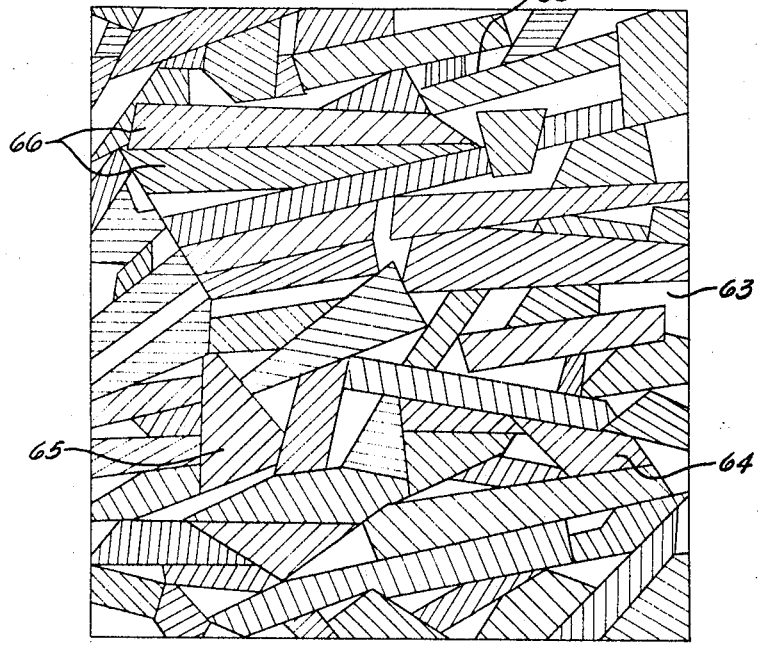
FIGURE 12 is a pen and ink drawing of an enlarged etched surface of a body of this invention. In this representation the discrete crystals of tungsten carbide are shown in a manner which emphasizes the interconnection and interlocking of the contiguous tungsten carbide crystals resulting in strong continuous, three-dimensional network of tungsten carbide within the cobalt-bonded structure.
Figure 13:
FIGURE 13 is a drawing of an actual photomicrograph of a polished etched surface of a body of this invention. The drawing depicts the larger contiguous and interconnected crystals of tungsten carbide interlaced with a three-dimensional network of finely dispersed cobalt phase. The drawing also illustrates some of the isodimensional shapes of the tungsten carbide crystals as well as the almost total lack of porosity characteristic of the bodies of this invention.

FIGURE 12 is a representation of the manner in which the tungsten carbide crystals are often joined and interconnected to result in a rigid tungsten carbide skeleton. Most of the tungsten carbide crystals, represented at about 20,000 magnification, are lying with their largest surface perpendicular to the surface of the paper. Thus edges of the crystals 62 and 66 are visible and appear oriented somewhat parallel to each other. Shapes 64 other than anisodimensional triangular platelets are visible as are triangular platelets 65 which are lying non-oriented with the other platelets. While some of the tungsten carbide crystals are contiguous over a large portion of their surface 66 most are touching but surrounded to various extents by an interpenetrating network of the metal binder 63. FIGURE 13 is a sketch prepared from a photomicrograph of a cobalt bonded tungsten carbide body of this invention at 20,000 magnification. The large majority of the visible surfaces are faces of tungsten carbide crystals 67 surrounded by other tungsten carbide crystals both large and small, and layers of an interpenetrating network of cobalt 68.

(3) Overall properties.—In addition to the properties and characteristics of the two principal phases discussed above, the consolidated bodies of this invention possess overall properties and characteristics which are not easily attributable to either phase individually. In addition to strength and hardness discussed above wherein the overall properties are perhaps the sum of the coaction of the individual phases there are other properties and characteristics as will be discussed below.

The bodies of this invention generally consist of the two independant, mutually interpenetrating phases or structures as described above. Their interrelationship is determinative of the body's microstructure.

(a) Microstructure.—There are several microstructural features which are characteristics of the consolidated bodies of this invention. These microstructural features in turn vary in accordance with alternative forms of the invention.

Thus the cobalt-bonded anisodimensional tungsten carbide bodies of this invention are characterized by a variety of cobalt-tungsten carbide relationships. When the body is fabricated under conditions which permit for little or no plastic deformation of the cobalt at high temperature the anisodimensional crystals will be present in a uniform non-oriented or random interdispersion of cobalt and tungsten carbide. Such structures are particularly suitable for use wherein they will be subject to multidirectional or compressive forces.

Alternatively, when fabrication conditions provide for subjecting the cobalt-bonded anisodimensional tungsten carbide composition to shearing forces while the composition is at a temperature such that it is sufficiently plastic to flow under pressure, the anisodimensional platelets are oriented within the cobalt matrix so that their faces lie substantially parallel to a common line. Such "regularly" oriented structures have an outstanding combination of strength and hardness and are particularly suitable for uses where a unidirectional force is involved.

By altering the fabrication conditions it is possible to obtain still other metal-tungsten carbide configurations which differ from both of the above systems. One such configuration consists of areas of cobalt-bonded oriented platelets of tungsten carbide similar to those of the paragraph above, throughout which runs a superstructure in the form of a three-dimensional network of metal-rich veins. Such "irregularly" oriented bodies are formed by cold pressing at low pressure, a cobalt-tungsten carbide powder reduced at 900° C. The cold-pressed powder is then partially sintered at an elevated temperature and is immediately hot pressed as described hereinafter. Such structures demonstrate an outstanding resistance to wear coupled with great durability when subjected to repeated compressive impact.

Figure 4:
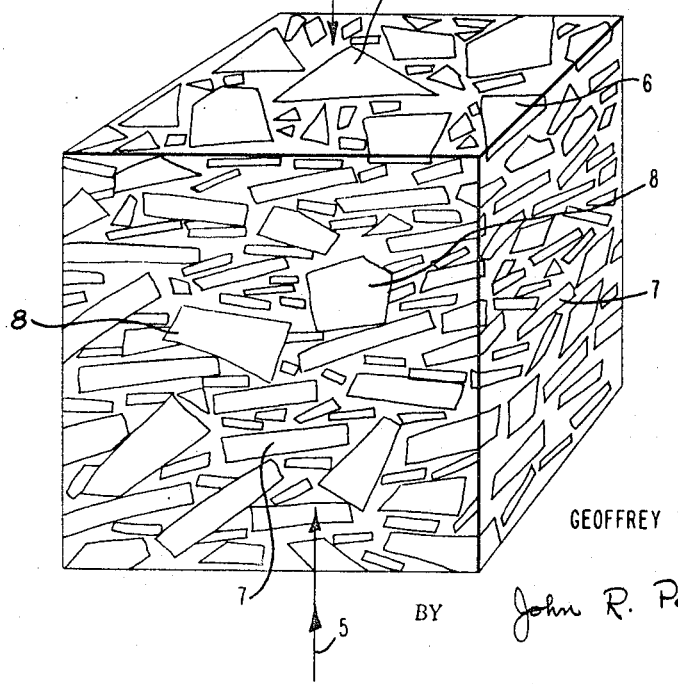
FIGURE 4 represents a cube of cobalt-bonded tungsten carbide body of this invention with all exposed surfaces polished and etched.

FIGURES 1, 2, 3, 4 and 8 show the orientation of anisodimensional tungsten carbide as explained in the above two paragraphs. FIGURES 1, 2, 3 and 4 exemplify "regular" orientation with most of the anisodimensional particles arranged with their edges 1 facing a common direction and their faces 2 also in a common direction. Anisodimensional particles which are not triangular 4 orient to some degree as well. The regular distribution of crystals and metal through the structures can be seen as in FIGURE 3. There 3 represents regular cobalt distribution throughout the crystals with only occasional occurrences of larger areas of metal such as 5. Even these larger areas contain some smaller oriented tungsten carbide crystals which are not shown in the drawing. FIGURE 4 represents a cube of dense cobalt-bonded anisodimensional tungsten carbide. The cube was cut from a body which was pressed from opposing directions 5. The exposed surfaces of the cube have been polished and etched and the flat surfaces of tungsten carbide platelets 6 are shown to lie parallel to the surface of the cube which is at right angles to the pressing direction, while the rectilinear edge of the platelet 7 is shown on the exposed surfaces of the cube lying parallel to the pressing direction. Other forms of anisodimensional grains are shown at 8.

"Irregular" orientation is exemplified in FIGURE 8 where again the anisodimensional tungsten carbide crystals have their edges 52 and 53 substantially oriented in a common direction. The areas of cobalt-bonded oriented tungsten carbide platelets 56, which have a configuration like that of the entire structure in FIGURE 3, are bonded together with a three-dimensional network or matrix of metal-rich veins 55 which can completely surround the areas 56 or can merely penetrate as an interconnecting network into a three-dimensional interconnecting network of the areas 57. As in the metal area 5 of FIGURE 3, smaller anisodimensional tungsten carbide grains are located in the veins 55 and the binder phase 54 of FIGURE 8, which are not pure metal areas.

In addition to the orientation effects observed in bodies of the invention containing anisodimensional particles of tungsten carbide, there are also microstructural features that are observed in bodies containing both isodimensional and anisodimension particles which, though difficult to observe in the final dense body can be seen in the material at intermediate stages of the process and which persist in the final body and contribute to the properties, especially toughness. One such microstructural feature has already been referred to above as "irregular" orientation and comprises a superstructure network of contiguous spheroidal regions of cobalt bonded tungsten carbide interpenetrated by a second superstructure of cobalt-rich veins. These features find their origin in the powder from the ballmilling step which is dried, and screened with an oscillating motion, and forms fine spherical granules of 20 to 200 meshes per inch in size, as previously described. Such granules, while being rolled about, tend to develop a skin or a surface on which the constituent powder is more compacted than in the interior. During the critical heating and sintering step of this invention, this more compact skin appears to sinter to form microscopic spherical shells in which the growing tungsten carbide crystals sinter together as a coherent layer. If sufficient mechanical pressure is applied to the granules, at any stage prior to the initial heating and sintering step, to break up the granules, the compacted skins are disturbed. However, these skins, once sintered, are stronger and more coherent than the rest of the material and hence persist even through the final consolidation step. Such shell-like or flake-like tungsten carbide aggregates, when present, contribute markedly to the outstanding strength and hardness of the bodies of this invention, since they are sufficiently coherent to permit the liquid cobalt-rich metal phase to be squeezed out to form tough interconnected veins of metal throughout the body during hot pressing. This behavior occurs only when the carbon deficiency is minimal and the tungsten concentration in the cobalt phase during hot pressing is low enough to permit the formation of sufficient molten eutectic metal phase to fill the space between the spherical granules, when the body is hot pressed under moderate pressure, but insufficient to squeeze out all the metal from the metal-rich veins.

Such bodies containing from 8 to 15% cobalt are an especially preferred product of the invention for uses where heavy impact is involved.

(b) Density.—The relation between the apparent density of bodies of this invention and their theoretical density as calculated from the volumes and individual densities of the components, permits an estimate of the internal porosity. The preferred bodies of this invention have an apparent density of over 99% of the theoretical density. Expressed in another way, the volume of a given weight of a preferred body of this invention is equal to the sum of the volumes of the components calculated from the weight of each component divided by its density.

However, some of the bodies of this invention have a fine-pored structure which nevertheless renders them very strong and useful. This is true even though their density is only 95% of theoretical. Thus even though the porosity is 5% by volume, the pores are so fine as to be invisible to the eye. The finer the pores, the less detrimental they are to strength and other physical properties. In some exceedingly fine-pored bodies, a uniform porosity of up to 5% by volume is actually advantageous in that improved resistance to thermal shock and even improved strength is observed in comparison with bodies that are 100% dense.

While slightly porous bodies are useful in special applications such as bearing surfaces, they are not generally satisfactory where maximum hardness and strength is essential, such as in metal cutting tips, and in metal punches.

(c) Electrical resistivity.—The specific electrical resistivity of consolidated bodies of this invention which contain anisodimesional grains of tungsten carbide is generally greater than commercially available carbide bodies of comparable metal content. Thus, cobalt-bonded tungsten carbide bodies such as used in commercial cutting tips have specific resistivities in the range from about 18 to 25 micro-ohm centimeters and do not show a regular change from three to 15 percent by weight of cobalt. On the other hand, bodies of the present invention in which the tungsten carbide particles are anisodimensional, show an increasing specific resistivity from about 25 micro-ohm centimeters for 2 percent cobalt to between 30 and 40 micro-ohm centimeters when from five to twenty percent or more cobalt is present.

In the bodies of this invention which contain isodimensional tungsten carbide particles the resistivity is somewhat less than when anisodimensional particles are present but is, generally speaking, higher than that of commercially available bodies. The higher resistivity may in part be related to the finer average grain size of the tungsten carbide particles in the bodies of this invention. However, the trace impurities present in the carbide to carbide grain boundaries may also have an effect. Generally speaking, bodies of this invention made from colloidal tungsten carbide made by reaction in fused salt have a higher specific resistivity of around 30 to 40 micro-ohms, while those made from fine tungsten carbide obtained by ballmilling tungsten carbide of commerce, have specific resistivities in the range from 20 to 30 micro-ohm centimeters.

(d) Impurities.—Foreign materials such as organic dirt, mineral dust and or fragments of enamel or glass such as from equipment should be scrupulously avoided in preparing the bodies of this invention. Organic matter can result in holes or inclusions of carbon in the final body; mineral materials such as silicates leave inclusions of glass which is very harmful because the inclusions cause localized internal stresses upon cooling, thereby contributing to brittleness. Other mineral dust as well as glass or enamel fragments are similarly deleterious. A particular impurity to be avoided is graphite or carbon which tends to be rubbed from walls of graphite molds or inadvertently deposited from vapors. Graphite causes localized carburized areas which in turn permits localized grain growth. Such areas are generally to be avoided, especially in measuring the grain size of the carbide. Similarly, carburization of powder at some stage in manufacture results in undersirable regions in the final structure. Thus for example if a portion of powder such as the outer layer in a graphite mold is carburized before it is pressed there may be found regions near the surface of pressed pieces which are no longer carbon deficient and show unusual grain growth.

Preparation of consolidated bodies

The consolidated bodies of this invention are prepared from the interdispersed cobalt/tungsten carbide powders described previously.

A preferred method of fabrication is by hot pressing the powders in a manner which is described below.

Various types of hot pressing equipment are known in the art and have been described in various publications. Depending on press design and desired operating characteristics, heating can be by resistance heating, dielectric heating, heating by hot vapors or gases, induction heating, or plasma torch heating. Extremely short heating times of a few seconds duration are attainable, by "resistance sintering under pressure," as described by F. B. Lanel, Trans. Amer. Inst. of Mining & Met. Eng., 158, 203 (1955), but such a technique is most applicable only to relatively small pieces.

Temperature can be measured very near the sample itself by means of a radiation pyrometer and cross-checked for accuracy with an optical pyrometer. Such instruments should be calibrated against primary standards and against thermocouples positioned in the sample itself so that actual sample temperatures can be determined from their readings.

Automatic control of heat-up rate and desired temperature can be achieved by appropriate coupling mechanisms between a radiant pryometer and the power source. Thermocouples, properly selected for the desired temperature range, can also be used, but pyrometers, even though somewhat less accurate, are more dependable and have vastly superior life.

The mold can be of a variety of shapes but is usually cylindrical, with a wall thickness of up to an inch or more. A round cross-section gives greater strength than square or other shapes. It is particularly advantageous to use a cylinder with a cross-section which is circular on the outside and square in the inside in pressing bodies to be used as cutting-tip inserts thereby fabricating them as near as possible to their final desired dimensions.

As an example, for a 1 inch diameter finished pressed round disc, the shell is cylindrical, 1 inch inside diameter, 1½ inches outside diameter, 4 inches in length. Thin graphite discs ¼ inch in thickness and 1 inch in diameter are loaded in the cylinder on top and bottom of the material to be pressed. The surface of the graphite discs in contact with the sample can have a small depression at the center to form a tip on the sample and keep it positioned in the center of the mold when it shrinks away from the sides due to sintering. Graphite pistons 1 inch in diameter and 2 inches long are then loaded in both ends of the cylinder in contact with the ¼ inch discs and protruding from the cylinder.

Graphite parts used in the press tend to oxidize at the pressing temperatures used, and it is therefore necessary to maintain an inert atmosphere or vacuum within the press. In addition to prolonging the life of the graphite parts, the use of a vacuum or an inert atmosphere makes it possible to remove the mold containing the hot pressed body from the heart of the induction heated furnace and cool the sample much more quickly than if it were left to cool in the hot zone of the furnace after shutting off the power. The press can be arranged to permit the mold to be removed from the hot furnace, and when this is done the mold cools very rapidly by radiation. Thus a mold removed from the furance at 1850° C. cools to dull red heat, about 800° C., in about 3 minutes. The cooling rate in an inert gas atmosphere is somewhat greater than in a vacuum, due to convection losses, but most of the heat loss is by radiation at the temperatures involved. The importance of rapid cooling in obtaining products of maximum strength will be further explained.

To avoid excessive oxidation leading to undesirable carbon deficiency, especially with powders not preheated or reduced, the powder should be loaded to the mold in a non-oxidizing atmosphere, preferably in a glove box filled with inert gas. The appropriate discs and pistons can then be inserted and the loaded mold can be handled with the contained powder essentially loosely packed or, for example, with no more pressure than can be applied to the pistons with the fingers. However, it is often convenient to apply about 200 to 400 p.s.i. pressure with a small press, to give a more compacted sample for greatest ease in handling and more uniformity.

In a preferred aspect of this invention, a cobalt-colloidal tungsten carbide powder is pressed at about 200 p.s.i. when it is loaded into the mold, brought to the maximum temperature with no pressure on the pistons, and held for 2 to 5 minutes at maximum temperature before applying any pressure. During the period at maximum temperature with no pressure applied, the body shrinks due to sintering. At the end of the period, the body attains 80–90% of theoretical density and, its diameter is about 60% of the mold diameter. The pressure is then applied, reaching maximum in 15 to 30 seconds, and the presintered body is reformed into conformity with the mold. Maximum pressure and temperature are applied until complete densification is attained, as indicated when movement of the rams ceases. This ordinarily does not require more than 5 minutes, and usually only one minute, after which the sample is immediately removed from the hot zone and permitted to cool rapidly by radiation to below 800° C. in about five minutes or less.

The conditions which give rise to the preferred dense cobalt-bonded bodies are quite important and should be precisely established for a particular composition and the type of structure desired.

Unduly long presintering times can be harmful due to excessive crystallite growth and the development of too extensive and rigid a cross-linked carbide structure. Too early an application of pressure can also be harmful because it brings the body into prolonged contact with the graphite mold causing carburization. Also in the case of bodies containing anisodimensional crystals of tungsten carbide, it tends to prevent orientation. Holding the sample for too long a time at maximum temperature should also be avoided, not only because of carburization but also since secondary crystallite growth tends to cause a coarsening of the structure and eventually the development of porosity. Cooling too slowly can also be detrimental since the sample remains at high temperature long enough for undesirable crystallite growth and structural changes to occur. This includes changes in the composition of the cobalt binder phase. Thus, with a low carbon content and the corresponding large amount of tungsten initially in the cobalt phase, a precipitation of eta phase occurs at elevated temperatures. This can be minimized by brevity of hot pressing and rapidity of cooling of the pressed product. Generally speaking, it is undesirable to have more than about a third of the cobalt converted to eta phase.

While it is preferred that the products of this invention be made by heating and sintering lightly compacted finely divided tungsten carbide-cobalt powders, followed immediately by application of pressure, it is sometimes desirable to carry out the sintering step as a separate operation.

Thus, in order to achieve maximum productivity from a hot press, the initial sintering step can be carried out in a separate furnace in an inert atmosphere. This can be accomplished in several ways. For example, the starting powder can be loaded or lightly compacted into molds to be later used for hot pressing, and then heated rapidly in an inert atmosphere to a temperature within from 50 to 200° of the final hot pressing temperature to be employed. The molds can then be removed from the furnace and permitted to cool, still under an inert atmosphere. Subsequently these sintered bodies can be hot pressed. Preferably, the mold and its partially sintered contents, while still hot, can be passed directly into a hot pressing operation, since this avoids heating the bodies twice.

As previously pointed out, still another fabrication variation is employed to obtain "irregularly" oriented structures which contain a network of cobalt-rich veins. For this variation the starting powder after reduction is pressed under 200–500 p.s.i. and then sintered to a point at which there is slight fusion of the aggregates, but short of complete fusion. At this point the body is relatively strong and coherent, the aggregates having been sintered until they are essentially non-porous, there still being pores in the body between the aggregates. This structure is then hot pressed at maximum allowable temperature under controlled pressure, squeezing cobalt into voids to form, as the pressure is increased, a network of cobalt-rich veins running around and between areas of orientation. Pressing should not be continued, since this squeezes the metal out of the veins.

It should be emphasized that the degree of sintering, where the sintering step is carried out as a separate operation, is very important, and oversintering will produce a powder or a partially sintered body in which the tungsten carbide crystals have grown together into a continuous tungsten carbide network which can be further molded or shaped only with difficulty. It is for this reason that one of the preferred processes of this invention involves simultaneous sintering, recrystallization to platelets and orientation of the platelets in a preferred direction while the mass is being molded to its final dense, non-porous form.

The maximum temperature at which the bodies should be pressed is largely dependent on the cobalt content, although the proper temperature is to some extent dependent on the size of the molded piece, the heating rate, and the available pressure as well. The compositions of this invention are conveniently subjected to a temperature of $T_m$ for a period of $t_m$ to $20t_m$ minutes, where $$T_m = \frac{6.5 - \log_{10}(P - 0.3)}{0.0039} \pm 100° \text{ C.}$$

and $$\log_{10} t_m = \frac{13250}{T_m + 273} - 8.2 \text{ minutes}$$

where P is the percent by weight of metal in the composition.

Thus, for compositions containing 6% cobalt it is about 1450° C., and for compositions containing 12% cobalt, it is about 1400° C.

It is preferred to bring the sample to the desired temperature as rapidly as possible. For example, a sample 1 inch in diameter can be heated to 1400° C. in 4 to 5 minutes, or to 1850° C. in 6 to 7 minutes, by introducing the mold into a preheated graphite block, the limiting factor being the rate of heat transfer from the graphite equipment via the mold to the sample. Rapidity of heating is especially important in compositions where the atomic ratio of carbon to tungsten is close to 1.0.

Pressure can be applied to the cobalt/tungsten carbide composition in a hot press through the action of remotely controlled hydraulic pneumatic rams. Applying pressure simultaneously through two rams to the top and bottom gives more uniform pressure distribution within the sample than does applying pressure through only one ram. An indicator can be attached to each ram to show the amount of ram movement, thereby allowing control of sample position within the heat field and indicating the amount of sample compaction. The end section of the rams, which are exposed to the high temperature zone should be made from graphite.

A variation of 100° from the mean specified temperature provides to some extent for the variables mentioned above. Thus, in order to attain temperature equilibrium in the interior without overheating the exterior, larger bodies require a lower temperature, which also permits a longer heating time. Higher temperatures and shorter times can be employed when high molding pressures can be used and smaller molded bodies are being made.

The most important factor in determining consolidation conditions is the physical nature of the heat-treated composition of the invention. When the composition is a heat-treated powder, for example, it can be loaded into graphite molds and heat and pressure simultaneously applied until the material reaches the recommended temperature range, $T_m$ at which the pressure is maintained for the specified time. The required pressure may be as low as 100 to 200 pounds per square inch for compositions such as those containing 15 to 30 percent by weight of cobalt and which are soft at the pressing temperature. Several thousands of pounds per square inch is required for bodies containing one to three percent cobalt, although pressures of not more than 4000 pounds per square inch are usually used where operations are in graphite equipment.

For compositions containing from three to fifteen percent cobalt the required pressure can also very according to the physical nature of the composition. Thus, if a sintered powder composition of the invention, which has been heat-treated at a temperature $T_s$ close to the maximum allowable temperature $T_m$ is used, a high pressure such as 4000 p.s.i. is preferably applied over a prolonged period, such as continuously, while the mass is heated from 1000° C. to temperature $T_m$.

On the other hand, if degassed powder is preconsolidated to relatively high density such as about 50% of theoretical density, so that voids or pores larger than about ten microns are eliminated, and this compact is then heat-treated at temperature $T_s$, it shrinks spontaneously to a coherent body free from macropores, and if $T_s$ is then raised to $T_m$, sintering continues and a relatively dense body is obtained which can then be molded by brief application of pressure at temperature $T_m$.

Compositions of the invention require application of pressure at the defined maximum temperature, $T_m$, to eliminate voids. In such instances the consolidation is carried out preferably until the body of the invention reaches a density of greater than 99 percent of theoretical, corresponding to a porosity of less than one percent by volume. However, for many uses even this degree of porosity may be too high. The porosity of the bodies of this invention is characterized by preparing polished cross-sections of the bodies for examination under a metallurgical microscope. Pores observed in this way are classified according to a standard method recommended by the American Society for Testing Materials (ASTM) and described on pp. 116–120 in the book entitled "Cemented Carbides," published by the MacMillan Company of New York (1960). Thus, bodies of this invention are preferably pressed until a porosity rating of A–1 is obtained especially when the material is to be subjected to heavy impact or compression. This corresponds to a density of essentially 100% of theoretical or a volume porosity of 0.1%. However, porosities as great as A–3 or A–4 are suitable for some uses, since such bodies nevertheless have very high transverse bending strength. In this case the density is about 98% and the porosity around 2%.

Pressures of from 500 to 6000 p.s.i. can be used in graphite equipment, but generally speaking not over 4000 p.s.i. can be applied without danger or breaking the equipment, unless the graphite mold and plungers are reinforced with a refractory metal such as tungsten or molybdenum.

Another procedure which permits a very efficient utilization of a hot press involves use of the sintered or heat-treated powder composition of this invention in which tungsten is dissolved in the cobalt phase. Such powder is ordinarily heat-treated in a separate furnace and then stored ready for use. It is loaded into a graphite mold, pressure is applied at a convenient temperature such as 800 to 1000° C. and application of pressure is continued as the temperature is raised as rapidly as practicable to the prescribed maximum. The prescribed maximum temperature and the pressure are maintained for the minimum time required to eliminate porosity in the body, but for not over $20t_m$ minutes, and the consolidated body is then removed from the hot zone. This procedure requires a minimum of time in the hot press and has the further advantage that the pressure is applied over a longer period of time, resulting in lower porosity.

Instead of loading a powder into a mold, preconsolidated compacts in the form of billets can be prepared and heat-treated and then loaded in a mold for hot pressing. Such heat-treated, sintered billets can also be shaped by rolling or forging in an inert atmosphere.

After final consolidation to a dense billet the compositions of this invention can be further shaped by bending, swaging or forging at about temperature $T_m$ in an inert atmosphere. Similarly, pieces can be welded together by bringing two clean surfaces together under pressure.

When the bodies of this invention are hot pressed, the sample is removed from the hot zone of the furnace and allowed to cool. The surroundings are at ordinary temperature and the sample cools from white heat very rapidly to dull red heat in a minute or so, and is below 700° C. in less than five minutes. As stated previously, the cooling rate may be as rapid as around 300 degrees per minute.

It have found that if the sample is left in the furnace and cooled at 5 degrees per minute from 1400° to 700° C., the transverse rupture strength of the cooled product is appreciably less than that of on an otherwise identical product which was cooled more rapidly. Preferably it is cooled at a rate faster than 10 degrees per minute. The difference in strength is at least 10 percent. Part of the oustanding strength of the product of this invention is therefore due to the fact that it is always cooled rapidly. Such a product is said to be "unannealed" or "quench strengthened." If a product of this invention is cooled slowly or "annealed," its strength can be brought back up to normal by reheating and cooling rapidly as described above.

Such rapid cooling, particularly in the range above about 1300° C. is most essential for compositions which are especially susceptible to grain growth, namely those having an atomic ratio of carbon to tungsten greater than 0.99.

Additional methods of fabrication are of course suitable to achieve a high degree of orientation for anisodimensional tungsten carbide platelets. These include orienting the platelets after fabrication such as by hot swaging, and orienting the platelets during fabrication such as by hot extrusion.

Figure 7:
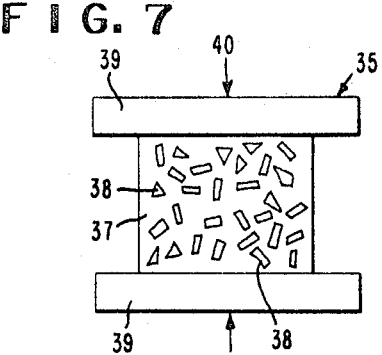
FIGURES 7 and 7A are diagrams of one method of orienting anisodimensional tungsten carbide particles of this invention.
Figure 7A:
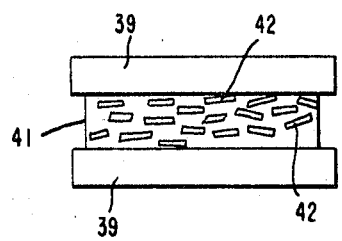

Thus when the crystallization of the colloidal tungsten carbide powder admixed with metal has reached the point where platelets are present, the latter may be oriented in a preferred direction by subjecting the plastic mass to shearing forces. For example, the hot plastic mass in the form of a cylindrical billet can be flattened by pressing the billet between two flat surfaces as illustrated in FIGURES 7 and 7A wherein 35 represents a surface to which pressure is applied. The heat softened mass 37 of metal and anisodimensional tungsten carbide shown in highly magnified form 38 is pressed between plates 39 in the direction represented by the arrows 40. Thus the mass is flattened to a billet shown in the cross-section 41 and the anisodimensional platelets shown in magnified form, 42, particularly those half-way toward the periphery of the flattened mass, are substantially oriented with their faces perpendicular to the pressing direction.

Figure 7B:
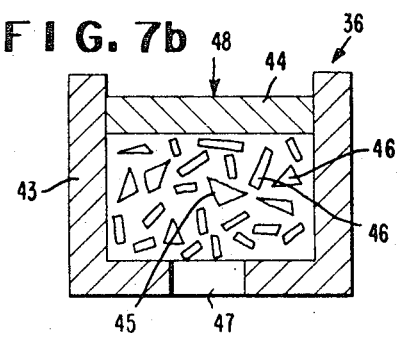
FIGURES 7B and 7C are diagrams of another method of orienting anisodimensional tungsten carbide particles of this invention.
Figure 7C:
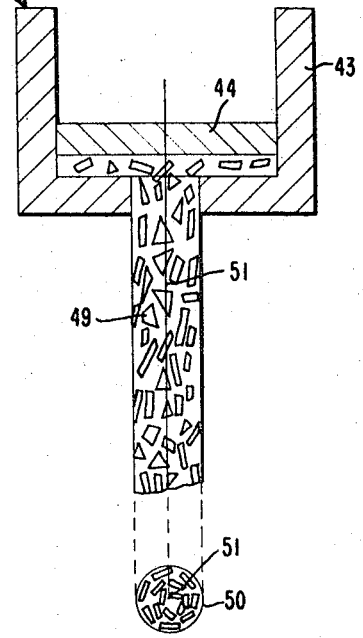
Figure 8:
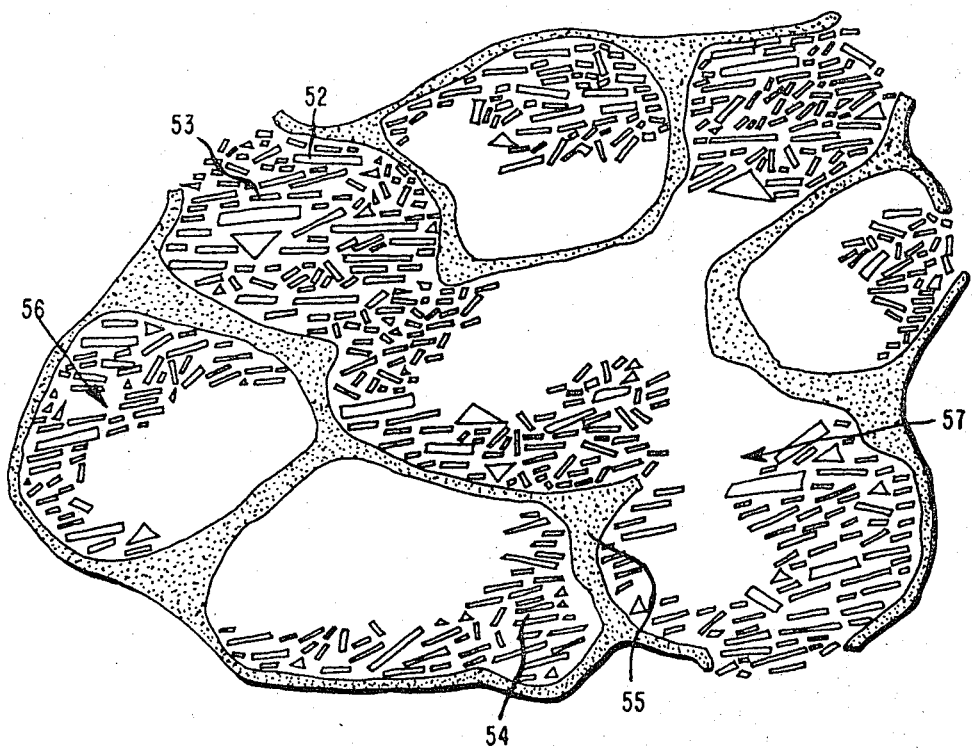
FIGURE 8 represents a polished etched surface of a cobalt-bonded tungsten carbide body of this invention showing an "irregular" orientation characterized by regular occurrence of metal-rich areas.

Alternatively, extrusion of the heat-softened mass 45 through an orifice 47 as illustrated in FIGURES 7B and 7C wherein the body of the mold is 43 and the piston is 44, by exerting pressure 48, on the mass, causes the anisodimensional tungsten carbide platelets 46, shown in highly magnified form, to align themselves 49 parallel to the direction of extrusion 48 and parallel to the axis 51 of the extruded mass. Thus a cross-section of the extruded mass 50, taken perpendicular to the axis 51 of the extruded mass presents a view of the edges of the platelets shown highly magnified with their faces parallel to the line 51 of the central axis of the extruded mass. Similarly, if a hot billet of metal-bonded anisodimensional tungsten carbide is flattened by rolling, there will be an orientation of the platelets parallel to the direction of elongation.

The particular method selected for bringing about the orientation depends upon such factors as the metal content of the composition. Compositions containing about 10% or more of metal can be oriented by extrusion, and those containing more than about 25% of metal can be oriented by hot rolling, providing not too great a reduction in thickness is attempted per pass. The degree of orientation in extruded rods may be further improved by swaging, particularly in compositions containing more than about 20% metal. Other methods of obtaining orientation are by hot forging or hot coining.

It is important that orientation be accomplished before tungsten carbide recrystallization has proceeded to a stage in which the platelets have grown together into a rigid, three-dimensional network of tungsten. Subsequent deformation of such a mass during molding tends to cause fracturing of the carbide network which reduces the strength of the final body. In some instances, the platelets in the network can be broken apart sufficiently to be oriented, but if recrystallization has been essentially completed, the oriented platelets do not grow together into a new network. In compositions where recrystallization to platelets has been completed, the mass may be broken up and reduced to a powder that will pass a screen of 100 meshes per inch, and then mixed with more of the original powder that has not yet been heated; the mix can then be heated and molded before the added powder has completely recrystallized.

Methods of characterization (1) *Chemical analysis.*—The chemical composition of the bodies of this invention can be determined by conventional chemical analysis for the elementary constituents. In addition, uncombined carbon can be determined by the procedure described for the aggregated colloidal tungsten carbide powders. Samples can be pulverized as in a Plattner steel mortar and screened before sampling for analysis.

The determination of oxygen content can be made with an oxygen analyzer, such as Leco No. 534–300, supplied by the Laboratory Equipment Corporation.

Analysis for tungsten can be made by completely oxidizing the sample, heating it in air, and fusing the mixed oxide residue with potassium nitrate. Tungsten is separated by precipitation with cinchonine reagent, from a solution of the fusion product and determined gravimetrically by ignition of the organic complex to tungstic oxide.

Analysis for cobalt can be made such as by oxidizing the sample, as above, and fusing the oxide residue with potassium pyrosulfate. A solution of the fusion product is made basic with sodium carbonate, to precipitate cobalt hydroxide. The hydroxide is filtered, dissolved in hydrochloric acid and the cobalt determined by addition of an excess of ethylenediamine tetraacetic acid and back titration of the excess with standard zinc acetate solution, using xylenol orange as the indicator.

The method of measuring apparent density should be selected according to the type of specimen available.

A method for irregularly shaped specimens employs mercury displacement, as described by Maczymillian Burke, Roczniki chem., 31, 293–295 (1957), "Pyknometer for Determining the Bulk Density of Porous Materials," and further referred to in J. Am. Chem. Soc., 45 (7), p. 352–353 (1962), by the same author.

(2) *Examination with optical microscope.*—To examine homogeneity of the overall structure and detect gross inclusions or localized coarse grain structure polished surfaces can be examined quite satisfactorily at magnification up to 2000× with the light microscope. In order to examine individual tungsten carbide grains and their structural arrangement in consolidated bodies, it is advantageous to etch the polished surface with chemical agents which due to the different rates of chemical attack dissolve a thin layer from the exposed grains, enhancing the contrast between the tungsten carbide and metal phases and making grain boundaries more readily visible. Techniques commonly used for preparing tungsten carbide samples for optical micrography are described in "Cemented Carbides," at pp. 116–131.

Optical micrographs prepared at magnifications of 1000× to 2000× are most useful in detecting porosity, and the size, distribution and shape of the tungsten carbide grains larger than a few microns. Optical micrographs of surfaces in different planes of a given consolidated body enable anisodimensional grains to be identified and preferred orientation of such particles also becomes apparent.

More detailed examination of the grain structure and characterization of submicron size particles in the structure requires observation with the electron microscope ordinarily by replication techniques.

In addition to preparing polished, etched surfaces, the structure of the body may be studied by fracturing a sample and examining the fractured surface.

The fractured surface can also be accurately replicated using the two-stage technique described in an article: "Survey of Preparation Techniques for Electron Microscopy," Phillips Gloulampenfabrieken, Scientific Equipment Department, Eindhoven, Netherlands.

(3) *Examination with electron microscope.*—Because of the unusually fine-grained structure, especially in preferred bodies of the invention in which over half of the grains of tungsten carbide are less than 0.75 micron in diameter, it is necessary to use the electron microscope to measure the grain size. In order to measure the grain size of tungsten carbide both the boundaries between tungsten carbide grains and the tungsten carbide-metal phase boundaries must be outlined. Furthermore, the metal phase must be distinguished from tungsten carbide so that the former can be avoided when counting the grain size of tungsten carbide. A multi-step chemical etch accomplishes this objective. The following procedure is employed in characterizing the products of this invention.

(1) A flat, small surface, about 8 to 200 $mm.^2$, representative of the structure of the composite, is mounted in Bakelite or epoxy or other suitable potting material which is not attacked or softened by solutions used for subsequent etching, cleaning, or replicating.

(2) The sample surface is polished in a conventional manner through 1 micron size diamond to provide an essentially scratch free surface.

(3) The clean, dry, polished surface is etched by swabbing 10 seconds with cotton saturated with a solution of 10 grams of potassium hydroxide and 10 grams of potassium ferricyanide in 100 cc. water, followed by thorough water rinsing, alcohol rinsing and drying in a warm air blast. This etches boundaries between tungsten carbide grains and tungsten carbide-metal phase boundaries.

(4) The cobalt-rich metal phase is etched next by immersion in a solution consisting of 20 percent hydrochloric acid and 80 percent ethyl alcohol, usually for 3 or 4 minutes. Since the rate of dissolution of the metal phase depends on alloy compositions, the optimum etch time may vary for different samples, and may be adjusted as necessary to provide the best grain definition.

(5) For electron microscopy a two stage replica is made of the etched surface. The negative is taken by cellulose acetate solution. After drying, the replica is stripped and shadowed with chromium at about 60° between shadow direction and plane of replica in order to highlight subtle roughness. Then it is coated with 500 to 700 Angstroms of carbon by vacuum evaporation and deposition.

(6) Electron micrographs are taken on a representative area of the sample free from flaws and local heterogeneities such as cobalt-rich inclusions, coarse-grained areas around carbon inclusions, or localized concentrations of eta phase. A good quality electron microscope which has a resolution of at least 50 Angstroms is used. Electron micrographs are taken on 35 mm. film at 1500 times magnification and enlarged to 20,000 times magnification on 11 inch by 14 inch printing paper.

On the prints, tungsten carbide grains are recognized by surface smoothness and frequent near-60° and near-90° angles between adjacent sides. The cobalt-rich metal phase occupies a minor proportion of the area (about 20% of the area for 12% cobalt by weight) and is generally roughened by the etch so that it has a pebble-type surface. Also, it has very irregular boundaries and small angles between adjacent sides as it fills space between the tungsten carbide grains. The metal phase in the original sample, having been etched below the average plane of the tungsten carbide, is elevated relative to tungsten carbide on the negative replica. Hence, when the negative replica is shadowed with chromium, a short shadow is cast by the metal phase. Long shadows are cast by porosity or deep-etched pits or valleys and may be indicative of another phase, e.g., $Co_3W_3C$, which is not involved with grain size counting. In general, features which cause long shadows are to be ignored when counting tungsten carbide grain size.

The grain size and size distribution is determined from the enlarged electron micrograph following an extension of the method of John E. Hilliard described in "Metal Progress," May 1964, pp. 99–102, and of R. L. Fullman, described in the Journal of Metals, March 1953, p. 447 and ff. The etching and replication must be such that the electron micrograph permits one skilled in the art to distinguish between grains of tungsten carbide from areas of cobalt as small as about one-tenth micron.

Figure 14:
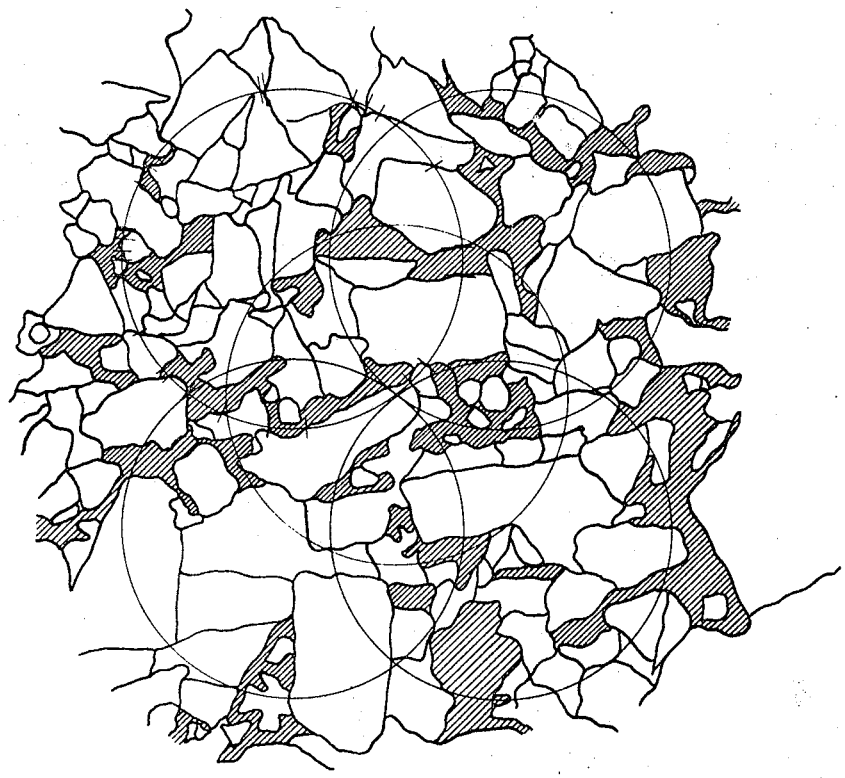
FIGURE 14 is a drawing illustrating the method used for measuring the grain size of the products of this invention.

To more exactly define the methods used in characterizing the grain size of tungsten carbide in the bodies of the present invention, an example of the procedure of measuring and calculating size is given below in detail. Five circles, each having a radius of 6.4 centimeters, are drawn in different areas of the micrographs printed at 20,000 fold magnification as illustrated at ½ scale in FIGURE 14. The circumference of each circle corresponds to 20 microns on the micrograph. Thus the scale factor is one millimeter respresenting 0.05 micron. The intersections made on this circle by the boundaries between tungsten carbide crystals and the boundaries between tungsten carbide crystals and the cobalt binder phase are marked around the circumferenue of the circle as shown on the upper left circle in FIGURE 14. In order to facilitate counting the tungsten carbide grains, the intersections with the cobalt binder regions are marked with a heavy solid line as on the upper left circle FIGURE 14. The intersections of the circumference with boundaries are marked on all five of the circles in the same manner as described for the circle above.

The length of the intersection on the circumference is measured for each of the tungsten carbide grains, and the measured lengths are tabulated in the following groups; 1–2 millimeters, 2–4 mm., 4–8 mm., 8–16 mm., 16–32 mm., and 32–64 mm. The numbers of grains in each of the size fractions for a typical product with unimodal size distribution is tabulated below:

| | Millimeters | | | | | | |
|---|---|---|---|---|---|---|---|
| | 1–2 | 2–4 | 4–8 | 8–16 | 16–32 | 32–64 | Total |
| Number of WC grains | 40 | 41 | 45 | 30 | 19 | 2 | 177 |
| Total lengths of intersections in millimeters | 61.5 | 129 | 273 | 344 | 438 | 70 | 1,315 |

The total length of intersections with tungsten carbide grains is obtained by adding together all the intersections measured, and this divided by the total number of grains gives an average intersect length as measured for a tungsten carbide grain.

$$\text{Average intersect length} = \frac{1315}{177} = 7.4 \text{ millimeters}$$

Multiplying by scale factor 0.05 micron per millimeter, the average intersect length, $d_m$, is 0.37 micron. This is converted to average grain diameter, $d_a$, by the formula of Fullman:

$$d_a = \frac{\pi}{2} d_m$$

In this example, $$d_a = \frac{\pi}{2} (0.37) = 0.58 \text{ micron}$$

The distribution of grain sizes can be calculated from the numbers of particles below a series of specified sizes. For example, about 63% of all the particles in the foregoing example are smaller than half a micron, 83 percent are smaller than one micron, and 99 percent were under 2.5 microns.

(4) Transverse rupture strength.—Many suitable procedures have been described in the literature for the measurement of transverse rupture strength. I prefer to use a modified twenty kilogram Ohaus triple beam balance for measuring transverse rupture strength at room temperature of 0.055±0.005 inch square bars about 0.75 inch long. The sample bars are supported on 0.25 inch diameter, round, cobalt-bonded tungsten carbide rods embedded in a steel block. These are spaced with a span of 0.5 inch, and are supported on the pan of the balance. The cross head consists of a round, cobalt-bonded tungsten carbide breaker rod, 3/32 inch in diameter. The breaker rod is rigidly held in contact with the mid-point of the test bar by a saddle above the sample. The load is applied by running lead shot into a bucket suspended on the balance arm until the sample breaks, the maximum load being reached in approximately 20 seconds. The load is calculated from the weight required to break the sample and the mechanical advantage of the balance beam.

The transverse rupture modulus, in pounds per square inch, is calculated from the following formula:

$$R = \frac{3We}{2bd^2}$$

where

R=modulus of rupture in pounds per square inch
W=total load in pounds at which the specimen fails
e=distance between the supports in inches
b=width of the specimen in inches
d=depth of specimen in inches (5) Magnetic characteristics.—The Aminco-Brenner "Magne-Gage," made by the American Instrument Company, Silver Spring, Md., is a device which permits quantitative determination of the relative force required to pull a magnet away from a specimen containing magnetic material.

The "Magne-Gage" is basically a torsion balance. From one end of the beam a small standard permanent magnet is suspended. Four different magnets of different strengths are used according to the material to be tested. For the cobalt-bonded carbide bodies, Standard Magnet No. 2 was used. When this magnet is placed in contact with a specimen containing magnetic material, the magnet end of the balance beam effectively becomes heavier due to the magnetic attractive force between the specimen and the magnet. Torque can be applied to the balance beam by tightening a helically wound spring until the torque just exceeds the magnetic attractive forces and the magnet pulls away from the specimen. The shaft used to tighten the spring is connected to a dial calibrated in arbitrary units. The reading on this dial at the the time the magnet pulls away from the specimen is thus directly proportioned to the magnetic attractive force between the magnet and the specimen.

Samples to be tested on the "Magne-Gage" are prepared with two roughly parallel sides each having a minimum dimension of at least ¼ inch and a minimum area of about 0.25 square inch and surface ground with a 100 grit wheel to expose a smooth flat representative surface. The surfaces should be cleaned of all oil or wax before being tested.

Without placing a sample beneath the magnet, the spring of the balance is tightened until the weight of the magnet is just compensated and the dial reading is recorded as the "zero-point reading."

The sample is placed under the magnet, and the "Magne-Gage" is lowered until the magnet guard contacts the specimen at least one-eighth of an inch from each edge of the specimen. The spring is tightened until the magnet "breaks away" from the sample and the dial reading is recorded. The procedure is repeated until 6 measurements have been made at each of several representative points across the surface.

The average "Magne-Gage" reading, M, is calculated by dividing the sum of all readings by the number of readings taken and subtracting from this value the zero-point value obtained above.

(6) Acid resistance.—The method of measuring the acid resistance of metal-bonded tungsten carbide bodies is as follows:

Samples to be tested are cut to small bars 0.06 x 0.06 x 0.55 inch in size using a 100 grit diamond saw, 0.022 inch in thickness running at a peripheral speed of 9000 feet per minute. Each sample bar is then cleaned and measured with a micrometer to the nearest 0.001 inch, weighed to the nearest tenth of a milligram, and then suspended separately from a glass rod by 26 gauge platinum wire, twisted tightly around each bar and looped around the glass rod to allow the samples to hang approximately one inch below the rod. Ten to twenty bars are suspended from a three inch long glass rod. To further clean the surfaces, the bars are suspended in boiling trichloroethylene for at least one hour. After being washed in water and acetone, the bars and attached wires are air dried for two hours and weighed to the nearest tenth of a milligram. The samples after being replaced on the glass rod are suspended completely below the surface of concentrated hydrochloric acid containing 35% by weight of hydrogen chloride, at 25° C. using 50 mls. of acid per sample. The container is covered and the acid is constantly agitated with a magnetic stirrer. The samples are removed periodically from the acid after measured time intervals ranging from one hour to several hundred hours, washed, dried, weighed, and the loss in weight measured.

Acid etch resistance is expressed in terms of the number of hours required for the acid to remove 0.25 milligram per square centimeter of surface area of sample per percent metal originally present in the sample. Thus with the size of test bar used in this test and with a sample containing 10 percent by weight of metal, the specified amount of metal will be removed when the bar loses 10×0.25 or 2.5 milligrams of weight per square centimeter of area. Since the area of the specified sample is about 0.9 cm.$^2$, the specified weight loss would be 2.5×0.9, or 2.25 milligrams.

In measuring acid etch resistance it is important to note that the test samples must be free from cracks or porous defects which can lead to low values of R. Also the surfaces must be cut clean and smooth, free from roughness or scratches. Properly prepared test samples have a bright, mirror-like surface.

The acid etch resistance, indicated as R, is expressed in hours and will be understood to be determined by this standardized test.

(7) *Tungsten content of the cobalt*.—A preferred method for measuring the tungsten content of the cobalt is to polish a section of sample, remove tungsten carbide by anodic etching for an hour in a solution containing ten percent by weight of potassium hydroxide and ten percent of potassium ferricyanide, rinsing and removing the residual metal binder layer which may contain strains from polishing, by dissolving it in a ten percent solution of hydrochloric acid, then again etching to remove tungsten carbide, thus leaving a film of metal binder a few thousandths of an inch in thickness. This is then examined by X-ray diffraction and the lattice constant of the cobalt determined. The percentage of tungsten in the cobalt is calculated, based on the information given in "Handbook for Lattice Spacings and Structure of Metals," vol. 1, p. 528, Pergamon Press, 1958, by W. B. Pearson. When no tungsten is present, the lattice constant of cubic cobalt is 3.545 Angstroms, and when the initial binder contains 21% by weight of tungsten and 79% by weight of cobalt in solid solution, the lattice constant is 3.570.

I have found that the metal binder phase may be isolated by electrolytically etching a body of the invention, using it as an anode, in the potassium hydroxide, potassium ferricyanide solution, for 24 hours at a current density of 3 amperes per square inch, then rinsing in water and removing the layer of cobalt alloy, which is from 0.005 to 0.010 inch in thickness and drying it at 60° C. under nitrogen. The tungsten content determined by X-ray diffraction from powder patterns, corresponds within the limit of error to the ratio of weights of tungsten to tungsten plus cobalt, determined by chemical analysis, providing no substantial quantity of $Co_3W$ or carbide phases are present. In this recovered metal phase, tungsten carbide and cobalt-tungsten carbide phases such as eta, $Co_3W_3C$ are determined by heating the sample in 35% hydrochloric acid at 80° C. for one hour, filtering and weighing the washed and dried insoluble residue which will contain the said carbides which are insoluble. If the intermetallic compound $Co_3W$ is present, it will dissolve in the acid; it is seldom present in the unannealed bodies of this invention.

(8) *Annealing test*.—The high strength bodies of this invention are unannealed due to the rapidity with which the body is cooled after it has been consolidated by hot pressing. Rapid cooling is essential to prevent grain growth in the tungsten carbide at temperatures above about 1150° C., and thus to preserve the strength and hardness, to minimize the formation of eta phases at temperatures above 1000° C. by reaction of the tungsten in solid solution in the cobalt with tungsten carbide and cobalt and to avoid formation of the intermetallic compound $Co_3W$ which forms below 900 or 1000° C. The presence of eta or $Co_3W$ in the metal phase correspondingly reduces the amount of ductile cobalt-tungsten binder phase and the properties of the body are changed accordingly. Rapid cooling is of greatest importance in bodies in which the cobalt phase contains over 12 weight percent of dissolved tungsten and the mean grain size of the tungsten carbide is less than one micron. In preferred rapidly cooled bodies, at least two-thirds of the cobalt remains in solid solution with tungsten in the metal phase.

The bodies of cobalt-bonded tungsten carbide of this invention are unannealed, and since part of their strength is due to rapid cooling, they may said to be quench strengthened. The unannealed or quench strengthened body of this invention is characterized by loss of strength by annealing or slow cooling. Thus, by heating a portion of the body to 1400° C. in a vacuum within a period of 10 to 15 minutes, then cooling it at no more than 5 degrees per minute to 700° C., then taking it from the furnace and comparing its strength at ordinary temperature with an unheated portion kept as a control, it can be determined if the body was unannealed. If the loss in strength is greater than 10 percent, the body is said to be quench strengthened. This is hereafter referred to as the "standard annealing test."

When eta phase is present in the body which is rapidly cooled, it is in a form rich in tungsten and corresponds to the conventional formula $Co_3W_3C$ which is reported to have a face-centered cubic lattice constant of 11.09 Angstroms. However, when such bodies of the present invention are slowly cooled from 1400° or 1300° C. at 5° C. per minute, the eta phase apparently absorbs cobalt or loses tungsten, so that the ratio of cobalt to tungsten changes from 3 to 3 to 3 to 2, and the lattice constant changes continuously from 11.09 to 10.75 Angstroms. The lattice spacing of the eta phase, when present, serves to indicate whether a body has been rapidly or slowly cooled.

(9) *Degree of orientation*.—As stated previously when the metal-bonded aniso-dimensional tungsten carbide compositions of this invention are hot worked, extruded, or otherwise subjected to shearing forces by flow, there results a preferred crystallographic orientation in the product. By this is meant a predominant orientation or lattice alignment as observed by crystallographic examination, as well as by micrographic examination of polished cross-sections of the compositions taken at right angles to each other.

When a rod is formed by extrusion, the faces of the tungsten carbide platelets will have a preferred alignment parallel to a common line which, in this instance, is the central axis of the extruded rod. On the other hand, when a billet is flattened, such that there is a plastic flow or deformation, the faces of the platelets will have a preferred alignment parallel to a plane at right angles to the pressing direction, but the platelets will also be parallel to any line on the plane. Thus, most broadly the alignment may be parallel to a line; or, expressed more specifically, to a referent selected from the group of a line and a plane. More narrowly the alignment may be parallel to a plane.

The preferred orientation of the tungsten carbide can be described by reference to the orientation of a crystallographic plane having such Miller indices as, for example (001). Thus when a billet is flattened under pressure, the platelets tend to become oriented with their faces perpendicular to the pressing direction. In such platelets, the orientation is such that the basal plane (001) is at right angles to the pressing direction.

A beam of X-rays parallel to the pressing direction will thus be perpendicular to the face or the (001) basal plane of a platelet that is oriented as described above. There is no recorded reflection (i.e. no diffracted beam) from the (001) plane under these conditions but two other planes with Miller indices of (113) and (103) in the tungsten carbide crystal give characteristic strong back reflections.

Figure 5:
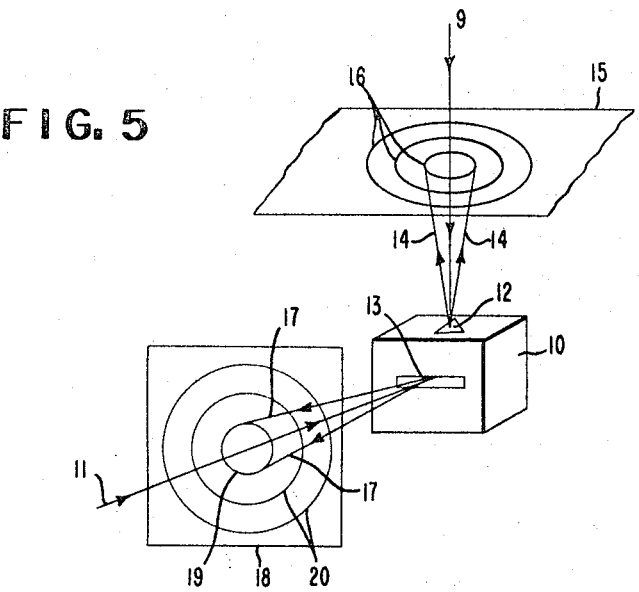
FIGURE 5 is a schematic representation of the manner in which X-ray diffraction patterns are made such as on the cube of FIGURE 4.
Figure 6:
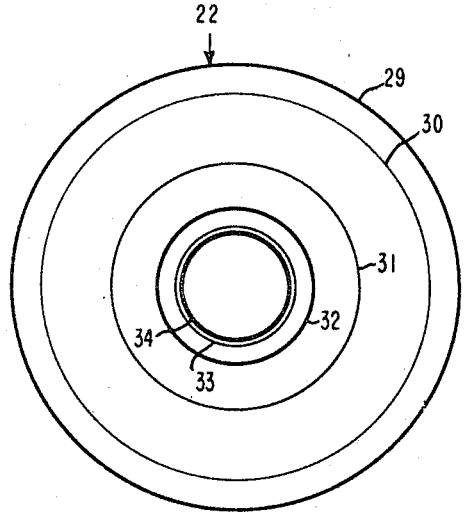
FIGURE 6 is a representation of the X-ray diffraction pattern taken on film 18 in FIGURE 5.
Figure 6A:
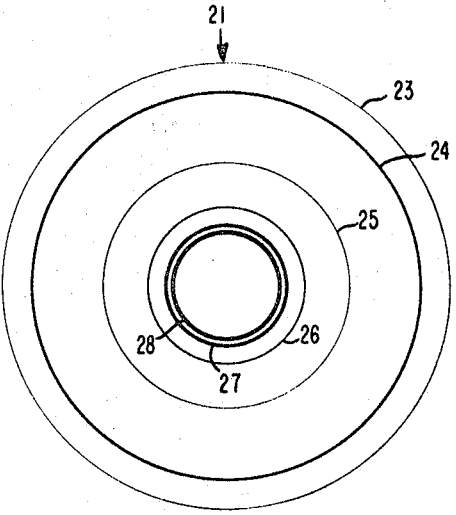
FIGURE 6A is a representation of the X-ray diffraction pattern taken on film 15 in FIGURE 5.

This may be more clearly understood by reference to FIGURES 5, 6 and 6A.

In FIGURE 5, a monochromatic beam of X-rays 9 is being projected at right angles to the surface of the cube 10, in a direction parallel to the original pressing direction. Another beam of X-rays 11 is being projected at right angles to 9 and in a direction perpendicular to the original pressing direction. The face of a representative triangular platelet 12 of anisodimensional tungsten carbide is shown magnified many times, on the surface impinged upon by X-ray beam 9. The edge of a representative triangular platelet 13 of anisodimensional tungsten carbide is shown magnified many times, on the surface impinged upon by X-ray beam 11. From X-ray beam 9 a cone of back-reflected X-radiation is shown registering on a photographic film 15, which after development is visible as concentric ring images at 16. Similarly from X-ray beam 11 a cone of back-reflected X-radiation is shown registering on a photographic film 18 which after development is visible as concentric ring image 19, while other X-radiation cones not shown produce concentric ring images 20.

In FIGURES 6 and 6A the diffraction pattern of concentric ring images recorded on film 18 of FIGURE 5 are shown in pattern 22 while the diffraction pattern of film 15 is shown in pattern 21. The circular lines of pattern 21, shown at 23, 24, 25, 26, 27 and 28 and the circular lines of pattern 22 shown at 29, 30, 31, 32, 33, and 34 depict the variation in intensity of the X-radiation reflected from the planes with Miller indices described above.

Lines 23 and 29 arise from the (211) crystal planes of tungsten carbide, 29 being the stronger. Lines 24 and 30 arise from the (103) crystal planes, 24 being stronger. Lines 25 and 31 arise from the (300) planes, 31 being stronger. Lines 26 and 32 arise from the (301) crystal planes, 32 being stronger. Lines 27 and 33 arise from the (113) crystal planes, 27 being stronger. Lines 28 and 34 arise from the (212) crystal planes, the intensity being about the same.

Thus, by measuring the relative intensities of the interference lines, which, in turn, correspond to specific crystallographic planes, it is possible to estimate the degree to which the orientation of the platelets approaches an ideal or perfect orientation in which all platelets would lie perfectly parallel to each other.

In a composition which has been oriented by extrusion through a round orifice to form a rod, the preferred orientation is such that the platelets of tungsten carbide lie with their faces parallel to the central axis of the rod. In this case if a cross-section of the rod at right angles to its axis is examined by projecting a beam of X-rays at right angles onto the surface of the cross-section, the X-rays diffracted from the (301), (300) and (211) planes will be relatively stronger, while those from the (113) and (103) planes will be weaker than when the platelets are randomly disposed.

For a more complete description of preferred orientation in metal, reference is made to "Structure of Metals," C. B. Barrett, McGraw-Hill (1952), chapters XVIII and XIX. Orientation can also be determined by standard X-ray diffraction techniques using the well known reflection method employing an X-ray diffractometer developed by Schult. This method is described in "Elements of X-Ray Diffraction," B. O. Cullity, Addison-Wesley (1956), pp. 29–295. Other accepted methods can, of course, be used.

In the oriented bodies of this invention the X-ray diffraction lines of tungsten carbide corresponding to the crystallographic planes having Miller indices of (113) and (103) and of (301), (300) and (211) exhibit different intensities when measured from two suitably selected surfaces of the composition lying at right angles to each other. If the direction of orientation is not known, it is necessary to measure the intensity of these lines reflected from two test surfaces at right angles to each other cut on a specimen over a range of orientations until maximum differences are found. This is a tantamount to establishing a pole figure.

The degree of orientation of the tungsten carbide grains can be indicated in aproximate terms as the ratios of the relative intensities of the diffraction lines corresponding to different crystallographic planes when measured on two polished flat surfaces of a specimen, at right angles to each other, the surfaces being respectively parallel to and at right angles to the average direction of orientation of the platelets.

Figure 9:
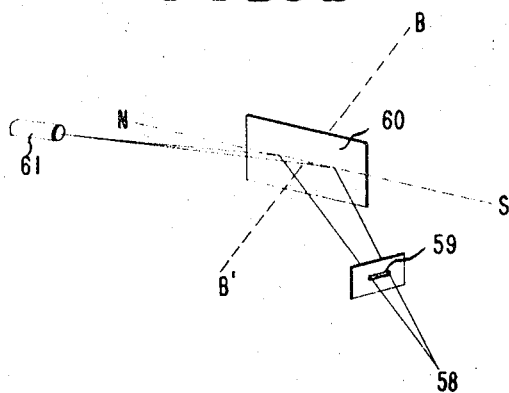
FIGURE 9 is a schematic representation of the reflection method for pole-figure determination.

Most preferably, oriented bodies of this invention are characterized by what is referred to as pole figure determination. This method of analysis is described in Cullity's "Elements of X-Ray Diffraction" at p. 290. As pointed out there, and as represented in FIGURE 9, pole figures are obtained when an incident X-ray beam passes from a source 58 through a slit 59 and is reflected from the surface 60 of the subject being analyzed. The intensity of the reflected beam is measured by a counter 61. The equipment is so adjusted that at all times the counter measures only the intensity of the beam reflected from the (001) basal plane of the tungsten carbide crystals. To determine the differences in reflected intensity from different positions of the sample, the sample holder rotates the surface of the sample in its own plane about an axis BB′ perpendicular to the surface at its center point, and also rotates the surface of the sample about a horizontal axis NS bisecting the specimen surface.

Thus while the surface is continually rotated around BB′ it is also slowly tilted through angle α around axis NS and the intensity of the reflected X-ray beam is measured for the various positions of the surface. The data thus received are plotted in the form of a pole figure as shown in FIGURES 10, 10A, 11 and 11A. In these figures, each contour-like line represents a line of equal intensity of the reflected beam. Different levels of intensity are represented by different colors.

The pole figure intensities are related directly to the position of the surface of the sample through the position of the axis BB′ which is perpendicular to the plane of the pole figure at its center; the axis NS is in the plane of the pole figure as marked; and the angle of rotation α from 0° to 70° plotted as a series of concentric circles of increasing diameter.

To complete the analysis of structural orientation it is necessary to obtain pole figures from two surfaces of a sample, which are at right angles to each other, one surface perpendicular to the pressing direction represented by FIGURES 10 and 11, and one surface parallel to the pressing direction represented by FIGURES 10A and 11A. In each figure the pressing direction is indicated by an arrow.

FIGURES 10 and 10A are illustrations of pole figures of nonoriented metal bonded tungsten carbide. The nonorientation is demonstrated in the pole figures in that the faces at right angles to one another are both symmetrical, have essentially the same shape and have similar intensities. The intensities when integrated over the range of 0° to 30° vary less than 20% for the two faces. And the intensity when integrated along the line NS from 45° to 70° in FIGURE 10A is essentially equal to the intensity integrated along the line EW from 45 to 70° in the same figure.

By contrast, FIGURES 11 and 11A are illustrations of pole figures obtained from a substantially oriented structure of this invention. The differences in the figures obtained from faces at right angles to one another are markedly apparent. The intensity integrated over the angle of 0 to 30° in FIGURE 11 is more than 100% greater than the integrated intensity from 0 to 30° in FIGURE 11A. Also the integrated intensity along line NS from 45 to 70° in FIGURE 11A is more than 100% greater than the intensity integrated along line EW from 45 to 70° in the same figure.

These differences in integrated intensities are apparent only when the pole figure subject has a substantially oriented structure. Substantial orientation is therefore defined as follows: (1) that crystal arrangement which displays an integrated intensity from 0 to 30°, for a pole figure determination of a surface of a pressed body which is perpendicular to the pressing direction, which is more than 100% greater than the integrated intensity from 0 to 30° of a pole figure determination of a surface of the pressed body which is parallel to the pressing direction; or (2) that crystal arrangement which displays an integrated intensity from 45 to 70° along its NS axis which is more than 100% greater than the integrated intensity from 45 to 70° along its EW axis by pole figure determination of a surface parallel to the pressing direction.

Utility

Some of the metal-bonded tungsten carbide bodies of this invention are extremely hard and strong.

For example, anisodimensional platelets of tungsten carbide 0.05 to 2 microns in thickness and from about 0.2 to 10 microns in breadth substantially oriented in 10 percent by weight of cobalt, based on the weight of the total composition, said orientation obtained by hot-pressing in accordance with the methods previously disclosed, exhibits a hardness of 91.5 Rockwell A and a transverse bending strength in a direction parallel to the direction of the tungsten carbide platelets of about 550,000 p.s.i. Furthermore, this body when shaped into cutting tips and brazed onto a commercial vibratory drill can cut more than three times as far through granite as a commercial tip of the same chemical composition before resharpening is required.

Some of the bodies of this invention are extremely dense, impact resistant, wear resistant, extremely hard, resistant to attack by acids, and are very strong. They are therefore suitable for use in the numerous ways in which such refractory materials are conventionally used.

For example, anisodimensional tungsten carbide bonded with cobalt and having a random or non-oriented structure is particularly suitable for such uses as anvils in high temperature and high pressure synthesis such as diamond synthesis.

Some of the other uses to which the bodies of this invention could be put include acid resistant valves, parts for pumps handling corrosive liquids, cutting tools, drilling bits, as binders or matrices for other hard abrasives, and many other specific uses apparent to those skilled in the art.

For example oriented structures of anisodimensional tungsten carbide platelets from .05 to 1 micron thick and from .2 to 4 microns long bonded with 8 to 15% cobalt are particularly effective for use in metal removal such as form cutting, cut-off, milling, broaching and grooving.

Bodies of this invention are used in tools in which unusual strength is required in combination with high hardness. They are particularly advantageous in tools in which conventional cobalt bonded tungsten carbide fails by flaking, chipping, or cracking. Thus they find extensive use where, because of the inadequacies of cobalt-bonded tungsten carbide of the prior art, high speed steel tools are still employed.

Because of the unusual fine grain size, compositions of this invention are useful in tools where extremely small cross-sections are encountered, as for example, in rotary tools smaller than an eighth of an inch in diameter such as end mills, drills and routers; knives having a cutting edge with an included angle less than about 30°; and steel-cutting tools which cut with high rake angles such as broaches, thread chasers, shaving or planing tools, rotary drills, end mills, and teeth for rotary saws. While the compositions of this invention containing more than about 15% cobalt are not stronger than compositions of this invention containing from 8 to 15% cobalt, nevertheless, the impact strength and toughness is higher. These are generally useful where tool steels are normally employed, and have the advantage of higher hardness. For highest impact strength, compositions containing from 15 to 30% cobalt are employed, as in dies and punches.

In order to more fully illustrate the invention the following examples are given wherein parts and percentages are by weight unless otherwise noted.

EXAMPLE 1

Twenty-two thousand seven hundred parts of calcium chloride are melted and brought to 985° C. in a carbon crucible, maintaining an atmosphere of argon in the system. To the melt, continuously agitated with a carbon stirrer, are added, simultaneously through separate hoppers attached to the head of the reactor, charges of (a) 243 parts of a blended mixture consisting of 230 parts of tungstic oxide and 13 parts of carbon having specific surface areas of 5 and 340 square meters per gram, respectively prefired for 4 hours at 750° C. under argon to remove water, and (b) 120 parts of pure granulated calcium metal. The charging hoppers are fitted with a double valve system, to exclude the atmosphere when introducing the reactants. Twenty additions of each of the materials (a) and (b) are charged at 3 to 4 minute intervals over a period of 1.5 hours, the temperature being maintained in the range between 990–1000° C. After the addition of all the reactants, the melt is maintained at temperature, with stirring, for a further twenty minutes, and is then drained from the carbon crucible into an Inconel bucket, maintaining an atmosphere of argon throughout, and allowed to solidify and cool. The solid cake, which has contracted away from the walls of the bucket, is removed and divided into two portions. The dark layer at the bottom of the solid cake is rich in tungsten carbide, whereas the upper, lighter gray portion is low in tungsten carbide, and contains considerable amounts of free carbon and oxide. The lower portion of the solid cake is broken into coarse pieces which are charged to a polyethylene tank and 23,000 parts of water are then added. The pieces of salt cake are leached by continuously agitating the water in the tank and adding ice as necessary to keep the temperature below 85° C. When the initial temperature rise due to hydration is complete, concentrated hydrochloric acid is added in 1200 part increments. As the cake disintegrates, dissolves, and reacts, the pH decreases from strongly basic to acidic values. Because of the high salt concentration in the slurry, actual pH values are higher than those which are measured. Sufficient acid is added to lower the pH to slightly less than one. When a pH of one is achieved and maintained, with continuous agitation, for 15 minutes, the stirring is discontinued and the salts are allowed to settle. The supernatant liquid is siphoned off and the sludge washed through a 100 mesh screen into a second polyethylene tank. Material retained on the screen is discarded and the sludge is diluted to about 38,000 parts with distilled water having a pH between 6 and 7 and a specific resistivity greater than 100,000 ohms per centimeter, and the resultant slurry is agitated for 15 minutes. More hydrochloric acid is then added until the pH is finally stabilized at 3, in the well-stirred slurry. The stirring is discontinued, the solids are allowed to settle and the supernatant liquid is siphoned off, as before. The washing operation is repeated until the specific resistivity of the stirred slurry is between 2500 and 5000 ohms per centimeter, which requires five washings. After removing the final supernatant liquid, the aqueous sludge is diluted with an equal volume of acetone, the solids are allowed to settle, and the supernatant liquid is decanted. The washing of the sludge with acetone is repeated three times. The acetone-rinsed sludge is transferred to shallow metal trays and the acetone is evaporated in a vacuum oven using a purge of pure nitrogen. After the bulk of the acetone is evaporated, the trays are heated to 80° C. to completely dry the powder. The oven is cooled to 40° C., filled with nitrogen, and the dried product is removed and screened through a 100 mesh sieve. Three thousand two hundred fifty parts of tungsten carbide powder are recovered, corresponding to an overall yield of 84% of theoretical.

By analysis this powder contains 93.5% tungsten, 6.05% total carbon, less than 0.1% free carbon and 0.3% oxygen.

The product gives the X-ray diffraction pattern of tungsten carbide and from the broadening of the X-ray lines, the average crystallite size is calculated to be 31 millimicrons. The specific surface area is 7.1 square meters/gram.

Electron microscopic examination of the powder shows it to consist of porous aggregates of colloidal crystallites in the size range 20 to 50 millimicrons. The aggregates are mainly in the size range of from 1 to 10 microns, although some aggregates as large as 50 microns can be observed.

This material will hereafter be referred to as aggregated colloidal tungsten carbide powder.

Incorporation of the bonding phase is accomplished by milling the bonding metal in powder form with tungsten carbide powder. To an 8 inch diameter, 1 gallon steel mill the following are charged: (a) 14,000 parts of "Carboloy" grade 883 cobalt bonded tungsten carbide rods, ¼ inch in diameter, and ¼ inch long, the rods being previously conditioned by tumbling for two weeks; (b) fifteen hundred parts of the aggregated colloidal tungsten carbide powder prepared above; (c) 205 parts of Cobalt F, a fine cobalt powder having a specific surface area of 0.7 square meters per gram and a grain size of about 1 micron; and (d) 1185 parts of acetone. This charge occupies about ½ the volume of the mill. Milling under acetone is continued for 7 days by rotating the mill at 45 revolutions per minute, after which time the mill lid is replaced by a discharge cover and the contents are transferred to a container under a nitrogen atmosphere. Three portions of acetone of 395 parts each are used to wash out the mill. The solids in the drying flask are allowed to settle and the bulk of the acetone is siphoned off. The flask is then evacuated and when the bulk of the acetone is evaporated, the temperature of the flask is brought to 125° C., maintaining a vacuum of less than a tenth of a millimeter of mercury. After about 4 hours, the flask is cooled, filled with pure argon and transferred to an argon glove box. In this inert environment the solids are removed from the drying flask and screened through a 70 mesh sieve.

As an alternative, the mill lid may be replaced by a cover attached to a vacuum system with condensing trap and the acetone is removed under vacuum at a temperature of about 95 to 100° C. maintained on the mill walls by live steam. After the acetone has been removed, as indicated by a vacuum of 0.1 millimeter of mercury maintained in the mill, the mill is filled with nitrogen, the milled powder is recovered from the milling medium and removed under a nitrogen atmosphere. The powder is then screened under nitrogen as before.

The analysis of this unreduced powder mixture indicates that there is present 12.0% cobalt, 0.2% free carbon, and 5.45% total carbon of which some is due to adsorbed organic matter; the specific surface area is 5.5 square meters per gram; and the oxygen content is 0.45% by weight.

The screened powder is charged to shallow trays which are then loaded directly from the argon filled box to a five inch diameter Inconel tube furnace, where the powder is brought to 900° C. at a uniform rate in about 3 hours. The gas passing through the furnace consists of hydrogen, at a flow-rate of four liters per minute, with methane introduced at a flow-rate of forty milliliters per minute. The methane is present to minimize excessive decarburization of the tungsten carbide by the hydrogen. The powder is held in this gas stream at 900° C. for two hours then is cooled and passed through a 40 mesh per inch screen in an argon filled box. Samples are taken under argon for analysis.

The cobalt-containing tungsten carbide powder is characterized by analysis as follows: tungsten 82.3%; total carbon 5.33%; free carbon less than 0.1%; cobalt 12.1%; oxygen 0.26%. The carbon content found by analysis corresponds to an atomic weight of carbon of 0.99 per atomic weight of tungsten. X-ray diffraction line broadening corresponds to a tungsten carbide having a crystallite size of 42 millimicrons average diameter. The specific surface area is 2.6 square meters per gram.

Forty-five grams of the powder described above is charged in an oxygen-free environment to a cylindrical carbon mold and close-fitting carbon pistons are inserted in each end. The mold containing the powder pressed at 200 p.s.i. is then transferred to a vacuum hot press. After evacuation the sample, under no pressure, is brought to 1420° C. by induction heating in seven minutes and held at this temperature with no application of pressure for five minutes. During the heating the sample sinters and shrinks away from contact with the carbon surface, thus avoiding carburization.

At this point the tungsten carbide is in the form of platelets which are of a size when measured by optical microscope of up to a micron in thickness and up to several microns across, and are distributed randomly throughout a billet sintered to about 85 percent of theoretical density. Hydraulic pressure is then applied to both pistons and the pressure on the sample in the mold is brought to 4000 p.s.i. in a period of half a minute. The sample is subjected to a pressure of 4000 p.s.i. at 1420° C. for one minute at which time no further movement of the pistons is observed. The mold containing the sample is then ejected from the hot zone and allowed to cool to 800° C. in two minutes in the evacuated chamber of the press. After cooling to less than 100° C., the mold is removed from the vacuum chamber and a dense sample in the form of a cylindrical disc 1 inch in diameter is recovered.

The disc is cut into two segments, using a one hundred and eighty grit diamond saw, and one of the segments is further cut into bars for measurement of strength and hardness. The modulus of rupture of the hot pressed composition is 530,000 p.s.i., the unnotched impact strength on a Tinius-Olsen impact tester is 92 ft. lb./square inch, and the Rockwell A hardness is 91.8. The density of the hot pressed body is measured as 14.60 grams per cubic centimeter, which corresponds to a composition containing 9.5% cobalt; the reduction in cobalt content as compared with the powder is due to the extrusion of some metal during fabrication.

Chemical analysis of the dense tungsten carbide body gives the following percentages: Tungsten 84.7%; total carbon 5.48%; cobalt 9.8%; oxygen and free carbon less than 0.1%. The carbon and tungsten content found by analysis corresponds to an atomic weight of carbon of 0.99 per atomic weight of tungsten.

A fragment of one of the bars used in measuring physical properties of the tungsten carbide body is optically polished on two faces, one face parallel to the direction of the pressing axis and the other face perpendicular to the direction of the pressing axis. The polished faces are then etched, using alkaline potassium ferricyanide solution, and examined in an optical microscope at a magnification of one thousand fold. Cross-sections of grains of tungsten carbide are visible as platelets with diameters of up to six microns and thicknesses of up to one micron. Most of the platelets visible through the optical microscope are oriented with their long axis perpendicular to the direction of the pressing axis. The porosity of the composition is estimated from the optical micrograph to be A–2 on the standard ASTM scale. More detailed examination of a cross-section of the structure parallel to the direction of the pressing axis with an electron microscope shows the long dimension of individual platelets ranging from 0.2 micron to 6 microns with more than 94 percent of the particles having a longest dimension less than one micron and more than 50% less than half a micron. The platelets have a longest dimension:thickness ratio ranging from 3:1 to 6:1 and the overall average dimension of the platelet cross-sections visible in the electron micrograph is about 0.4 micron. This corresponds to an average tungsten carbide grain diameter of about 0.6 micron. Several sections of the same sample are examined and the mean grain size from one region to another ranges from 0.47 to 0.76 micron, the latter being characteristic of a region which appeared to contain more than a typical amount of cobalt. Non-representative regions such as those within a sixteenth of an inch of the outside of the billet or those surrounding occasional inclusions of impurities are not used in measuring the average grain size.

A simple of the metal binder phase is separated by etching away the tungsten carbide. The lattice spacing of the cobalt by X-ray diffraction is found to be 3.567 Angstroms corresponding to about 18 percent by weight of tungsten in solid solution in the cobalt. The metal binder phase is heated in 35% hydrochloric acid for 1 hour; the weight percentage of tungsten based on total weight of cobalt and tungsten dissolved, is 15 percent. About 2% by weight of the binder is insoluble and found by X-ray diffraction to consist of tungsten-rich eta phase, $Co_3W_3C$.

Another bar fragment is used to measure the resistance of this composition to attack by concentrated hydrochloric acid at 25° C. More than 100 hours exposure to the acid is required to remove 0.25 milligrams of cobalt per square centimeter of surface area of the bar per percent of cobalt originally present.

The second portion of the hot pressed disc is cut with a diamond wheel and ground to a piece one-half inch square and one-quarter of an inch thick, for use as a cutting tip in a milling head. The corners are ground to a radius of one thirty-second of an inch. Using a single tooth cutter, the tip is used to face mill a 2 inch wide bar of "Udimet" 500, at six and a half mils feed per tooth and sixty mils depth of cut. The tip mills the face of the bar a distance of 25 inches at a speed of 50 surface feet per minute before failure, and at 75 surface feet per minute, a distance of 27 inches is achieved.

Using a diamond wheel, a cube is prepared from the cutting tip in such a manner that one surface of the cube is perpendicular to the pressing direction. X-ray reflection pole figures of this surface and a second surface parallel to the pressing direction are obtained in the manner previously described. The pole figures are illustrated in FIGURES 11 and 11A with FIGURE 11 corresponding to the cube surface perpendicular to the pressing direction and FIGURE 11A corresponding to the cube surface parallel to the pressing direction.

The integrated relative intensity of the reflected beam over the angle 0 to 30° is calculated from the pole figures by summing the products of the relative intensity levels and the areas of the intensity plateaus between 0 and 30°. Thus the integrated intensity from 0 to 30° is 101.7 for FIGURE 11 and 39.8 for FIGURE 11A. In FIGURE 11A the relative intensity between 45 and 70° along the NS axis is greater than 2 and along the EW axis it is less than 1. These relative intensity figures show the anisodimensional tungsten carbide platelets in the pressed body are substantially oriented with their (001) basal plane in preferred alignment parallel to a common plane.

The relative intensities of diffraction lines corresponding to different crystallographic planes measured on two polished flats at right angles, one being parallel to the average direction of orientation of the platelets is indicative of orientation.

The unannealed or quench-strengthened character of the product is shown by its characteristic of losing strength when cooled slowly from 1300° or 1400° C. Samples are heated in vacuum in alumina crucibles to 1400° C. in about 20 minutes and cooled at 5° C. per minute to 700° C. and then removed from the furnace and cooled to room temperature out of contact with air. The transverse rupture strength is found to have been reduced from 530,000 p.s.i. to 440,000 p.s.i. and the hardness from 91.8 Rockwell A to 91.2. When another sample is heated similarly to 1300° C. and cooled the strength is 437,000 p.s.i. and the hardness is 91.3.

EXAMPLE 2

To a steel mill are charged 14,000 parts of "Carboloy" grade 883 cobalt-bonded tungsten carbide rods, previously conditioned as described in Example 1, 1800 parts of a fine commercial tungsten carbide powder and 1450 parts of acetone.

The tungsten carbide powder has a nitrogen surface area of 0.66 m.$^2$/gram which corresponds to an average particle size of 580 millimicrons. By X-ray line broadening the average crystallite size is 370 millimicrons. Examination of the powder with an electron miscroscope reveals dense aggregates in the size range of rom 2 to 10 microns, the aggregates being comprised of rough-surfaced particles in the size range of from 0.5 to 2 microns. Chemical analysis of this powder gives the following percentages: tungsten 93.2%; total carbon 6.32%; oxygen and free carbon, less than 0.1%.

Milling under acetone is continued for 7 days, as described in Example 1. One hundred eighty parts of fine cobalt powder are then added to the mill, maintaining an atmosphere of nitrogen in the mill while this is being done, and milling is continued for a further 7 days, the mill being then discharged and the dry powder product recovered and screened through a 70 mesh sieve without exposure to the atmosphere, as described in Example 1.

Prior to adding the cobalt, a small sample of the tungsten carbide-acetone slurry is removed and the dry powder is recovered without exposure to the atmosphere. The nitrogen surface area of this powder is 5.0 m.$^2$/gram, corresponding to an average particle size of 75 millimicrons. By X-ray line broadening the average crystallite size is 50 millimicrons. By electron miscroscope the powder is seen to be a mixture of very fine particles, in the size range of 25 to 50 millimicrons, together with coarser fragments, in the size range of about 250 to 3000 millimicrons. 95% of the particles are less than one micron in size.

Removal of the cobalt from the milled dried cobalt-tungsten carbide composition, by dissolution in hydrochloric acid, and recovery of the tungsten carbide component, taking precautions to avoid contact with the atmosphere, gives a powder having a nitrogen surface area of 5.7 m.$^2$/gram and an X-ray line broadening crystallite size of 32 millimicrons. This shows that only a small reduction in particle size results from milling the premilled tungsten carbide powder in the presence of cobalt.

The dried screened cobalt-tungsten carbide powder is heated at 900° C. for two hours in an atmosphere of hydrogen containing a small amount of methane as described in Example 1 and the resulting powder is discharged under argon as before.

The cobalt-containing tungsten carbide powder is characterized by analysis as follows: tungsten 85.7%; total carbon 5.53%; cobalt 8.5%; oxygen and free carbon less than 0.3%. The carbon content found by analysis corresponds to an atomic weight of carbon of 0.99 per atomic weight of tungsten. The nitrogen surface area is 3.6 m.$^2$/gram.

Fifty parts of the above powder is charged in an oxygen-free environment to a cylindrical carbon mold, and close-fitting carbon pistons are inserted in each end. The mold containing the powder pressed at 200 p.s.i. is then transferred to a vacuum hot press and inserted in the furnace at 1000° C. With no pressure applied to the pistons the sample is heated in the mold, by induction heating, to a temperature of 1400° C. over a period of seven minutes, and held at this temperature for five minutes, during which time the sample sinters to about 85% density.

At this point the tungsten carbide is in the form of isodimensional crystallites in the size range 50 millimicrons to about 2 microns, with 95% of the tungsten carbide crystallites being less than one micron. This is apparent from electron microscopic examination of the polished surface etched with alkaline potassium ferricyanide solution.

Hydraulic pressure is then applied to both pistons and the pressure on the sample in the mold is brought to 4000 p.s.i. in a period of half a minute. The sample is subjected to a pressure of 4000 p.s.i. at 1400° C. for one minute and the mold containing the sample is then ejected from the hot zone and allowed to cool to 800° C. in two minutes in the evacuated chamber of the press. After cooling to less than 100° C. the mold is removed from the vacuum chamber and a dense sample in the form of a cylindrical disc is recovered.

The modulus of rupture and hardness of the hot pressed composition are measured and found to be, respectively, 482,000 p.s.i. and 92.2 Rockwell A. The density is measured as 14.75 grams per cubic centimeter, which corresponds to a dense composition containing 8.1% cobalt.

A fragment of one of the bars used in measuring physical properties is used to measure the resistance of this composition to attack by concentrated hydrochloric acid at 25° C. More than 100 hours exposure to the acid is required to remove 0.25 milligram of metal per square centimeter of surface area of the bar per percent of metal originally present. The cobalt metal binder phase contains more than 19 percent by weight of tungsten in solid solution.

Detailed structural examination of both the hydrochloric acid and alkaline ferricyanide etched polished surfaces using both optical and electron microscopes shows that the hot pressed composition is a dense body with a few small pores, less than one micron in size and the porosity is designated A–2 on the ASTM porosity scale. The tungsten carbide is present as isodimensional crystals in the size range of 100 millimicrons to 5 microns, with 85% of the tungsten carbide crystallites being less than one micron and more than 50% less than 0.5 micron. The mean grain size of tungsten carbide is 0.6 micron, and the grain size distribution is unimodal.

Upon reheating a portion of the body to 1400° C. in argon in a period of 20 minutes and cooling at the rate of 5° per minute, a loss of more than 10 percent in transverse rupture strength is found in the resulting annealed material.

A metal cutting tip, ½″ x ½″ x 3⁄16″ thick is prepared from the dense hot pressed body as described in Example 1. The corners of this tip are ground to a nose radius of 31 mils.

The tip is used to cut gray cast iron by turning at a feed of 10 mils per revolution, a depth of cut of 63 mils, and a speed of 370 surface feet per minute. It cut for 60 minutes without failure.

The metal phase contains about 15 percent by weight of tungsten in solid solution in the cobalt as determined from the lattice spacings. A sample is annealed by cooling from 1400° C. at a rate of 5° C. per minute and loses 11 percent of its transverse rupture strength. The acid resistance is more than 100 hours and the specific resistivity is 24 ohm centimeters.

EXAMPLE 3

Eighteen hundred parts of aggregated colloidal tungsten carbide, prepared as in Example 1, 56 parts of fine cobalt powder, and 1450 parts of acetone are charged to a steel mill containing 14,000 parts of the cobalt-bonded tungsten carbide rods described in Example 1. The charge is milled for 7 days and the product is recovered, dried, screened through a 70 mesh screen, and reduced in a hydrogen-methane stream as described in Example 1.

A dense body is made from this powder using the fabrication procedure described in Example 1, with the modification that, the composition is brought to 1530° C. and held at this temperature for about 3 minutes without the application of pressure, followed by the application of 4000 p.s.i. for one minute while the sample is at 1530° C. The body has an 0.98 carbon to tungsten atomic ratio.

The modulus of rupture of the hot pressed composition is 420,000 p.s.i., the Rockwell A hardness is 92.8, and the density is 99% of theoretical. The cobalt phase contains 24% by weight of tungsten in solid solution. In the standard annealing test the transverse rupture strength decreases by 7%. The mean grain diameter is less one micron and 60% of the grains are smaller than one micron. The acid resistance is greater than 200 hours.

EXAMPLE 4

Fifteen hundred and fifty parts of aggregated colloidal tungsten carbide prepared as in Example 1, 100 parts of fine cobalt powder and 1185 parts of acetone are charged to a steel mill containing 15,000 parts of cobalt bonded tungsten carbide rods described in Example 1. The charge is milled for 7 days and the cobalt-tungsten carbide powder of the invention is recovered, dried, screened and reduced as described in Example 1, except that the reduction temperature is 955° C. The powder contains tungsten—87.8%; total carbon—5.74%; free carbon less than 0.1%; cobalt—6.2%; oxygen—0.16%. X-ray diffraction line broadening of this reduced powder corresponds to tungsten carbide having an average crystallite size of 51 millimicrons. The specific surface area is 1.9 m.$^2$/gram.

Fifty parts of this powder is charged in an oxygen-free environment to a cylindrical mold with close fitting carbon pistons. The mold, containing the powder pressed at 200 p.s.i., is transferred to a vacuum hot press. After evacuation the sample is brought in six minutes to 1450° C. by induction heating with no pressure on the pistons, and held at this temperature with no pressure for 5 minutes. At this point, the tungsten carbide as observed by optical microscope at 500× is in the form of platelets up to one micron in thickness and several microns across, randomly distributed throughout the billet sintered to about 85% of theoretical density. Hydraulic pressure is then applied to both pistons and the pressure on the sample in the mold is brought to 4000 p.s.i. in a period of half a minute and held at this pressure at 1450° C. for one minute. The sintered billet is thus subject to hot working and densification and the mold containing the sample is then ejected from the hot zone and allowed to cool in the evacuated chamber of the hot press. The sample cools to 800° C. in two minutes and then to room temperature. The cool mold is removed from the press chamber and a dense sample in the form of a disc is recovered.

The disc is cut into two segments, one of which is cut into bars for measurement of strength and hardness. The modulus of rupture is 460,000 p.s.i., the unnotched impact strength is 97 ft. lbs./in.², and the Rockwell A hardness is 92.3. The density of the hot pressed body is measured as 14.92 grams per cc.

The hot pressed body contains tungsten—88.1%; total carbon—5.65%; cobalt—6.2%; free carbon and oxygen less than 0.1%. This analysis corresponds to 0.98 atomic weight of carbon per atomic weight of tungsten. Metallographic examination of the dense body by optical micrography, as described in Example 1, shows the presence of platelets of tungsten carbide having a length or breadth to thickness ratio of about 5 to 1. Examination by electron microscope shows that the longest dimension of the platelets seen in cross-section ranges from 0.4 to 10 microns with about 85 percent of the platelets having a longest dimension less than 1 micron. The platelets are highly oriented with their long axis perpendicular to the direction in which the pressure is applied in the hot press. In a cross-section parallel to the direction of pressing, the mean grain size of tungsten carbide is 0.7 micron. The metal binder phase contains 24 percent by weight of tungsten in solid solution in the cobalt. After heating a sample to 1300° C. and cooling to 700° C. per minute the transverse rupture strength at room temperature is reduced by ten percent, but the hardness is reduced only by 0.2 to 92.1 Rockwell A. When a similar sample is heated to 1400° C. and similarly cooled, the hardness decreases by 0.5 and some grain growth occurs; there is more than 10% loss in strength.

The other portion of the hot pressed disc is finished by cutting and grinding to the dimensions 0.525 by 0.50 by 0.093 inch, one side of the piece being tapered to an included angle of 118°. Thi stip is brazed into a ½ inch diameter rotary twist drill shank and used to drill holes in granite. The drill is run at a speed of 20 r.p.m. while a constant load of 500 pounds is applied. Fifteen holes, each one inch deep, are drilled in a total drilling time of one hour.

When used to mill a high temperature alloy, at a feed rate of 6.7 mils per tooth and a depth of 60 mils, a distance of 12 inches is cut at a speed of 75 surface feet per minute, and 17 inches at 96 surface feet per minute, before the wear is sufficient for the tip to require replacement. The bar is milled across its full width of 2 inches.

EXAMPLE 5

Four hundred parts of aggregated colloidal tungsten carbide, prepared as in Example 1, 100 parts of fine cobalt powder and 373 parts of acetone are charged to a one quart steel mill containing 3500 parts of one-quarter inch cemented tungsten carbide rods, previously conditioned as described in Example 1. The charge is milled for seven days and the cobalt-tungsten carbide composition is recovered, dried and reduced as described in Example 1, the reduction temperature being 900° C. The cobalt-containing tungsten carbide powder is characterized by analysis as follows: tungsten—74.9%; total carbon—4.95%; free carbon less than 0.1%; cobalt—19.8%; oxygen—0.12%. X-ray diffraction line broadening of the reduced powder corresponds to tungsten carbide having an average crystallite size of 42 millimicrons. The specific surface area is 2.1 m.²/g.

Fifty parts of the powder described above is charged in an oxygen-free environment, to a cylindrical die with close-fitting carbon pistons inserted in each end. The mold containing the powder pressed at 200 p.s.i. is then transferred to a vacuum hot press and the pressure removed from the pistons. The powder is brought to 1350° C. by induction heating under vacuum, as described in Example 1, and held at this temperature with no application of pressure for 5 minutes. At this point examination by optical microscope at 500× shows that the tungsten carbide is in the form of platelets, up to 2 microns in thickness and several microns across, randomly distributed throughout the billet which is sintered to about 85% of theoretical density. Hydraulic pressure is then applied to both pistons, and the pressure on the sample in the mold is brought to 4000 p.s.i. at 1350° C. for one minute. The sintered billet is thus subjected to hot working and densification. The mold containing the sample is at once ejected from the hot zone and allowed to cool to 800° C. in two minutes in the evacuated chamber.

After cooling, the resultant disc is cut into bars for measurement of strength and hardness. The modules of rupture is 476,000 p.s.i., the unnotched impact strength is 163 ft. lbs./in.² and the Rockwell A hardness is 88.8. The density of the hot pressed body is measured as 14.52 g./cc.

The hot pressed body contains: tungsten—75.6%; total carbon—4.76%; cobalt—19.4%; free carbon and oxygen less than 0.1%. This analysis corresponds to 0.97 atomic weights of carbon per atomic weight of tungsten. Metallographic examination of polished, etched surfaces of the body reveals the presence of crystalline platelets of tungsten carbide having a maximum diameter of 12 microns and a maximum thickness of 2.5 microns as measured by optical micrography at 1000×. The platelets are preferentially oriented with their faces perpendicular to the direction in which the pressure is applied in the hot press. Examination by electron microscope shows that the longest dimension of the platelets ranges from 0.3 to 12 microns with about 92 percent of the platelets having a maximum dimension less than 1 micron. The average grain diameter is about 0.6 micron.

Examination of the metal phase indicates that about 11% by weight of tungsten is in solid solution in cobalt. The acid resistance is greater than 50 hours. The binder phase contains about two percent of eta phase. The body is unannealed.

EXAMPLE 6

Four hundred parts of aggregated colloidal tungsten carbide prepared as described in Example 1, 170 parts of fine cobalt powder and 373 parts of acetone are charged to a one quart steel mill containing 3500 parts of the cemented carbide grinding cylinders used in Example 1. The charge is milled for seven days and the cobalt-tungsten carbide composition is recovered, dried, and reduced as described in Example 1, the reduction temperature being 900° C. The powder contains: tungsten—66.5%; total carbon—4.26%; free carbon less than 0.1%; cobalt—29.3%; oxygen—0.08%. X-ray diffraction line broadening of the reduced powder corresponds to tungsten carbide having an average crystallite size of 45 millimicrons. The specific surface area is 1.6 m.²/g.

Fifty parts of the powder described above is hot pressed using the procedure described in Example 5, with the difference that the pressing temperature is 1330° C.

The pressed disc is cut into bars for measurement of strength and hardness. The modulus of rupture is 493,000 p.s.i., the unnotched impact strength is 192 ft. lbs./in.², and the Rockwell A hardness is 85.4. The density of the hotpressed body is 12.64 grams per cc. The hot pressed body contains: tungsten—68.1%; total carbon—4.40%; cobalt—27.2%; free carbon and oxygen less than 0.1%.

This analysis corresponds to 0.99 atomic weights of carbon per atomic weight of tungsten. Metallographic examination with an optical microscope at 1000× of the polished, etched surfaces of the body shows that it consists mostly of crystalline platelets of tungsten carbide having a maximum breadth of 15 microns and a maximum thickness of 3 microns. The platelets are preferentially oriented with their long axis perpendicular to the direction in which the pressure is applied in the hot press. Examination by electron microscope shows that the longest dimension of the platelets ranges from 0.4 to 15 microns with about 88 percent of the platelets having a longest dimension less than 1 micron. The mean grain size is about 0.5 micron. The cobalt binder contains 8% tungsten in solid solution. After the standard annealing test the transverse rupture strength decreases to less than 440,000 p.s.i.

EXAMPLE 7

The 12% cobalt-tungsten carbide powder utilized as a starting material is prepared as described in Example 1, and has a carbon to tungsten atomic ratio of about 0.98. The mill loading being changed to 1800 parts tungsten carbide, 250 parts cobalt, and 1450 parts acetone.

Fifty parts of the powder described above are charged in an oxygen-free environment to a cylindrical carbon mold. Close-fitting graphite discs are inserted in each end. Two close-fitting graphite pistons are then inserted into each end and the powder is pressed at 500 p.s.i. to a density of about 25% of the theoretical density. The pistons are removed and the graphite cylinder with powder is placed into a sintering furnace under a hydrogen atmosphere for 30 minutes at 1200° C. The sintered billet having reached 67% of theoretical density, is centered inside the graphite cylinder, close-fitting carbon pistons are inserted, and the entire sample is transferred to a vacuum hot press. After evacuation, the sample, under no pressure, is brought to 1400° C. by induction heating in six minutes and held at this temperature for two minutes. Hydraulic pressure is applied to both pistons, and the pressure on the sample in the mold is subjected to 4000 p.s.i. for one minute. The mold containing the sample is then ejected from the hot zone and allowed to cool to 800° C. in two minutes. After cooling to less than 100° C., the mold is removed and a dense sample is obtained in the form of a cylindrical disc.

Analysis reveals that the modulus of rupture of the hot pressed composition is 500,000 p.s.i., the Rockwell A hardness is 92.1, and the density is over 99% of theoretical.

The acid resistance is more than 100 hours on exposure to concentrated hydrochloric acid at 25° C. The mean grain size of the tungsten carbide is less than 0.75 micron.

EXAMPLE 8

Fifty parts of the cobalt tungsten carbide powder prepared as described in Example 1 are charged in an oxygen-free environment to a cylindrical rubber mold. The powder is tamped into the bottom of the mold which is then sealed air tight with a rubber stopper and black electrical tape. The encased sample is placed in a wire basket and lowered into the pressure vessel of an isostatic press. This consists of a steel cylinder having thick walls and containing as the hydraulic fluid a 5% dispersion of oil in water. The pressure is increased to 100,000 p.s.i. by means of a hydraulic pump and maintained at this level for 5 minutes. The pressure is then lowered to one atmosphere, and the sample removed. The density of the sample is 55% of theoretical.

The cold pressed sample is removed from the rubber mold and inserted into the sintering furnace in a graphite boat. Care is exercised to protect the sample from oxidation by keeping the sample in an inert atmosphere during transfer, and it is sintered in argon at 1250° C. for 30 minutes. Its sintered density is 90% of theoretical. The hot pressing step is similar to that performed on the sintered piece of Example 7. The modulus of rupture of the hot pressed composition is 530,000 p.s.i., the Rockwell A hardness is 92.0, and the ASTM porosity is A–2.

More than 100 hours exposure to concentrated hydrochloric acid at 25° C. is required to remove 0.25 milligram of metal per square centimeter of surface area of the body per percent of metal originally present. The body has a carbon to tungsten atomic ratio of 0.98 and the cobalt contains 18% tungsten in solid solution.

EXAMPLE 9

A tungsten carbide composition containing about 12% of cobalt is prepared by preconsolidating a fairly dense compact prior to the heat treating step. The materials and methods are the same as described in Example 8 except that the powder is preconsolidated at 10,000 p.s.i. and the pressure during hot pressing is 2000 p.s.i. The properties of the molded body are substantially the same as those of the product of Example 8.

EXAMPLE 10

Fifty parts of a 12% cobalt-tungsten carbide powder, prepared as in Example 1, is charged to a cylindrical carbon mold and close-fitting carbon pistons are inserted in each end. The mold containing the powder is pressed at 200 p.s.i. and then transferred to a vacuum hot press. After evacuation, a sample, under no pressure, is brought to 1000° C. by induction heating, and a pressure of 4000 p.s.i. is then applied to the sample for a period of one minute during which the temperature is increased to 1100° C. The temperature is maintained at 1100° C. with the pressure of 4000 p.s.i. still on, for a period of 5 minutes. The pressure is then removed and the sample is heated to 1400° C. and held at this temperautre without the application of pressure for two minutes. A pressure of 4000 p.s.i. is again applied and the sample is subjected to this pressure while maintaining the temperature at 1400° C. for a period of 1 minute. The mold containing the sample is then ejected from the hot zone and allowed to cool in the evacuated chamber of the press to 800° C. in two minutes.

The modulus of rupture of the body prepared as described above is 495,000 p.s.i. and the Rockwell A hardness is 91.0. The other properties are substantially the same as those of the product of Example 8.

EXAMPLE 11

Colloidal tungsten carbide powder prepared in a molten salt medium and milled with 12% of cobalt in the form of a fine powder, as described in Example 1, is dried, and screened through a 70 mesh screen in an inert atmosphere as described in Example 1. At this stage 40 parts of the unreduced powder is loaded into a graphite container in a nitrogen atmosphere. The container is tapped gently to pack the powder. The tapped density of the powder is about 20 percent of theoretical. To pack the powder in the container about 50 p.s.i. is applied with a plunger by hand.

The container is then placed in the chamber but outside the hot zone of an inductively heated vacuum furnace which is then evacuated. When about 0.5 mm. Hg vacuum is reached, the furnace is heated at the rate of about 30° C./min. to 800° C., at which temperature the container is moved into the hot zone of the furnace. The temperature of the initially cool container is permitted to equilibrate with the furnace temperature by holding it for 3 minutes while maintaining 800° C. At the end of the 3 minute soaking, the furnace is heated to 1400° C. at the uniform rate of about 30° C./minute. Upon reaching 1400° C., as measured by an optical pyrometer, the sample is allowed to sinter for 5 minutes at the temperature, and the container is then ejected immediately from the hot zone of the furnace and is allowed to cool to 800° C. in less than one hour.

Examination of the microstructure shows that the sintered billet has a porosity of A–4 on the ASTM scale. The tungsten carbide crystallites are platelike with a shape and size similar to those in Example 1 after hot pressing. The cobalt content is found to be 12% and the carbon was 5.3%.

This presintered billet is later preheated in a vacuum furnace to 1425° C. in less than 3 minutes and forged in a vacuum forging press with graphite dies activated with continuous hydraulic pressure, the dies being maintained at about 1450° C. and being designed so as to not deform any dimension of the billet by more than 10% in each forging step. The total time during which the material is above 1350° C. is less than 10 minutes and the forged body is cooled to less than 1250° C. in less than 5 minutes and to 600° C. in less than 15 minutes.

After two forging steps the shaped body has a transverse rupture strength of 470,000 p.s.i. and a hardness of over 91 Rockwell A. The mean grain size of tungsten carbide is less than one micron.

More than 100 hours exposure to concentrated hydrochloric acid at 25° C. is required to remove 0.25 milligram of metal per square centimeter of surface area of the body per percent of metal originally present, and more than 12 percent by weight of tungsten is in solid solution in the cobalt binder phase. After the standard annealing test the strength of the body was 420,000 p.s.i.

EXAMPLE 12

A tungsten carbide cobalt powder containing about 12% cobalt is prepared by the procedure of Example 1 up to and including drying the powder after recovery from the ball milling operation, and screening under nitrogen.

Sixty parts of this unreduced powder is loaded into a cylindrical carbon mold, and close fitting carbon pistons are inserted in each end. The mold containing the powder is pressed at 200 p.s.i. and is then transferred to a vacuum hot press. After evacuation, the sample is heated to 400° C. and held for 15 minutes to allow gases to come off and the temperature is then raised to 1100° C., and the sample is held at this temperature with no application of pressure for 30 muintes.

At this point a rapidly cooled sample is found to contain 15 percent by weight of tungsten in solid solution in the cobalt.

Three thousand seven hundred and fifty p.s.i. pressure is then applied to the sample and simultaneously the temperature is increased to 1400° C. over a period of about 6 minutes. The sample is then held for 3 minutes at a temperature of 1400° C., maintaining a pressure of 3750 p.s.i., at which point the mold containing the sample is ejected from the hot zone and cooled to less than 800° C. in about 5 minutes.

The modulus of rupture of the body prepared in this manner is found to be 580,000 p.s.i. and the Rockwell A hardness is 92.0. The atomic ratio of carbon to tungsten is 0.98.

Examination of the microstructure reveals that the material is practically free from pores and is designated A-1 on the ASTM porosity scale. It also contains about 5 volume percent eta carbide. About 80% of the tungsten carbide grains are less than one micron in size and the mean size is 0.75 micron. The metal binder phase is uniformly distributed throughout the main body.

More than 100 hours exposure to concentrated hydrochloric acid at 25° C. is required to remove 0.25 milligram of metal per square centimeter of surface area of the body per percent of metal originally present. The cobalt phase still contains 15 percent by weight of tungsten in solid solution. Upon being subjected to the standard annealing test the body losses 12 percent of its strength.

EXAMPLE 13

Fifteen parts of unreduced 12% cobalt-tungsten carbide composition prepared as described in Example 12 and 85 parts of 6% cobalt-tungsten carbide powder prepared as in Example 4 are intimately mixed by thoroughly tumbling in a container, keeping the powder under an inert atmosphere.

Sixty parts of this mixture are charged in an oxygen free environment to a cylindrical carbon mold, care being taken not to vibrate the powder unduly while charging to the mold, and close fitting carbon pistons are inserted in each end. The powder is pressed at 200 p.s.i. and transferred to a vacuum hot press. After evacuation, the sample is brought to 1400° C. by induction heating in about 7 minutes without the application of pressure, and held at this temperature for 5 minutes. Hydraulic pressure is then applied to both pistons and the pressure on the sample in the mold is brought to 4000 p.s.i. and the sample subjected to this pressure at 1400° C. for 1 minute. The mold containing the sample is then ejected from the hot zone and is cooled to 600° C. in 20 minutes.

The dense body thus obtained is found to have a modulus of rupture of 550,000 p.s.i. and Rockwell A hardness of 92.9.

More than 100 hours exposure to concentrated hydrochloric acid at 25° C. is required to remove 0.25 milligram of metal per square centimeter of surface area of the body per percent of metal originally present. The atomic ratio of carbon to tungsten in the body is slightly less than one. The cobalt phase contains more than 12% by weight of tungsten in solid solution. The body loses 10 percent of its strength when subjected to the standard annealing test. The tungsten carbide grains have a mean diameter of 0.6 micron and 90% of the grains are smaller than one micron.

EXAMPLE 14

One hundred fifty parts of the cobalt-containing tungsten carbide powder of Example 1, containing 12.1% cobalt, are charged in an oxygen free environment to a cylindrical graphite mold, close-fitting graphite pistons are inserted in each end of the mold, and the powder is pressed at 250 p.s.i. at room temperature and the pressure removed. The mold containing the powder is then heated in a vacuum induction furnace at 1500° C. for 5 minutes with no pressure applied and cooled in the furnace to 1000° C. and then removed and cooled to room temperature under vacuum. A porous, sintered cylindrical billet $^{13}/_{16}$ inch in diameter and 1⅜ inches long is recovered from the graphite mold. The density of this piece is 12.3 grams per cc. which is 86% of the theoretical density of powder composition charged to the mold. At this point examination by optical microscope at 500× shows the tungsten carbide is in the form of platelets, up to about one micron in thickness and several microns across, distributed in random orientation throughout the billet.

The billet is then loaded into a cylindrical mold one inch in diameter and 4 inches long, and close-fitting carbon pistons are inserted in each end. The upper piston, which is 2 inches long, has a ⅜ inch diameter hole drilled along its axis for a length of 1⅞ inches. The die and piston assembly containing the sintered billet is loaded to a vacuum hot press and after evacuation, the sample is heated to 1500° C. by induction heating in 6 minutes and held at this temperature with no application of pressure for 5 minutes. Hydraulic pressure is then applied to both pistons and the pressure on the billet in the mold is brought to 4000 p.s.i. in a period of half a minute. The temperature is maintained at 1500° C. and the pressure at 4000 p.s.i. for two minutes, at which time no further movement of the pistons is observed. The mold containing the sample is then at once ejected from the hot zone and allowed to cool in the evacuated chamber of the press.

The cobalt-bonded tungsten carbide body is recovered by breaking away the adhering carbon cylinder and the pistons. The pressed body consists of a one inch diameter cylinder, ⅝ inch high to which is attached a ⅜ inch diameter rod, one inch long, the latter having been extruded into the hole in the upper piston. The ⅜ inch diameter rod is characterized with respect to structure. In bars cut parallel with the axis of the rod, the modulus of rupture is found to be 454,000 p.s.i. and the Rockwell A hardness is 89.0. The density is 14.3 g./cc.

A ¼ inch long piece of the ⅜ inch diameter rod is ground on one side to a ¼ inch wide flat. This flat and one end of the rod are smoothly polished and the polished faces are etched and examined with an optical microscope at a magnification of 1000×, as described in Example 1.

Individual grains of tungsten carbide are visible in cross section by optical microscope at 1000× as crystalline platelets with a maximum diameter of 12 microns and a maximum thickness of 2 microns. The platelets are preferentially oriented with their long axes parallel to the axis of the extruded rod. Examination by electron microscope shows that the longest dimension of the platelets in cross-section ranges from 0.6 to 12 microns, with about 80% of the platelets having a longest dimension less than 1 micron.

EXAMPLE 15

Tungsten carbide powder containing cobalt is prepared as described in Example 1, and characterized as containing: tungsten—82.8%; total carbon—5.23%; free carbon less than 0.1%; cobalt—11.8%; oxygen—0.26%. X-ray line broadening of the reduced powder corresponds to tungsten carbide having an average crystallite size of 34 millimicrons. The specific surface area is 2.4 m.$^2$/g.

Four discs, one inch in diameter and ¾ inch thick, are fabricated using 135 parts of the above described powder for each disc and the hot pressing procedure similar to that described in Example 1, with some modification being that the full pressure of 4000 p.s.i. is applied to the sample at 1420° C. for 2½ minutes and the sample cooled to 600° C. in less than ten minutes.

Percussion rock drilling bit inserts are made from the discs by diamond sawing and grinding to dimensions ⅝ by ⅜ by 9/16 inch, with an included angle at the tip of 108°. The inserts are cut and brazed into a 1¾ inch diameter percussion bit so that the direction of the axis of the bit is parallel with the direction of the pressing axis of the inserts during fabrication. The bit, attached to a pneumatic rotary percussion drill, is used to drill holes in a block of Barre Vermont granite. Forty-nine holes, each 32 inches deep, are drilled in an average time of six minutes per hole, the drilling time for the last hole being seven minutes, only two minutes longer than the drilling time for the first hole and the cutting edges of the inserts are still not dull enough to necessitate resharpening.

One of the inserts is removed from the bit which drilled forty-nine holes and cut into several pieces for examination. Analysis shows the insert to contain: tungsten—83.2%; total carbon—5.33%; cobalt—11.4%; oxygen—0.07%. The Rockwell A hardness is 91.2 and the density 14.37 grams per cc., corresponding to a composition consisting of 11.6% cobalt and 88.4% tungsten carbide. The acid resistance is more than 50 hours and the atomic ratio of carbon to tungsten is 0.98 and there is 18% by weight of tungsten in the cobalt phase.

Metallographic examination, with an optical microscope, as described in Example 1, reveals a structure comprising a three-dimensional matrix of a cobalt-rich phase interspersed with regions 10 to 100 microns in diameter, consisting primarily of tungsten carbide. More detailed examination of the structure, using the electron microscope, shows the tungsten carbide-rich regions to be made up of closely packed platelets of tungsten carbide bonded together with a highly dispersed cobalt binder phase. The tungsten carbide platelets have a ratio of longest diameter to thickness in the range of from 3:1 to 7:1. The longest diameter of individual platelets ranges from 0.2 micron to 7 microns, with 95% of the particles having longest diameters less than 1 micron. The platelets are oriented with their long axes perpendicular to the pressing direction. The mean grain size is less than 0.75 micron.

EXAMPLE 16

An interdispersed powder of tungsten carbide and cobalt similar to that of Example 1, which has not been subjected to a reduction step, is loaded directly into the graphite mold out of contact with air. The powder contains 0.42% oxygen, has a specific surface area of 5.8 m.$^2$/g., the crystallite size of tungsten carbide determined by X-ray diffraction is 35 millimicrons, and the atomic ratio of carbon to tungsten is 0.97. The powder is compressed in the mold at 200 p.s.i., then the pressure is removed while the mold and contents are heated to 1400° C., at which temperature it is held for 5 minutes, and then 4000 p.s.i. pressure is applied through the pistons to the material for one minute. At once the pressure is removed and the sample ejected from the furnace and cooled to 800° C. in 2 minutes. The resulting body contains an atomic ratio of carbon to tungsten of 0.97 and contains 9.62% cobalt, some of the cobalt having been squeezed out of the mold. The density is 14.43 g./cc. The transverse rupture strength is 539,000 p.s.i. and the hardness is 91.6 Rockwell A. The cobalt metal binder phase contains 20% by weight of tungsten. The body has an acid resistance of greater than 100 hours; the specific resistivity is 33 micro-ohm-cm. From electron micrographs the mean grain size is 0.6 micron, and 90% of the tungsten carbide grains are less than one micron in size. The ASTM porosity is A–2. When subjected to the standard annealing test, the strength is reduced to 460,000 p.s.i.

Inserts made of this body are brazed into cutoff tools, 3/16 of an inch wide, and employed on an automatic screw machine. In cutting off AISI 52100 steel, this tool cuts off three times as many pieces as a high speed steel cutoff tool before failure, while operating under cutting conditions under which inserts made with commercial cobalt-bonded tungsten carbide are unreliable, failing by chipping.

EXAMPLE 17

The tungsten carbide powder used in this example contains 12% cobalt and is the same as the reduced powder employed in Example 1, the hot pressing procedure is also identical with that of Example 1, except that the powder in the mold is subjected continuously to a pressure corresponding to 100 pounds per square inch while the temperature is being raised from 1000 to 1400° C. In a separate but otherwise identical experiment, the body is removed from the mold after having been heated under 100 p.s.i. pressure to 1400° C., and is found to have shrunk away from the graphite walls of the mold in spite of the applied pressure. When the body which had been heated under 100 p.s.i. pressure to 1400° C. is then immediately pressed at 4000 p.s.i. for a period of one minute, and the body and mold removed from the furnace and cooled to 800° C. within two minutes, the resulting product is found to have a transverse rupture strength of 505,000 p.s.i. and a hardness of 92.1. The molded body comes away cleanly from the graphite without sticking and is well formed. This procedure permits a local carburization of the ends of the body through contact with the pistons, but the sides of the billet do not touch the walls during the heating period and the central part of the body is not carburized and contains an atomic ratio of carbon to tungsten of less than one. There is more than 8% by weight of the tungsten in solid solution in the cobalt phase, and the body exhibits the characteristics of an unannealed body. The grain size of the tungsten carbide in the final body is about 0.6 micron.

EXAMPLE 18

An interdispersed powder of tungsten, tungsten carbide and cobalt is prepared by ballmilling as in Example 1, using 1380 parts of the aggregated colloidal tungsten carbide of Example 1, 205 parts of fine cobalt powder, 125 parts of finely divided tungsten metal powder having a grain size of one micron, and 1185 parts of acetone. After 7 days milling the interdispersed powder is recovered and screened through a screen of 70 meshes per inch, out of contact with the atmosphere and moisture. Because of the added tungsten, the atomic ratio of carbon to tungsten is 0.92. The powder is reduced in an atmosphere of hydrogen without addition of methane by heating it at a uniform rate in about 3 hours from 30° to 900° C., while passing over it a mixture containing 85% hydrogen and 15% argon. The powder is held at 900° C. for 2 hours, and then heated at a uniform rate from 900° C. to 1150° C., over a period of 5 hours. It is held at this temperature for 6 hours, and then cooled from 1150° C. to 700° C. in about 90 minutes, and then at a somewhat slower rate to ordinary temperature.

In this powder it is found that the cobalt phase contains 23% by weight of tungsten, while the remainder of the tungsten is in uncombined form.

Fifty grams of this powder is loaded in the atmosphere into a graphite mold with a cylindrical cavity one inch in diameter and hot pressing is carried out by heating the mold and powder in a vacuum to 1000° C. and applying 4000 p.s.i. to the powder as it is heated from 1000° C. to 1400° C. in a period of 5 minutes, and held under continuing pressure at 1400° C. for 2 minutes. The pressure is then removed and the compacted body is removed from the furnace and cooled to 600° C. in a period of 7 mintues.

The resulting billet is 1 inch in diameter, about ¼ inch thick. Transverse rupture strength of the body is 475,000 p.s.i., the hardness is 92.0, the body contains 10.5% cobalt by weight, and 27% by weight of tungsten is in solid solution in the cobalt phase. The body is extremely resistant to dissolution by hydrochloric acid, the acid resistance being over 300 hours in the standard test. The hardness of the body is 92.0 Rockell A, the mean grain size is less than 0.7 micron and 80% of the grains are less than 1 micron in diameter.

Upon subjecting the body to the standard annealing test, there is a marked increase in the amount of eta phase present, and the transverse rupture strength decreases to 450,000 p.s.i. The metal phase remains acid-resistant and the cobalt contains 18% by weight of tungsten in solid solution.

EXAMPLE 19

A commercially available milled mixture containing 91% tungsten carbide and 9% by weight of cobalt is used in this example. Chemical analysis of the powder indicates 5.7% total carbon, 9.2% cobalt, 0.13% oxygen, and 0.12% free carbon. The atomic ratio of carbon to tungsten in this powder is 1.0, and the specific surface area is 1.2 m.$^2$/g., as determined by nitrogen adsorption.

This powder is ballmilled for 7 days, dried, reduced, and hot pressed, as in Example 2. The surface area of the reduced powder is 1.3 m.$^2$/g., the free carbon content is less than 0.1% by weight, the oxygen content is 0.09%, and the atomic ratio of carbon to tungsten is 0.99, some carbon having been lost in the milling, drying and reduction operation. After hot pressing, the body is cooled from 1400° to 800° C. in 2 minutes. The body contains 8 percent by weight of cobalt. The transverse rupture strength of the body is 508,000 p.s.i., the hardness is 92.0 Rockwell A. The body is dense, essentially non-porous, the porosity rating being A-1. Electron micrographs show that the tungsten carbide grains are isodimensional, that is, on the average are equiaxed, the mean grain size being 0.61 micron and 98% of the grains being less than 1 micron in diameter. The body is acid resistant, having a resistance of over 50 hours. The cobalt metal phase contains 8% by weight of tungsten in solid solution. The specific resistivity of the body is 23 micro-ohm-cm. After the standard annealing test the transverse rupture strength is 455,000 p.s.i.

EXAMPLE 20

A powder consisting of 12 parts by weight of cobalt and 88 parts by weight of tungsten carbide is prepared as described in Example 1 up to the point where the dried product is recovered after milling. The vacuum dried material is screened under nitrogen, using a 70 mesh screen vibrated mechanically, and it is further hand screened through a 40 mesh screen to break up clumps which tend to form in the collecting pan on the vibrated screen. The powder is aggregated in the form of soft spheres a few hundred microns in diameter.

The screened powder is poured loosely into shallow trays which are then loaded to a 5 inch diameter Inconel tube furnace, the powder being handled throughout under a protective nitrogen atmosphere. The furnace is at 400° C. when the power is loaded and the gas passing through the furnace consists of hydrogen, at a flow rate of 4 liters per minute, with methane introduced at a flow rate of 40 milliliters per minute, together with argon at a flow rate of about 700 milliliters per minute. The furnace is slowly brought to a temperature of 1150° C., using the heating cycle as follows: 400 to 900° C. in 2 hours, 900 to 1000° C. in 1½ hours, 1000 to 1150° C. in 3½ hours. The powder is then held at 1150° C. for 9 hours, but during the last seven hours only argon passes through the furnace. The furnace is then cooled from 1150° C. to 800° C. in one hour, the powder being in an atmosphere of argon during the cooling cycle. The trays containing the powder are then moved into a water-cooled zone outside the furnace and cooled rapidly from 800° to 300° C. in 15 minutes. The powder is discharged into a nitrogen filled box and it is transferred from the trays and screened through a 40 mesh screen. The powder consists of hard, sintered, free-flowing spheres a few hundred microns in diameter. It is characterized by analysis as follows: total carbon—5.31%; free carbon—less than 0.1%; oxygen—0.02%; cobalt—12.65%. The specific surface area is 0.2 m.$^2$/g. The carbon content found by analysis corresponds to an atomic weight of carbon of 0.99 per atomic weight of tungsten. The cobalt phase separated from the tungsten carbide by anodic oxidation of a thin layer of powder in alkaline potassium ferricyanide is found by analysis to contain 12% tungsten in solid solution. The powder has been sintered to a relatively hard, impervious condition, as indicated by the low specific surface area and low oxygen content.

This powder is hot pressed by loading 50 grams of this powder in air into a 1 inch diameter mold of graphite fitted with graphite pistons and heated to 1000° C., at which point 4000 p.s.i. pressure is applied and the mold and contents is brought to 1400° C. in 4½ minutes and held under pressure at this temperature for 6 minutes; immediately the pressure is released and the sample removed from the furnace and cooled to 600° C. in four minutes.

The heat-inactivated powder is pressed with maximum application of pressure and at 1400° C. as an optimum temperature. When only 2000 p.s.i. pressure is applied, only half the strength is developed. It also differs from the other powders of this invention which have not been heat treated, in that if the pressure is not applied while the powder is being heated from 1000° C. to 1400° C. the physical properties of the product are poor.

Analysis of the metal phase indicates that there is 19.5% by weight of tungsten in solid solution in the cobalt, and that the body contains 7.6% by weight of cobalt. The body has an acid resistance of more than 50 hours. During the hot pressing, carburization of the outer surfaces of the billet occurs, while the interior of the billet remains uncarburized.

The transverse rupture strength of this body is 521,000 p.s.i., and the hardness of 91.9 Rockwell A. The mean grain size of the tungsten carbide is 0.7 micron, and 80% of the grains are smaller than one micron. The ASTM porosity rating is A-2.

After the standard annealing test, the body loses 50% of its strength.

EXAMPLE 21

A composition is prepared from a reduced powder containing 15% cobalt by weight, and is hot pressed at 1340° C., by a procedure similar to that of Example 1, except that the mill is charged with 1800 grams of aggregated colloidal tungsten carbide and 318 grams of "Cobalt F" powder and 1800 milliliters of acetone. The milled, dried and reduced powder has an atomic ratio of carbon to tungsten of 0.99. The hot pressing cycle is the same as in Example 1, except that a maximum pressing temperature of 1340° C. is employed. The rapidly cooled sample has a transverse rupture strength of 524,000 p.s.i. and a hardness of 91.0 Rockwell A. The density is 99% of theoretical. The cobalt content is 14% by weight, there is 9% by weight of tungsten in solid solution in the cobalt phase, and after the standard annealing test, the transverse rupture strength is found to be 460,000 p.s.i.

EXAMPLE 22

A ball mill containing 14,000 parts of milling inserts similar to that of Example 1 is loaded with a mixture blended for four hours in a cone blendor and consisting of 1260 parts of aggregated colloidal tungsten carbide powder of Example 1, 210 parts of tungsten powder having a crystallite size of about 0.2 micron, by X-ray diffraction line broadening and a nitrogen surface area of 2 $m^2/g$., 630 parts of fine cobalt powder and 1800 parts of acetone. Seven days of milling and drying the powder are carried out without exposing the powder to atmosphere or moisture.

Hot pressing is carried out by loading about 50 grams of powder into a 1 inch diameter mold and compacting with 200 p.s.i. pressure. The pressure is then removed and the sample is heated in the mold to 1000° C. and then from 1000 to 1350° C. in about 7 minutes. At this point, the sample is held at 1350° C. to sinter without pressure for 5 minutes, and then 2000 p.s.i. is applied for a period of one minute. Pressure is immediately removed and the sample is ejected from the furnace and cooled to below 600° C. in 5 minutes. The transverse rupture strength of the product is 601,000 p.s.i. and the hardness is 84.7 Rockwell A. The density is greater than 98% of theoretical. The body is extremely resistant to acid, the acid resistance being over 200 hours. The mean grain size of the tungsten carbide is 0.5 micron, and 90% of all the grains are less than 1 micron in size. When the sample is subjected to the standard annealing test by heating to 1400° C. and cooling at the prescribed rate, it is subsequently found to have lost 10% of its transverse rupture strength. Examination of the microstructure shows that during the annealing step substantial amounts of the cobalt binder are converted by reaction with the tungsten carbide to a cobalt-rich type of eta phase.

The body is employed as a drawing die for copper wire. The composition is tough and resistant to impact.

Example 23

A commercial tungsten carbide powder is milled to reduce its particle size and increase its specific surface area to greater than 2 $m.^2/g$. Two percent by weight of tungsten is added to provide tungsten to be dissolved in the cobalt binder phase, along with finely divided cobalt powder.

The fine commercial tungsten carbide powder was that employed in Example 2, having a particle size of about a micron and a specific surface area of 0.66 $m.^2/g$. To a steel mill and carbide grinding medium as described in Example 1 are charged 1470 parts by weight of the commercial tungsten carbide powder and 1185 parts by weight of acetone. The acetone is milled for 48 hours. Then 30 parts of one micron tungsten powder and 205 parts of fine cobalt powder are added to the mill and milling continued for 72 hours. The interdispersed powder is then removed from the mill and dried and screened in an inert atmosphere, loaded in the molds and hot pressed in accordance with the procedure described in Example 2. The powder contains an atomic ratio of carbon to tungsten of 1.0, but due to the very finely divided nature of the material it combines with enough oxygen, either from the acetone or, in spite of precautions, from the inert atmosphere employed to reduce the atomic ratio of carbon to tungsten in the final hot pressed body to slightly less than one.

Analysis of the body shows a carbon to tungsten atomic ratio of 0.98 and a cobalt content of 10 percent by weight. The body has a porosity of A–1, 90% of the grains of tungsten carbide are smaller than one micron and the mean grain size is 0.6 micron. The acid resistance is greater than 150 hours. The cobalt phase contains 20% by weight of tungsten in solid solution. The body contains about 1% of tungsten-rich eta phase based on the weight of the composition. When subjected to the standard annealing test the tungsten dissolved in the cobalt phase is reduced to 9% by weight and the transverse rupture strength of the body decreases from 539,000 to 475,000 p.s.i. and the hardness is reduced from 91.5 to 91.0 Rockwell A.

Example 24

The composition of this example is prepared from an aggregated colloidal tungsten carbide powder prepared as in Eaxmple 1, except with a smaller amount of carbon, so as to produce an aggregated colloidal tungsten carbide powder having an atomic ratio of carbon to tungsten of 0.99.

Fourteen hundred parts of this powder are milled for 7 days in acetone along with 250 parts of cobalt to give an interdispersion, and the mixture is then recovered, dried and screened out of contact with the atmosphere. The powder is then heated at 900° C. for two hours in an atmosphere consisting of 85% hydrogen and 15% oxygen, cooled to room temperature and screened in a nitrogen atmosphere. Ninety grams of the powder is loaded into a graphite mold of 1 inch by 1 inch cross-section, and pressed between graphite pistons at room temperature and 200 p.s.i. The pressure is then removed and the powder and mold heated in 6 minutes to 1350° C. without pressure, held at this temperature for 5 minutes to heat-treat the powder, permitting the mass to sinter, and then 2000 p.s.i. pressure is applied while the temperature remains at 1350° C. for a period of one minute. The pressure is then removed and the sample is ejected from the furnace and permitted to cool to 800° C. in 2 minutes.

The transverse rupture strength is 441,000 p.s.i., the hardness is 91.0 Rockwell A. The density is greater than 98% of theoretical. The cobalt metal phase contains 18% tungsten in solid solution and about 30% by weight of eta phase. When subjected to the standard annealing test, the transverse rupture strength as subsequently measured at room temperature, decreases by 3%. The mean grain size is less than 0.75 mircon. Because of the very low atomic ratio of carbon to tungsten, there is a considerable amount of eta phase in the pressed body and thus less cobalt metal phase is present, so that annealing caused only a slight decrease in strength.

Example 25

A reduced tungsten carbide powder containing 12% by weight of cobalt of the type employed for hot pressing billets in Example 1, is loaded as a loose powder in a rectangular graphite mold, 1 inch by 1 and 5/16 inches cross-section, employing 85 grams of powder. This is placed in the vacuum hot press and the loaded mold fitted with pistons is moved into the hot zone of the furnace at a temperature of about 1000° C., without applying more than 200 p.s.i. to the powder held in place by the pistons as it is being moved into the furnace. All pressure is then removed, and the mold and contents are heated in a period of 4.5 minutes from 1000° C., and at once sufficient pressure is exerted on the pistons to subject the sample to a mechanical pressure of 500 p.s.i., while heating is continued for a period of 3.5 minutes while the temperature is slowly and continuously raised from 1350° to 1400° C. Of the 3.5 minutes, about one minute is required for the temperature to increase from 1350° to 1400° C. and the remaining 2.5 minutes the temperature of the sample is held at 1400° C. under pressure. Immediately thereafter, the pressure is removed and the sample and mold are removed from the hot zone of the furnace into a cooling zone and the temperature of the mold and sample drops to around 800° C. in a period of about two minutes. It is thereafter permitted to cool to room temperature over the next 30 minutes before being removed from the furnace, thereby avoiding oxidation of the mold. The body so obtained is tested and found to have a transverse rupture strength of 591,000 p.s.i. and a hardness of 92.0 Rockwell A. The AISI porosity rating is A-2. The pressed body contains about 10% by weight of cobalt; there is more than 15% tungsten in solid solution in the cobalt phase, and material shows a behavior upon being reheated and cooled slowly, of an unannealed body of the invention. The mean grain size of the tungsten carbide is 0.56 micron.

EXAMPLE 26

Blending of colloidally subdivided tungsten carbide and cobalt is carried out as follows: 1408 grams of tungsten carbide of Example 1, having a specific surface area of 7.1 square meters per gram, and an individual crystallite size of around 31 millimicrons as determined by X-ray line broadening, and 192 grams of "Cobalt F" powder, also of the type used in Example 1, and having a particle size of a micron, are placed in a V-blendor revolving at about one revolution per second, for a period of about one hour, and are then removed and screened through a 60 mesh screen and again blended for another hour.

The blended powder is then reduced in hydrogen-methane by the same procedure as described in Example 1. The resultant powder is hot pressed as in Example 1, except that the temperature is 1400° C. instead of 1420° C. The resulting body has a transverse rupture strength of 505,000 p.s.i. and a hardness of 92.1 Rockwell A. The density is over 98% of theoretical. Although this method avoids the step of ball-milling, it has the disadvantage that the powder is considerably more voluminous than the milled and reduced powder of Example 1, and less material can be loaded into a mold of given volume. However, for pressing smaller pieces, the powder is satisfactory and omission of the prolonged milling operation is of considerable advantage. The body contains 10% by weight of cobalt, has more than 12% by weight of tungsten dissolved in the cobalt phase, and behaves characteristically as an unannealed body, and has a mean grain size less than one micron.

EXAMPLE 27

The commercial tungsten carbide employed in this example contains 6.33% by weight of carbon, 93.6% by weight of tungsten, 0.05% by weight of oxygen; the specific surface area of the powder as determined by nitrogen adsorption is 0.62 m.$^2$/g.; and it contains less than 0.05% of iron, nickel and cobalt.

Four hundred grams of this tungsten carbide powder and 5.2 g. of the finely divided type of cobalt metal powder employed in Example 1 are placed in a one quart steel ballmill containing 3 kilograms of ¼ inch diameter by ¼ inch long cylinders of commercial tungsten carbide bonded with 6% cobalt, of the type used in Example 1. The mill is half filled with a saturated aliphatic hydrocarbon having a flash point of 130° F., the amount added to the mill being sufficient to just cover the carbide grinding media. The mill is run for 8 days, at 60 r.p.m., being tightly sealed during the period to prevent loss of solvent or intake of air. At the end of the milling period, the contents are washed out with normal hexane, while keeping the product out of contact with the atmosphere. The hexane suspension is permitted to stand until the black tungsten carbide-cobalt mixture has settled, the excess solvent then is removed by decantation and the residual black slurry is dried by distilling off the hydrocarbon under vacuum. The dried powder is then passed through a screen of 60 meshes per inch, and stored in a closed container. All the foregoing operations are carried out with the exclusion of air, and under an atmosphere of nitrogen containing less than 50 p.p.m. of oxygen.

The tungsten carbide grinding cylinders, after being washed and dried, are found to have lost less than 20 grams in weight. The milled powder contains an average of 1.2% oxygen, in spite of the precautions, has a specific surface area of 4.3 m.$^2$/g., and by X-ray analysis consists of tungsten carbide crystallites 19 millimicrons in average diameter. It contains 6.7% by weight of carbon. The powder is then reduced by being heated at 950° C. for 2 hours in an atmosphere containing 15% argon, 83% hydrogen and about 2% methane, and is then allowed to cool in a stream of argon.

The resulting powder is handled and stored under nitrogen. The powder contains: carbon—6.00%; oxygen—0.22%; and the specific surface area is 1.6 m.$^2$/g. It consists of tungsten carbide crystallites of 30 millimicrons average size, according to X-ray line broadening. No free carbon is present and the atomic ratio of carbon to tungsten is about 0.99. The powder is passed under nitrogen, through a screen of 40 meshes per inch, and the fines removed through a screen of 100 meshes per inch. The resulting 40 to 100 mesh powder is vacuum hot pressed as follows: Fifty grams is loaded into a one inch diameter graphite mold and compressed between graphite pistons under a pressure of 200 p.s.i. and moved into the hot zone of the furnace at 1200° C. and the pressure immediately removed. The temperature is then raised at a uniform rate over a period of 6 minutes to 1800° C. where it is held for 5 minutes, after which a pressure of 4000 p.s.i. is applied for a period of one minute. During this time the material is fully consolidated. The molded material in its container is removed immediately from the hot zone and permitted to cool to about 1000° C. within a period of 2 minutes and to room temperature over a period of the next hour.

The product, hereinafter called product A, has a transverse rupture strength of 230,000 p.s.i., an impact strength of 11 ft. lbs./in.$^2$, a Rockwell A hardness of 92.3, and a density of 15.4 grams per cc.

Another sample of the reduced powder which has been passed through a 40 mesh screen but from which the finer material has not been removed, is pressed in exactly the same manner and the resulting molded body has a transverse rupture strength of 235,000 p.s.i., an impact strength of 6 ft. lbs./in.$^2$, a Rockwell A hardness of 92.3, and a density of 15.40 grams per cc. Examination of the test body by X-ray diffraction indicates that it contains about 1% of eta phase, $Co_3W_3C$. There is 31 percent by weight of tungsten in the cobalt phase.

For examination of the microstructure, a specimen is cut from the molded bodies in a plane parallel to the pressing direction. Examination of the polished and etched sections by metallographic microscope reveals that the structures consist largely of platelets of tungsten carbide from 2 to 5 microns in diameter and from 2 to less than 1 micron in thickness. The platelets are visible in cross-section, appearing as longitudinal areas predominantly aligned at right angles to the pressing direction. It will be noted that since in an array of platelets lying for the most part parallel to each other and at right angles to the plane of the cross-section, only a small portion of the platelets will by chance have been cut through the center to reveal the maximum platelet diameter or breadth. In most cases, less than the whole breadth of a platelet is revealed. Thus, judging by the cross-sections of the platelets, one can at least judge the maximum breadth, which in this case is about 5 microns. The thickness of different plates appears to be similar and about one micron. Electron micrographs show a mean grain size slightly less than one micron.

A glass cutting knife is made by cementing a triangular section of material A, ¼ inch to a side and ⅛ inch in thickness in a suitable holder. The two corners of the triangular point are sharpened by diamond grinding, and prove to be very durable for scoring glass.

EXAMPLE 28

A colloidally subdivided tungsten carbide is made by reaction in fused calcium chloride as described in Example 1, but with a deficiency of carbon in the reaction mixture, so that the aggregated colloidal tungsten carbide contains small amounts of tungsten and ditungsten carbide in addition to tungsten monocarbide, and the overall atomic ratio of carbon to tungsten is 0.94. This product is milled with cobalt as in Example 1, giving an interdispersed powder containing 12% cobalt by weight. It is not reduced, but handled out of contact with air and loaded directly into the graphite mold. A body is fabricated and rapidly cooled as described in Example 1.

The transverse rupture strength is 511,000 p.s.i., the hardness is 92.0. Examination by X-rays and the electron microscope shows that more than 90% of the tungsten carbide grains are smaller than one micron. Estimating from electron micrographs, roughly 10% by volume of tungsten-rich eta phase, $Co_3W_3C$ is present, which accounts for roughly half of the total cobalt.

The body thus contanis 10.1% by weight of cobalt, of which an appreciable portion remains as metal binder phase; this phase contains 24% by weight of tungsten in solid solution.

When the body is subjected to the standard annealing test, a further proportion of cobalt in the metal binder phase is converted along with the tungsten-rich eta phase to a cobalt-rich eta phase, which is characteristic of an annealed body. The presence of finely divided eta phase minimizes the crystallization of tungsten carbide during the annealing test, and high hardness is maintained; the body loses 10 percent in strength.

The advantage of such bodies over those available from processes of the prior art is that a finer grain structure and higher hardness is thus possible for a given cobalt content, and the resulting body is not subject to recrystallization to a coarser carbide structure when heated to temperatures above 1250° C. for re-shaping as in twisting inserts for boring tools.

EXAMPLE 29

One hundred parts of the cobalt containing tungsten carbide powder of Example 4 are charged to a graphite crucible, heated in a vacuum induction furnace at 1500° C. for a period of ten minutes and cooled to room temperature under vacuum in 5 minutes. The sintered porous solid recovered from the crucible is pulverized to pass a 70 mesh sieve. It contains: tungsten—87.9%; total carbon—5.66%; cobalt—6.3%; free carbon and oxygen—less than 0.1%. Microscopic examination of the powder at 500× shows a preponderance of loose aggregates of crystalline platelets of tungsten carbide with a maximum diameter of 5 microns and a maximum thickness of one micron. Examination by electron microscope shows that the longest dimension of the platelets ranges from 0.5 to 5 microns with 85% of the platelets having a maximum dimension less than 1 micron. The tungsten carbide is isolated from the cobalt by removing the latter with hot concentrated hydrochloric acid and disaggregating the triangular platelets of tungsten carbide by mild attrition. The powder is used as a polishing agent for steel.

EXAMPLE 30

As an example of molding a large billet, the reduced powder of Example 1 is cold pressed to a billet 3 inches in diameter and 1 inch thick, by isostatic pressing in a rubber mold at 50,000 p.s.i. The billet is then heated very slowly in a vacuum furnace in an alumina crucible and degassed by heating over a period of eight hours at a uniform rate of temperature rise to 1000° C. The billet is then cooled to room temperature and hot pressed while embedded in alumina in a graphite cylindrical mold, 3 inches in inside diameter, fitted with graphite pistons. A quarter inch layer of 325 mesh tabular alpha alumina powder is placed on the lower piston; while the mold is held with its axis in an upright position, the billet is placed on the powder and additional alumina is poured around it and over it to a depth of ¼ inch. The upper graphite piston is then inserted. The mold assembly is heated in a vacuum hot press without pressure from room temperature to 1000° C. in 20 minutes and then 4000 p.s.i. is applied and the temperature raised from 1000 to 1425° C. in eight minutes. A pressure of 4000 p.s.i. is maintained on the pistons to the alumina-encapsulating billet for a period of a total of 5 minutes while the temperature is maintained at 1400° C. Then the pressure is released and the mold removed from the furnace and cooled to 700° C. by radiation in 15 minutes.

After the alumina ceramic is broken away from the billet, it is tested as follows: the resulting body has a transverse rupture strength of 470,000 p.s.i.; a hardness of 90.5 Rockwell A; contains 11.7% cobalt and the cobalt binder phase contains 17% by weight of tungsten in solid solution. The acid resistance of the body is greater than 50 hours. The mean grain size of the tungsten carbide is 0.8 micron and 81% of the grains are smaller than one micron. The billet is shaped by electrodischarge machining into an extrusion die.

I claim:
1. A tungsten carbide body, having a density in excess of 95% of its theoretical density, in which the mean grain size of the tungsten carbide is less than 1 micron and at least 60 percent of the grains are smaller than 1 micron, the body consisting essentially of tungsten carbide and from 1 to 30 percent by weight of an acid-resistant cobalt alloy consisting essentially of cobalt and from 8 to 33 percent by weight of tungsten.

2. A tungsten carbide body, having a density in excess of 98 percent of its theoretical density, in which the mean grain size of the tungsten carbide is less than 1 micron and at least 80 percent of the grains are smaller than 1 micron, the tungsten carbide having a carbon to tungsten atomic ratio of 0.95 to 1.0, the body consisting essentially of tungsten carbide and from 3 to 15 percent by weight of a binder phase of cobalt alloy consisting essentially of cobalt and from 8–33 percent by weight of tungsten.

3. A body of claim 1 in which the density is in excess of 98 percent of theoretical density.

4. A body of claim 3 in which the cobalt alloy contains from 15 to 25 percent by weight of tungsten.

5. A body of claim 3 in which the carbon to tungsten atomic ratio is between 0.81 and 1.0 with the limitation that the ratio is greater than A but less than B, where $$A = 1.0 - 0.0062(P-1)$$

and $$B = 1.0 - 0.00166(P-15)$$

where P is percent by weight of cobalt.

6. A body of claim 3 in which the carbon to tungsten ratio is between 0.95 and 1.0 and the cobalt alloy content is between 3 and 15 percent by weight.

7. A body of claim 6 in which the cobalt alloy content is between 8 and 15 percent by weight.

8. A body of claim 3 in which the cobalt alloy content is 3 to 15 percent by weight, the alloy consisting essentially of cobalt and from 15 to 25 percent by weight of tungsten.

9. A body of claim 8 in which the cobalt alloy content is 8 to 15 percent by weight.

10. A body of claim 9 in which the tungsten carbide grains are anisodimensional the ratio of longest dimension to shortest dimension being at least 3 to 1.

11. A body of claim 9 in which the cobalt alloy content is between 9 and 12 percent by weight.

12. A body of claim 10 in which the largest face of the anisodimensional tungsten carbide grains is substantially oriented in parallel alignment to a reference line.

13. A body of claim 3 in which the mean grain size is less than 0.75 micron.

14. A body of claim 13 in which at least 80 percent of the tungsten carbide grains are smaller than 1 micron.

15. A body of claim 14 in which the cobalt alloy content is between 3 and 15 percent by weight.

16. A body of claim 3 in which the tungsten carbide grains are anisodimensional the ratio of longest dimension to shortest dimension being at least 3 to 1.

17. A dense tungsten carbide body in which the mean grain size of tungsten carbide is less than 1 micron and at least 60 percent of the grains are smaller than 1 micron bonded with an acid resistant cobalt alloy phase consisting essentially of cobalt and from 15 to 25 percent by weight of tungsten, the body consisting essentially of tungsten carbide and from 8 to 15 percent by weight of cobalt alloy.

18. A dense tungsten carbide body of claim 17 in which there is a three-dimensional network of cobalt alloy rich veins interpenetrating a three-dimensional network of cobalt alloy-bonded tungsten carbide.

19. A tungsten carbide body in which the mean grain size of the tungsten carbide is less than 1 micron and at least 60% of the grains are smaller than 1 micron bonded with from 8 to 15 percent by weight of cobalt alloy consisting essentially of cobalt and from 8 to 33 percent by weight of tungsten, said tungsten carbide grains being further characterized as anisodimensional, having a longest dimensional to shortest dimensional ratio of at least 3 to 1.

20. An acid resistant body of claim 19 in which the largest face of the anisodimensional tungsten carbide grains is substantially oriented in parallel alignment to a reference line.

21. An acid-resistant body of claim 16 in which the tungsten carbide grains have a mean diameter of less than 1 micron and 80 percent of the platelets are smaller than 1 micron, the cobalt alloy contains from 15 to 25 percent of tungsten.

References Cited

UNITED STATES PATENTS

| | | | |
|---|---|---|---|
| 873,745 | 12/1907 | Haynes | 75—171 |
| 1,057,423 | 4/1913 | Haynes | 75—171 |
| 1,338,132 | 4/1920 | Honda | 75—171 |
| 1,951,133 | 3/1934 | De Bats | 23—208 |
| 1,998,609 | 4/1935 | Comstock | 75—204 |
| 2,011,369 | 8/1935 | McKenna | 29—182.8 |
| 2,113,171 | 4/1938 | Cooper | 29—182.8 |
| 2,116,399 | 5/1938 | Marth | 75—204 |
| 2,122,403 | 7/1938 | Balke et al. | 29—182.7 |
| 2,731,711 | 1/1956 | Lucas | 29—182.8 |

FOREIGN PATENTS 1,041,958  9/1966  Great Britain.

OTHER REFERENCES

Metals Handbook, 1948 edition, American Society for Metals, Novelty Park, Ohio, p. 63.

BENJAMIN R. PADGETT, *Primary Examiner.*

ARTHUR J. STEINER, *Assistant Examiner.*

U.S. Cl. X.R.

29—182.7; 75—203, 204